United States Patent
Suzuki

[19]

[11] Patent Number: 5,949,610
[45] Date of Patent: Sep. 7, 1999

[54] STOPPER BLOCK ASSEMBLY FOR A CASSETTE TYPE RECORDING/ REPRODUCING APPARATUS

[75] Inventor: Katsuhiro Suzuki, Kanagawa, Japan

[73] Assignee: Sony Corporation, Tokyo, Japan

[21] Appl. No.: 09/165,722

[22] Filed: Oct. 2, 1998

Related U.S. Application Data

[62] Division of application No. 09/048,931, Mar. 26, 1998, Pat. No. 5,883,756, which is a division of application No. 08/834,214, Apr. 15, 1997, Pat. No. 5,854,723.

[30] Foreign Application Priority Data

Apr. 16, 1996 [JP] Japan .................................. 8-117169

[51] Int. Cl.$^6$ .................................................. G11B 15/675
[52] U.S. Cl. .......................................... 360/94; 360/96.5
[58] Field of Search .............................. 360/93, 94, 96.1, 360/96.5

[56] References Cited

U.S. PATENT DOCUMENTS

| | | | |
|---|---|---|---|
| 5,016,127 | 5/1991 | Inoue et al. ............................... | 360/94 |
| 5,046,169 | 9/1991 | Tsujino ..................................... | 360/96.5 |
| 5,121,271 | 6/1992 | Sakumoto et al. ........................ | 360/94 |
| 5,184,261 | 2/1993 | Noguchi .................................... | 360/94 |
| 5,493,459 | 2/1996 | Shiomi ...................................... | 360/94 |
| 5,602,695 | 2/1997 | Nishijima et al. ........................ | 360/94 |
| 5,739,979 | 4/1998 | Busch ........................................ | 360/94 |
| 5,822,149 | 10/1998 | Takase et al. ............................. | 360/94 |

*Primary Examiner*—Jefferson Evans
*Attorney, Agent, or Firm*—Frommer Lawrence & Haug, LLP.; William S. Frommer

[57] ABSTRACT

A cassette type recording and reproducing apparatus in which during an eject operation of a tape cassette, a cam driven lever 28 is kicked by a cam 31 and a cassette discharge lever 51 is rotated by the cam driven lever 28, whereby a tape cassette 1 in a cassette stage is pushed out in a cassette discharge direction by the cassette discharge lever 51 is provided with cam lever control mechanism 50 for positionally regulating the cam driven lever 28 with some degree of freedom within a fixed range $\theta_{12}$ at the intermediate position of a swing range $\theta_{11}$ in which the cam driven lever 28 is rotated by the cam 31. Therefore, a cam driven lever can be prevented from violently colliding against a cassette discharge lever in the course of a loading operation of a tape cassette.

4 Claims, 57 Drawing Sheets

FIG. 1A
(PRIOR ART)
FIG. 1B
(PRIOR ART)
FIG. 1C
(PRIOR ART)
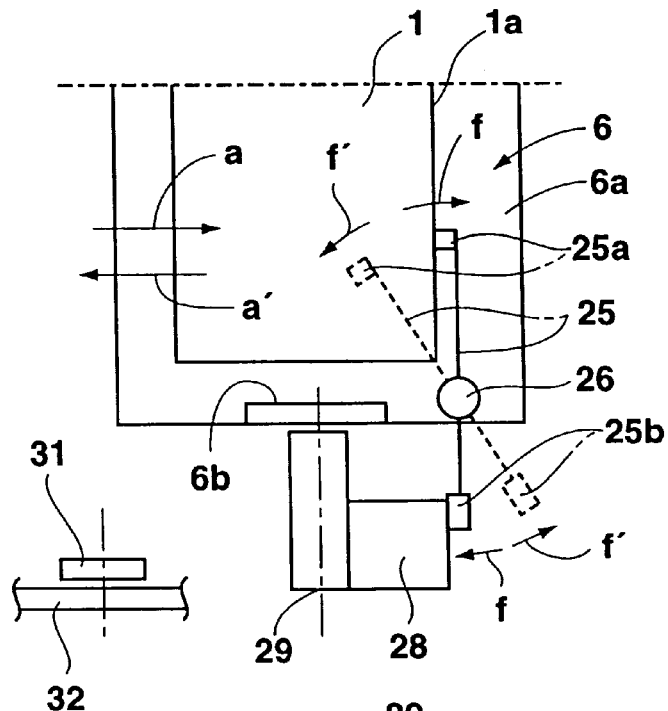
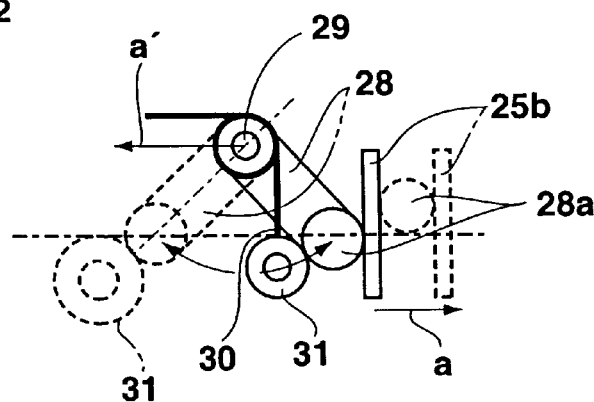
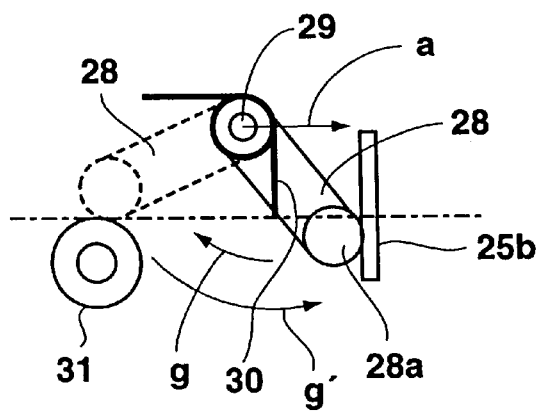

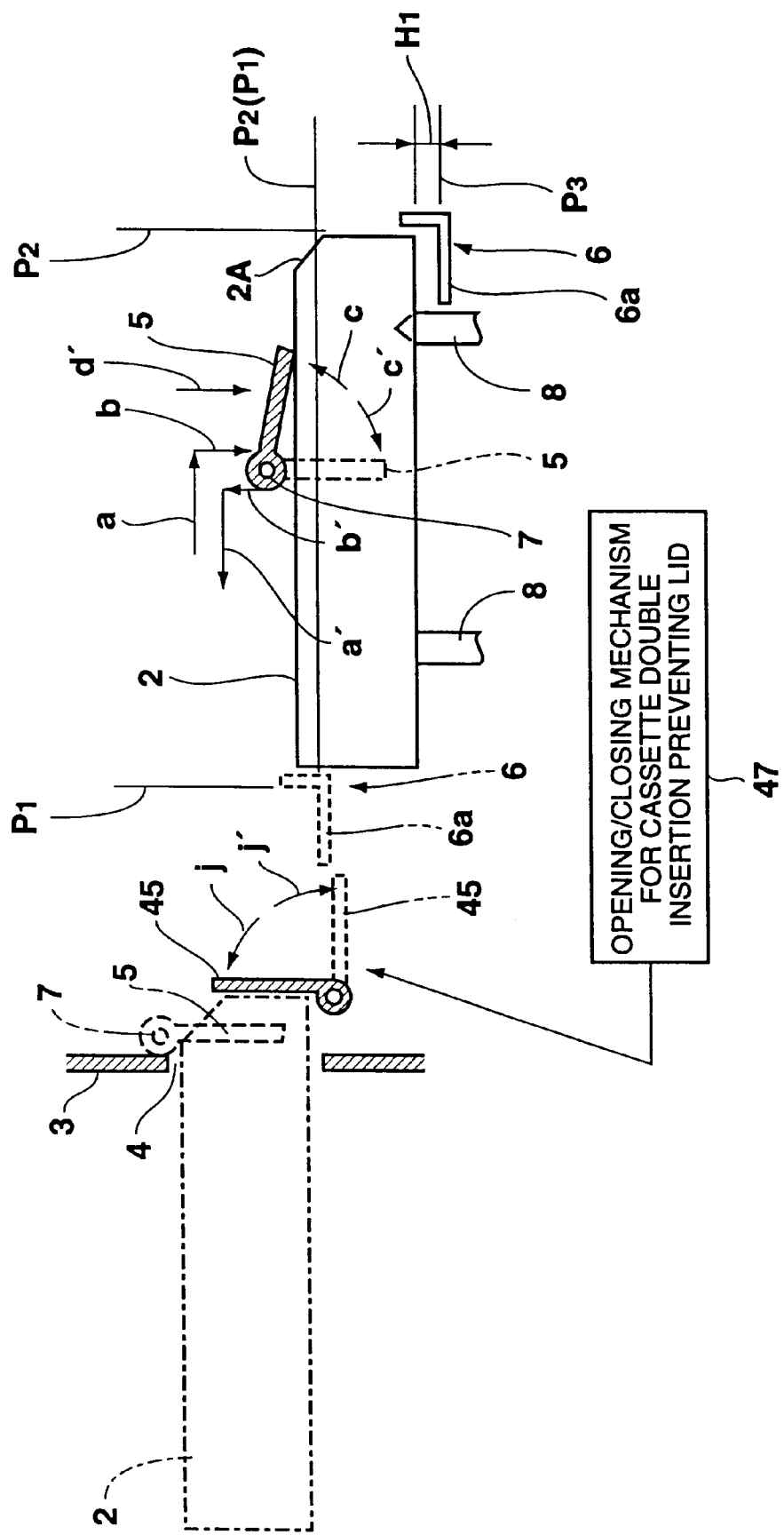

5,949,610

STOPPER BLOCK ASSEMBLY FOR A CASSETTE TYPE RECORDING/ REPRODUCING APPARATUS

CROSS-REFERENCE TO RELATED APPLICATION

This application is a divisional of prior application Ser. No. 09/048,931, filed Mar. 26, 1998, now U.S. Pat. No. 5,883,756 which is a divisional of prior application Ser. No. 08/834,214, filed Apr. 15, 1997 now U.S. Pat. No. 5,854,723.

BACKGROUND OF THE INVENTION

1. Field of the Invention

The present invention relates to a cassette type recording/reproducing apparatus for recording/reproducing information by using a tape cassette, such as a video cassette recorder or the like.

2. Description of the Prior Art

There has been known a conventional technique shown in FIGS. 1A to 1J, which is relating to a cassette type recording/reproducing apparatus such as a video recorder or the like. In the conventional technique shown in FIGS. 1A to 1C, a cassette discharge lever 25 is secured through a vertical supporting pin 26 to a bottom plate 6a of a cassette stage 6 so as to be freely rotatable in directions as indicated by arrows f,f' within a horizontal plane, and a cam driven lever 28 for rotationally driving the cassette discharge lever 25 is secured through a horizontal supporting pin 29 to a side plate 6b of a cassette stage 6 so as to be freely rotatable in directions as indicated by arrows g,g' within a vertical plane. The cam driven lever 28 is rotationally urged in the direction of the arrow g' by a torsion coil spring 30 to bring the lower end 28a of the cam driven lever 28 into contact with the other end 25b of the cassette discharge lever 25 from the direction of the arrow g' at all times. Further, a cam 31 which is located so as to be overlapped with a horizontal movement locus of the lower end 28a of the cam driven lever 28 is secured to a chassis side plate 32.

As shown in FIG. 1A, when a tape cassette 1 is inserted into the cassette stage 6 from a cassette insertion port of a front panel (not shown) in a direction of an arrow a, one end 25a of the cassette discharge lever 25 is pushed in the direction of the arrow a by a front end 1a of the tape cassette 1, and the cam driven lever 28 is pushed against the torsion coil spring 30 in the direction of the arrow g by the other end 25b of the cassette discharge lever 25.

In course of an eject operation of the tape cassette 1 from a cassette mount position to a cassette insertion position in the direction of the arrow b by the cassette stage 6, the lower end 28a of the cam driven lever 28 is relatively kicked from the direction of the arrow a by the cam 31 as shown in FIG. 1B to rotationally drive the cam driven lever 28 in the direction of the arrow g'. Further, as shown in FIG. 1A, the other end 25b of the cassette discharge lever 25 is pushed in the direction of an arrow f' by the cam driven lever 28, and the tape cassette 1 in the cassette stage 6 is pushed in the direction of the arrow a' by one end 25a of the cassette discharge lever 25, whereby the tape cassette 1 is violently pushed out of the cassette insertion port in the direction of the arrow a' so that the tape cassette 1 can be easily pulled out at the outside of the front panel.

However, in the above-described prior art, the lower end 28a of the cam driven lever 28 is brought into contact with the other end 25b of the cassette discharge lever 25 from the direction of the arrow g' by the torsion coil spring 30, whereby the lower end 28a of the can driven lever 28 is kept to be overlapped with the cam 31.

Accordingly, in this application, in the course of a loading operation of the tape cassette 1 from the cassette insertion position to the cassette mount position in the direction of the arrow a by the cassette stage 6, as shown in of FIG. 1C, the cam driven lever 28 is once rotated in the direction of the arrow g against the torsion coil spring 30 by the cam 31, and then the cam driven lever 28 is violently rotated in the direction of the arrow g' by the torsion coil spring 30 at the instantaneous time when the cam driven lever 28 gets over the cam 31 in the direction of the arrow a, so that the cam driven lever 28 violently collides against the other end 25b of the cassette discharge lever 25 from the direction of the arrow g' and it causes an uncomfortable collision noise "click sound" at all times.

The every-time occurrence of the uncomfortable collision noise as described above causes questions on the quality of products, and thus this is unfavorable. In addition, when the cam driven lever 28 violently collides against the other end 25b of the cassette discharge lever 25 from the direction of the arrow g' in the course of the loading operation of the tape cassette 1, the cassette discharge lever 25 is rotationally driven in the direction of the arrow f' which corresponds to the cassette discharge direction, and the tape cassette 1 in the cassette stage is displaced by the one end 25a thereof in the direction of the arrow a' which corresponds to the cassette discharge direction. Accordingly, there occurs such a cassette loading miss that the tape cassette 1 is not accurately engaged with plural cassette positioning pins when the tape cassette 1 is loaded to the cassette mount position. In order to prevent the positional displacement of the tape cassette 1 in the cassette stage 6, a clamp force in the cassette stage 6 is required to be increased. If the clamp force to the tape cassette 1 in the cassette stage 6 is increased, a strong force is needed when the tape-cassette 1 is manually inserted into the cassette stage 6, and also a strong force is needed when the tape cassette 1 is discharged by the cassette discharge lever 25 for ejection. Therefore, there occurs various problems, for example, the rigidity of the cassette discharge lever 25 and the cam driven lever 28 must be increased.

The present invention has been implemented to solve the above problems, and it has an object to provide a cassette type recording/reproducing apparatus which can beforehand prevent a cam driven lever from violently colliding against a cassette discharge lever in the course of a loading operation of a tape cassette.

There has been also known another conventional technique as shown in FIG. 1D, which is relating to a cassette type recording/reproducing apparatus such as a video recorder or the like. In this conventional technique, an opening/closing lid 5 for opening/closing a cassette insertion port 4 of a front panel 3 from the inside is secured to a cassette stage 6 through a supporting pin 7 so as to be freely rotatable in the directions indicated by arrows c,c', and a cassette press member is constructed by the opening/closing lid 5.

That is, as indicated by a dotted line in FIG. 1D, in such a state that the cassette stage serving as cassette feeding means is returned to a cassette insertion position $P_1$ corresponding to the inside position of the cassette insertion port 4 from the direction of the arrow a', the opening/closing lid 5 is rotated in the direction of the arrow c' to close the cassette insertion port 4 from the inside by the opening/closing lid 5. In a cassette loading operation, when the tape cassette 2 is inserted from the cassette insertion port 4 into the cassette stage 6 from the direction of the arrow a, the opening/closing lid 5 is pushed and opened in the direction of the arrow c by the tape cassette 2, and also the tape cassette 2 is pressed and fixed onto the bottom plate 6a of the cassette stage 6 by the cassette press force in the direction of the arrow d' of the opening/closing lid 5.

Thereafter, the cassette stage 6 is horizontally retracted from the cassette insertion position $P_1$ into the cassette retract position $P_2$ in the direction of the arrow a by a cassette loading mechanism (not shown), and then the cassette stage 6 is vertically descended to the cassette mount position $P_3$ in the direction of the arrow b. When the tape cassette 2 is horizontally loaded to the cassette mount position $P_3$, the tape cassette 2 is mounted horizontally onto plural cassette position pins 8, and the tape cassette 2 is upwardly pushed to the position of a height $H_1$ from the bottom plate 6a of the cassette stage 6. In addition, the tape cassette 2 is pressed and fixed onto the plural cassette positioning pins 8 by the cassette press force in the direction of the arrow d' of the opening/closing lid 5, and the front lid 2A of the tape cassette is opened upwardly.

After the cassette loading operation, a magnetic tape in the tape cassette 2 is pulled out from the cassette by the tape loading mechanism and loaded onto a rotating head drum (not shown) to perform information recording/reproducing operation. After the information recording/reproducing operation, the cassette stage 6 is returned in the directions of arrows b',a' from the cassette mount position $P_3$ via the cassette retract position $P_2$ to the cassette insertion position $P_1$ by a reversing operation to the cassette loading operation, and finally the tape cassette 2 is discharged to the outside of the cassette insertion port 4. At this time, when the tape cassette 2 is pulled out in the direction of the arrow a' from the cassette insertion port 4, the opening/closing lid 5 is rotated in the direction of the arrow c' and the cassette insertion port 4 is automatically closed from the inside, as indicated by a dotted line of FIG. 1D.

According to the above-described prior art, the cassette insertion port 4 of the front panel 3 is opened/closed from the inside by the opening/closing lid 5 which is freely rotatably secured to the cassette stage 6, and reciprocatively moved between the cassette insertion position $P_1$ and the cassette mount position $P_3$ together with the cassette stage 6, and the opening/closing lid is also used as a cassette press member for pressing onto the bottom plate 6a of the cassette stage 6 the tape cassette 2 which is inserted from the cassette insertion port 4 into the cassette stage 6. Therefore, the number of parts and the number of fabrication steps can be reduced to promote reduction of the cost. In addition, a proper portion of the tape cassette 2 which is located at a rear side a movable space of the front lid 2A of the tape cassette 2 can be pressed by the opening/closing lid 5, so that the cassette type recording/reproducing apparatus of this prior art has high resistance to external disturbance or the like.

However, in this prior art, in such a state that the cassette stage 6 is moved from the cassette insertion position $P_1$ to the cassette mount position $P_3$ in the directions of the arrows a,b to load the tape cassette 2 to the cassette mount position $P_3$ as indicated by a solid line of FIG. 1D, the cassette insertion port 4 of the front panel 3 is left opened. Therefore, there is such a risk that a next tape cassette 2 is erroneously inserted from the cassette insertion port 4 (i.e., cassette double insertion), another foreign matter is erroneously inserted from the cassette insertion port 4 or the like.

The present invention has been further implemented to solve the above problem, and has another object to provide a cassette type recording/reproducing apparatus in which the cassette insertion port of the front panel is opened/closed from the inside by an opening/closing lid which is freely rotatably secured to a cassette stage and moved together with a cassette stage, and which can prevent a cassette double insertion, etc. in a cassette loading operation in advance.

Further, there has been known another prior art shown in FIG. 1E, which is relating to the cassette type recording/reproducing apparatus such as a video recorder or the like. In this prior art, when the tape cassette 2 is inserted from the cassette insertion port 4 of the front panel 3 into the cassette stage 6 serving as the cassette feeding means in the direction of the arrow a, the tape cassette 2 is pressed and fixed onto the bottom plate 6a of the cassette stage 6 by the cassette press member 5 which is secured to the cassette stage 6.

Thereafter, the cassette stage 6 is horizontally pulled from the cassette insertion position $P_1$ to the cassette retract position $P_2$ in the direction of the arrow a by the cassette loading mechanism (not shown), and then vertically descended to the cassette mount position $P_3$ in the direction of the arrow b to horizontally load the tape cassette 2 to the cassette mount position $P_3$. At this time, the tape cassette 2 is horizontally mounted on the plural cassette positioning pins 8, and pushed upwardly to the height $H_1$ from the bottom plate 6a of the cassette stage 6. At the same time, the tape cassette 2 is pressed and fixed onto the plural cassette positioning pins 8 by the cassette press member, and the front lid 2A of the tape cassette 2 is upwardly opened.

After the cassette loading operation, the magnetic tape in the tape cassette 2 is pulled out from the cassette by the tape loading mechanism and loaded onto the rotating head drum (not shown) to perform the information recording/reproducing operation. After the recording/reproducing operation, the cassette stage 6 is returned from the cassette mount position $P_3$ through the cassette retract position $P_2$ to the cassette insertion position $P_1$ in the directions of the arrows b', a' by the counter operation to the cassette loading operation, and the tape cassette 2 is discharged to the outside of the cassette insertion port 4.

In the above-described cassette type recording/reproducing apparatus, the cassette press member 5 must be disposed to be displaced nearer to the cassette discharge direction side (in the direction of the arrow a') than the opening/closing space $S_1$ of the front lid 2A in order to prevent the interference between the cassette press member 5 and the front lid 2A of the tape cassette 2.

Accordingly, in this type of cassette type recording/reproducing apparatus, the cassette press member 5 can never press the upper portion of the front lid 2A portion which is the tip of the tape cassette 2, so that no countermeasure cannot be taken to the insertion of the tape cassette at an upwardly slant angle ($\theta_1$) as indicated by a solid line of FIG. 1E to the horizontal reference indicated by a one-dotted chain line of FIG. 1E when the tape cassette 2 is inserted from the cassette insertion port 4 into the cassette stage 6 in the direction of the arrow a. A space $S_2$ as indicated by a one-dotted chain line of FIG. 1E corresponds to a horizontal moving space of the cassette press member 5, and thus a fixed stopper for preventing the slant insertion of the tape cassette 2 cannot be disposed in the space $S_2$.

Accordingly, when the tape cassette 2 is violently inserted into the cassette stage 6 as indicated by the solid line of FIG. 1E, the prior art has a risk that the tape cassette 2 is obliquely inserted at an upwardly slant angle ($\theta_1$). Further, when the tape cassette 2 is loaded to the cassette mount position as indicated by the dotted line of FIG. 1E while obliquely inserted into the cassette stage 6, not only the tape cassette 2 cannot be accurately held by the plural cassette positioning pins 8, but also it runs on to various guides, resulting in a cassette loading miss.

Further object of the present invention is to provide a cassette type recording/reproducing apparatus which can prevent a tape cassette from being obliquely inserted into a cassette stage in advance.

There has been further known a conventional technique show in FIG. 1F, which is relating to a cassette type recording/reproducing apparatus such as a video tape recorder or the like. In this prior art, two types of tape cassettes 1 and 2 which are different in size ($D_1$, $D_2$) can be properly used. In this type of cassette type recording/reproducing apparatus, La cassette identifying member 9 for identifying the type (size) of the tape cassettes 1,2, a cassette insertion guide 10 which is switched in accordance with the identification result of the cassette identifying member 9, and a lock lever (not shown) for locking the cassette identifying member 9 and the cassette insertion guide 10 at a position which is downwardly escaped (shifted) from the cassette insertion space, are disposed inside the cassette insertion port 4 which is a laterally elongated opening formed in the front panel 3.

The cassette stage 6 serving as the cassette feeding means is disposed at the rear side of the cassette insertion guide 10, and there is disposed a cassette loading mechanism for reciprocatively moving the cassette stage 6 in the directions of the arrows a, b and a',b' along a substantially L-shaped moving locus among the cassette insertion position $P_1$, the cassette retracting position $P_2$ at the rear side of the cassette insertion position and the cassette mount position $P_3$ at the lower side of the cassette retracting position. In the cassette loading operation, the tape cassette 1,2 is selectively inserted from the direction of the arrow a into the cassette stage 6. At this time, the type (size) of the tape cassette 1,2 is identified by the cassette identifying block 9 to switch the cassette insertion guide block 10.

That is, when a large-size tape cassette 2 is inserted, the large-size tape cassette 2 is identified by the cassette identifying member 9, and the cassette insertion guide 10 is downwardly escaped from the cassette insertion space together with the cassette identifying member 9. At the same time, the cassette identifying member 9 is locked at the lower side of the cassette insertion space by the lock lever (not shown). On the other hand, when a small-size tape cassette 1 is inserted, the small-size tape cassette 1 is guided onto the stage center at the center position in the right and left directions in the cassette stage 6 by the cassette insertion guide block 10, so that the small-size tape cassette 1 can be prevented from being erroneously inserted at a displaced position to the right or left side in the cassette stage 6 by the cassette insertion guide block 10.

After the cassette insertion, the cassette loading mechanism is actuated to horizontally retract the cassette stage 6 from the cassette insertion position $P_1$ to the cassette retract position $P_2$ in the direction of the arrow a, and then the cassette stage is vertically descended in the direction of the arrow b from the cassette retract position $P_2$ to the cassette mount position $P_3$, whereby the tape cassette 1,2 is horizontally loaded onto the plural cassette positioning pins while upwardly floated at the height $H_1$ from the bottom plate 6a of the cassette stage 6. At this time, the front lid 1A, 2A secured to the front end of the tape cassette 1,2 is upwardly opened in the direction of the arrow b'.

After the cassette loading operation, the magnetic tape in the tape cassette 1,2 is pulled out from the cassette by the tape loading mechanism, and loaded onto the rotating head drum (not shown) to perform information recording/reproducing operation. In the cassette eject operation after the recording/reproducing operation, the cassette stage 6 is vertically lifted up in the direction of the arrow b' from the cassette mount position $P_3$ to the cassette retract position $P_2$ by the counter operation to the cassette loading operation, and then horizontally moved in the direction of the arrow a' to the cassette insertion position $P_1$ so that the tape cassette 1,2 is discharged to the outside of the front panel 3 from the cassette insertion port 4 by cassette discharge means (not shown). At the same time, the lock of the lock lever is released by the cassette stage 6, and the cassette identifying member 9 and the cassette insertion guide 10 are escaped together into the cassette insertion space again.

However, in this prior art, the cassette identifying member 9, the cassette insertion guide 10 and the lock lever for locking these members at the lower side of the cassette insertion space are provided such places that an operator can easily see these members in the cassette insertion port 4. Therefore, the outward appearance of the cassette type recording/reproducing apparatus is remarkably bad. In addition, the operator can easily touch the cassette identifying member 9, the cassette insertion guide 10 and the lock lever from the outside of the cassette insertion port 4. Therefore, if the operator carelessly touches the lock lever under the cassette loading state to release the lock, the cassette identifying member 9 and the cassette insertion guide carelessly spring into the cassette insertion space. Therefore, at the subsequent cassette eject time, the tape cassette 1,2 collides against the cassette identifying member 9 and the cassette insertion guide 10, resulting in such a critical accident that that these members are damaged.

The present invention has been also implemented to overcome the above problem, and has further object to provide a cassette type recording/reproducing apparatus in which a cassette insertion guide and a cassette identifying member re allowed to be safely accommodated at the outside of a cassette insertion space under a cassette loading state.

There has been known another cassette type recording/reproducing apparatus such as a video tape recorder as shown in FIGS. 1G and 1H. This conventional cassette type recording/reproducing apparatus is suitably applicable to two types of tape cassettes 1 and 2 which are different in size ($D_1$, $D_2$). According to this type of cassette type recording/reproducing apparatus, each of these types of tape cassettes 1 and 2 is selectively inserted from the direction of the arrow a from the cassette insertion port of the front panel into the cassette stage serving as the cassette feeding means (not shown), and then the cassette state is moved from the cassette insertion position to the cassette mount position to selectively load each of the two types of tape cassettes 1 and 2 to the cassette mount position.

At this time, when the tape cassette 1,2 is inserted from the cassette insertion port into the cassette stage from the direction of the arrow a, the tape cassette 1,2 is guided by a cassette guide (not shown), and positioned at an insertion reference position $P_{12}$ on the stage center $P_{11}$ which is the center position of the cassette stage in the right and left directions. When the tape cassette 1, 2 is selectively loaded to the cassette mount position by the cassette stage, the tape cassette 1,2 is inserted from the upper side through a pair of positioning reference holes 14 common to the tape cassettes 1 and 2 into a pair of cassette positioning pins 8 which are common to the tape cassettes 1 and 2 and located at the cassette mount position, whereby the tape cassettes 1 and 2 are can be accurately positioned at the insertion reference position $P_{12}$ on the state center $P_{11}$ at the cassette mount position.

Accordingly, when each tape cassette 1,2 is selectively inserted from the direction of the arrow a from the cassette insertion port into the cassette stage, it is necessary to carry out insertion position detection to detect whether these tape cassettes 1,2 are accurately inserted to the insertion reference position $P_{12}$ on the stage center $P_{11}$ in the cassette stage. Further, it is necessary to carry out cassette type detection to detect the type (size) of the tape cassette 1,2 which is selectively inserted into the cassette stage and perform position control of a pair of right and left reel tables (not shown) at the cassette mount position. In the prior art, the insertion position detection and the cassette type detection of the tape cassette 1,2 are separately performed. Therefore, the number of parts and the number of fabricating steps are remarkably large, and thus the manufacturing cost is remarkably high.

In this case, two members being detected (hereinafter referred to as "detection targets") 15 and 16 which are located at different positions with respect to the common positioning reference holes 14 to the tape cassettes 1 and 2 are formed at the front ends 1a and 2a of the tape cassettes 1 and 2, and two detection members 18 and 19 are provided to a detection lever 17 which is secured to the cassette stage so as to be freely rotatable in the directions of the arrows e,e'. Here, two light reflection type optical sensors 22 and 23 are selectively switched on/off by two light reflection plates 20 and 21 which are provided to the detection lever 17 when these detection members 18 and 19 selectively detect the two detection targets 15 and 16, whereby the insertion position detection and the type detection of two types of tape cassettes 1 and 2 can be simultaneously performed.

In a case where only one detection lever 17 is used, when a large-size tape cassette 2 is inserted, the detection member 18 for detecting a small-size tape cassette 1 is spaced from the front end 2a of the large-size tape cassette 2, and thus a gap 24 can be formed between the detection member 18 and the front end 2a of the large-size tape cassette 2. Accordingly, in the loading and eject operations of the large-size tape cassette 2 to and from the cassette mount position, the front lid of the large-size tape cassette 2 can be smoothly opened/closed without interfering with the detection member 18. However, if two detection arms are used to detect the detection members 18 and 19 of the tape cassettes 1 and 2 separately from each other, when the large-size tape cassette 2 is inserted, the detection member of the detection lever for detecting the small-size tape cassette still suffers interference by the front end 2a of the large-size tape cassette 2, so that it obstructs the opening/closing operation of the front lid of the large-size tape cassette.

However, according to the system for selectively detecting the two detection targets of the two types of tape cassettes 1 and 2 by two detection members 18 and 19 provided to one detection lever 17, for example, when the large-size tape cassette 2 is inserted, an optical sensor 22 for detecting a small-size tape cassette is preferentially turned on in synchronism with the rotation of the detection lever 17 in the direction of the arrow e, and then an optical sensor for detecting the large-size tape cassette is turned on. Therefore, it is required that the small-size tape cassette detecting optical sensor 22 which is once turned on is switched from the On-state to the Off-state. However, the moving range of the detection lever 17 is limited, so that it is very difficult to adjust the switching operation of the small-size tape cassette detecting sensor 22 in the order of OFF-ON-OFF, and this adjustment work causes a remarkable increase in cost.

The present invention has been also implemented to solve the above problem, and has further object to provide a cassette type recording/reproducing apparatus in which both the insertion position detection and the cassette type detection of plural types of tape cassettes which are different in size can be accurately performed with a simple structure.

There has been further known another cassette type recording/reproducing apparatus such as a video tape recorder or the like as show in FIGS. 1I and 1J. In this prior art, two types of tape cassettes 1 and 2 which are different in size ($D_1$ and $D_2$) are properly used. According to this type of cassette type recording/reproducing apparatus, when these types of tape cassettes 1 and 2 are selectively inserted from the cassette insertion port of the front panel (not shown) into the cassette stage 6 serving as the cassette feeding means in the direction of the arrow a, these tape cassettes 1 and 2 are positioned in two axial directions at the insertion reference position $P_{12}$ on the stage center $P_{11}$ which is the center position in the right and left directions of the cassette stage 6.

In this case, with respect to the large-size tape cassette 2, it is positioned on the stage center $P_{11}$ by both right and left side plates 6b of the cassette stage 6, and it is positioned at the insertion reference position $P_{12}$ by a pair of right and left cassette stoppers 11 which are formed at the front end of the bottom plate 6a. On the other hand, with respect to the small-size tape cassette 1, it is positioned on the stage center $P_{11}$ by a pair of right and left cassette guides 12a of a pair of right and left stopper blocks 12 which are secured to the bottom plate 6a of the cassette stage 6, and it is positioned at the insertion reference position $P_{12}$ by a pair of right and left cassette stoppers 12b. If the pair of right and left stopper blocks 12 still projects onto the bottom plate 6a of the cassette stage 6, the large-size tape cassette 2 cannot be inserted into the cassette stage 6. Accordingly, in the prior art, the pair of right and left stopper blocks 12 are secured to the lower surface side of the bottom plate 6a of the cassette stage 6 by a pair of right and left leaf springs 13, and when the large-size tape cassette 2 is inserted into the cassette stage 6, the pair of right and left stopper blocks 12 are escaped to the lower side of the bottom plate 6a against the pair of right and left leaf springs 13.

The tape cassette 1,2 which is selectively inserted into the cassette stage 6 as described above is cramped on the bottom plate 6a of the cassette stage 6 by the cassette press member. After the cassette insertion, the cassette stage 6 is horizontally retracted from the cassette insertion position to the cassette retract position in the direction of the arrow a by the cassette loading mechanism (not shown), and then it is vertically descended to the cassette mount position, whereby the tape cassette 1,2 is loaded so as to be horizontally mounted on the plural cassette positioning pins (not shown) provided at the cassette mount position by the cassette pressing force of the cassette press member.

After the cassette loading operation, the magnetic tape of the tape cassette 1,2 is pulled out from the cassette by the tape loading mechanism, and loaded onto the rotating head drum (not shown) to perform information recording/reproducing operation. After the recording/reproducing operation, by the counter operation to the cassette loading operation, the cassette stage 6 is returned from the cassette mount position via the cassette retract position to the cassette insertion position, and finally the tape cassette 1,2 is discharged to the outside of the cassette insertion port.

However, in the prior art, the pair of right and left stopper blocks 12 for positioning the small-size tape cassette 1 at the insertion reference position $P_{12}$ on the stage center $P_{11}$ are secured to the bottom plate 6a of the cassette stage 6 by the pair of right and left leaf springs 13. Therefore, if the rigidity of the leaf springs 13 is low, the leaf springs 13 would be irregularly deformed due to distortion or the like if the small-size tape cassette 1 is carelessly strongly inserted into the cassette stage 6, and the pair of right and left cassette guides 12a or the cassette stoppers 12b are deviated from the normal position, so that the small-size tape cassette 1 cannot be accurately positioned to the insertion reference position $P_{12}$ on the stage center $P_{11}$. If the position of the tape cassette 1,2 in the cassette stage 6 is inaccurate, there would occur such a cassette loading miss that the tape cassette 1,2 cannot be accurately mounted on the plural cassette position positioning pins when the tape cassette 1,2 is loaded to the cassette mount position.

On the other hand, if the thickness or width of the pair of right and left leaf springs 13 is set to a large value to increase the rigidity thereof to an excessive value, a cassette push-up force of the stopper blocks 12 which corresponds to the reaction force of the leaf springs 13 is excessively large, and thus a strong force is needed to insert the large-size tape cassette 2 into the cassette stage 6, so that it is remarkably difficult to insert the large-size tape cassette 2. Accordingly, the insertion degree of the large-size tape cassette 2 is insufficient, and the large-size tape cassette 2 is loaded while it is not accurately inserted to the insertion reference position $P_{12}$, resulting in the cassette loading miss in which the large-size tape cassette 2 cannot accurately mounted on the plural cassette positioning pins of the cassette mount position.

The present invention has been also implemented to overcome the above problem, and has further object to provide a cassette type recording/reproducing apparatus in which any tape cassette can be easily inserted when plural types of tape cassettes which are different in size are selectively inserted into the cassette stage, and any tape cassette can be accurately positioned in the cassette stage.

SUMMARY OF THE INVENTION

A first object of the present invention is to provide a cassette type recording/reproducing apparatus which can beforehand prevent a cam driven lever from violently colliding against a cassette discharge lever in the course of a loading operation of a tape cassette.

A second object of the present invention is to provide a cassette type recording/reproducing apparatus in which the cassette insertion port of the front panel is opened/closed from the inside by an opening/closing lid which is freely rotatably secured to a cassette stage and moved together with a cassette stage, and which can prevent a cassette double insertion, etc. in a cassette loading operation in advance.

A third object of present invention is to provide a cassette type recording/reproducing apparatus which can prevent a tape cassette from being obliquely inserted into a cassette stage in advance.

A fourth object of the present invention is to provide a cassette type recording/reproducing apparatus in which a cassette insertion guide and a cassette identifying member are allowed to be safely accommodated at the outside of a cassette insertion space under a cassette loading state.

A fifth object of the present invention is to provide a cassette type recording/reproducing apparatus in which both the insertion position detection and the cassette type detection of plural types of tape cassettes which are different in size can be accurately performed with a simple structure.

A sixth object of the present invention is to provide a cassette type recording/reproducing apparatus in which any tape cassette can be easily inserted when plural types of tape cassettes which are different in size are selectively inserted into the cassette stage, and any tape cassette can be accurately positioned in the cassette stage.

In order to attain the first object, according to a first aspect of the present invention, a cassette type recording/reproducing apparatus according to the present invention includes a cassette insertion port formed on a front panel, a cassette stage which is reciprocatively moved between a cassette insertion position at which a tape cassette is inserted from the cassette insertion port, and a cassette mount position at which the inserted tape cassette is subjected to recording/reproducing operation, a cassette discharge lever which is freely rotationally secured to the cassette stage, and pushed and moved by the cassette which is inserted through the cassette insertion port into the cassette stage, a cam driven lever which is freely rotationally secured to the cassette stage, and serves to rotationally drive said cassette discharge lever in a cassette discharging direction, a cam which is disposed at a fixed position on a movement locus of the cam driven which is moved together with the cassette stage, and kicks the cam driven lever during the cassette stage being moved from the cassette mount position to the cassette insertion position, whereby the cassette discharge lever is rotationally driven in the cassette discharge direction by the cam driven lever, and control means for positionally regulating the cam driven lever in a fixed range with some degree of freedom at the middle position in a swing range in which the cam driven lever is rotated by the cam.

In order to attain the second object of the present invention, according to a second aspect of the present invention, a cassette type recording/reproducing apparatus includes a cassette insertion port formed on a front panel, a cassette stage which is reciprocatively moved between a cassette insertion position at which a tape cassette is inserted from the cassette insertion port, and a cassette mount position at which the inserted tape cassette is subjected to recording/reproducing operation, an opening/closing lid which is freely rotatably secured to the cassette stage so as to be movable together with the cassette stage, closes the cassette insertion port from the inside thereof through the movement of the cassette stage to a cassette insertion position, and is pushed and opened by a tape cassette which is inserted from the cassette insertion port into the cassette stage, and a double insertion preventing lid which is evacuated to a lid closing position where the cassette insertion port is opened when the cassette stage is moved to the cassette insertion position, and moved to a lid closing position where the cassette insertion port is closed from the inside thereof when the cassette stage is moved to the cassette mount position.

In order to attain the third object of the present invention, according to a third aspect of the present invention, a cassette type recording/reproducing apparatus includes a cassette insertion port formed on a front panel, a cassette stage which is reciprocatively moved between a cassette insertion position at which a tape cassette is inserted from the cassette insertion port, and a cassette mount position at which the inserted tape cassette is subjected to recording/reproducing operation, a cassette press member which is secured to the cassette stage and adapted to press a tape cassette from the upper side thereof at a position which is nearer to a cassette discharge direction side than the front lid of the tape cassette, the tape cassette being inserted from the cassette insertion port into the cassette stage, a cassette slant insertion preventing stopper which is secured to the cassette stage and adapted to relatively press a front lid portion of a tape cassette from the upper side thereof, the tape cassette being inserted from the cassette insertion port into the cassette stage, whereby the tape cassette is prevented from being obliquely inserted in a forward and upward direction into the cassette stage, and a cassette slant insertion preventing mechanism for allowing the cassette slant insertion preventing stopper to the upper side of the cassette stage when the cassette stage is moved from the cassette insertion port to the cassette mount position.

In order to attain the fourth object of the present invention, according to a fourth aspect of the present invention, a cassette type recording/reproducing apparatus includes plural types of tape cassettes which are different in size from one another, a cassette insertion port formed in a front panel, a cassette stage which is reciprocatively moved between a cassette insertion position at which the plural types of tape cassettes are selectively inserted from the cassette insertion port, and a cassette mount position at which the inserted plural tape cassettes are subjected to recording/reproducing operation, a cassette insertion guide which is disposed inside the cassette insertion port, and adapted to regulate the insertion position of a small-size tape cassette into the cassette stage, a cassette identifying member which is disposed inside the cassette insertion port, and is driven by a large-size tape cassette to allow the cassette insertion guide to escape out of a cassette insertion space, and control means for moving the cassette insertion guide and the cassette identifying member to an operation position in the cassette insertion space when the cassette stage is moved to the cassette insertion position, and accommodating the cassette insertion guide and the cassette identifying member at an accommodation position out of the cassette insertion space when the cassette stage is moved from the cassette insertion position to a cassette mount position side.

In order to attain the fifth object of the present invention, according to a fifth aspect of the present invention, a cassette type recording/reproducing apparatus includes plural types of tape cassettes which are different in size from one another, a cassette insertion port formed in a front panel, a cassette stage which is reciprocatively moved between a cassette insertion position at which the plural types of tape cassettes are selectively inserted from the cassette insertion port, and a cassette mount position at which the inserted plural tape cassettes are subjected to recording/reproducing operation, detection means for simultaneously detecting the insertion position and the type of the plural types of tape cassettes which are selectively inserted from the cassette insertion port into the cassette stage, first and second detection targets which are formed at different positions with respect to positioning reference holes which are common to the plural types of tape cassettes, the first and second detection targets constituting the detection means, a double lever mechanism having first and second detection levers which are freely rotatably secured to the cassette stage, and are rotationally driven by the first and second detection targets, the double lever mechanism constituting the detection means, and first and second optical sensors which are secured to the cassette stage, and adapted to detect the positions of the first and second detection levers, the first and second optical sensors constituting the detection means, the first detection lever comprising a single operating lever, and the second detection lever comprising a projection for pushing the first detection lever and an optical shutter for inhibiting a detection operation of the first optical sensor.

In order to attain the sixth object of the present invention, according to a sixth aspect of the present invention, a cassette type recording/reproducing apparatus includes plural types of tape cassettes which are different in size from one another, a cassette insertion port formed in a front panel, a cassette stage which is reciprocatively moved between a cassette insertion position at which the plural types of tape cassettes are selectively inserted from the cassette insertion port, and a cassette mount position at which the inserted plural tape cassettes are subjected to recording/reproducing operation, a pair of right and left stopper blocks each having a cassette guide and a cassette stopper for positioning to an insertion reference position on a stage center a small-size tape cassette of the plural types of tape cassettes which are selectively inserted from the cassette insertion port into the cassette stage, a pair of right and left supporting pins through which the pair of right and left stopper blocks are freely rotatably secured to the cassette stage so that the stopper blocks can freely get into and out of the cassette stage, and a pair of right and left rotational urging means for moving the pair of right and left stopper blocks into the cassette stage when a small-size tape cassette is inserted from the cassette insertion port into the cassette stage, and letting the pair of right and left stopper blocks escape out of the cassette stage when a large-size tape cassette is inserted from the cassette insertion port into the cassette stage.

BRIEF DESCRIPTION OF THE DRAWINGS

FIGS. 1A to 1J show cassette discharging mechanisms of conventional cassette type recording/reproducing apparatus;

FIGS. 2A to 2J are diagrams showing the subject matter of the present invention when the present invention is applied to a cassette type recording/reproducing apparatus such as a video cassette recorder or the like;

DETAILED DESCRIPTION OF THE PREFERRED EMBODIMENTS

Figure 1D:
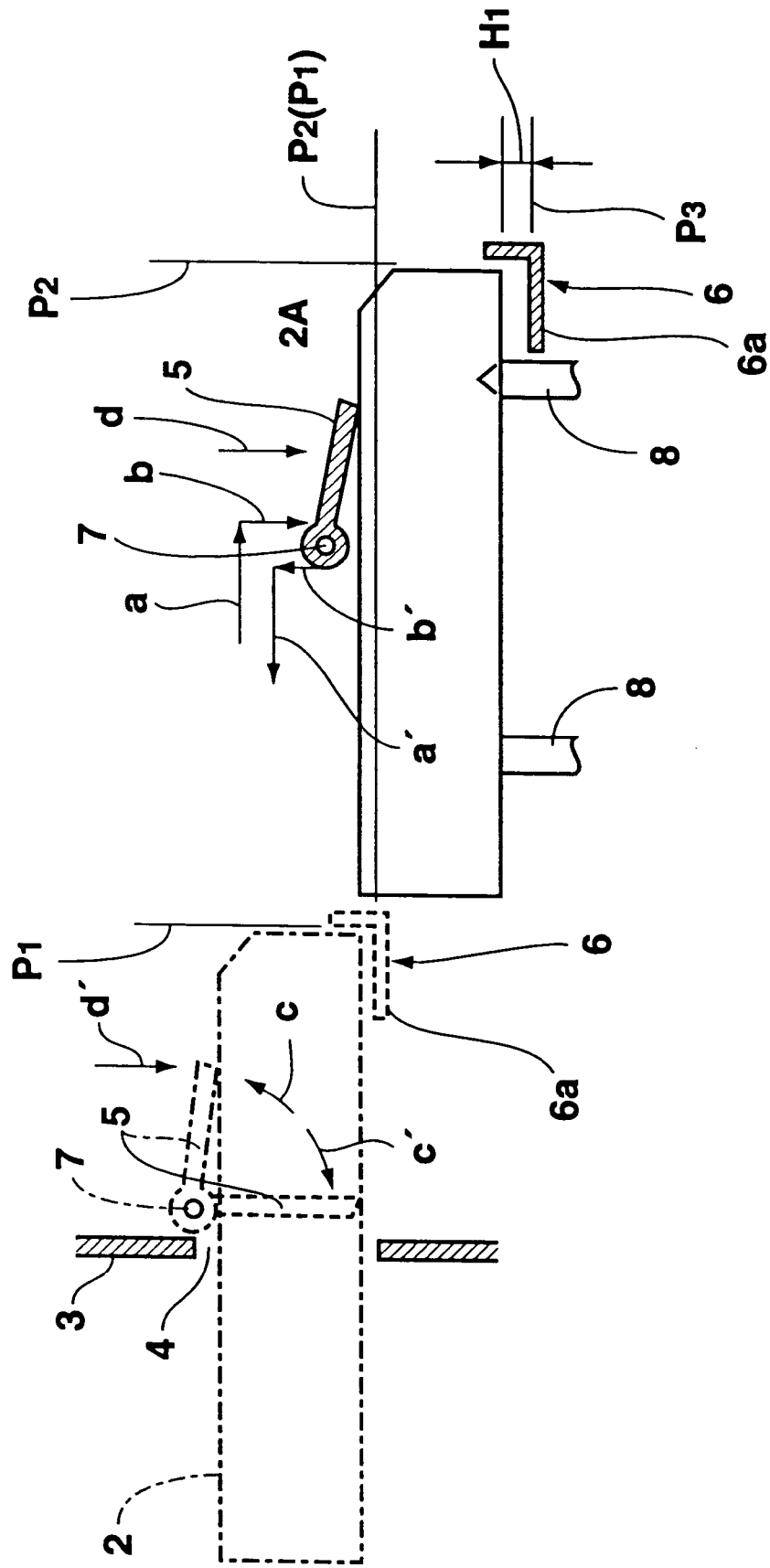
Figure 1E:
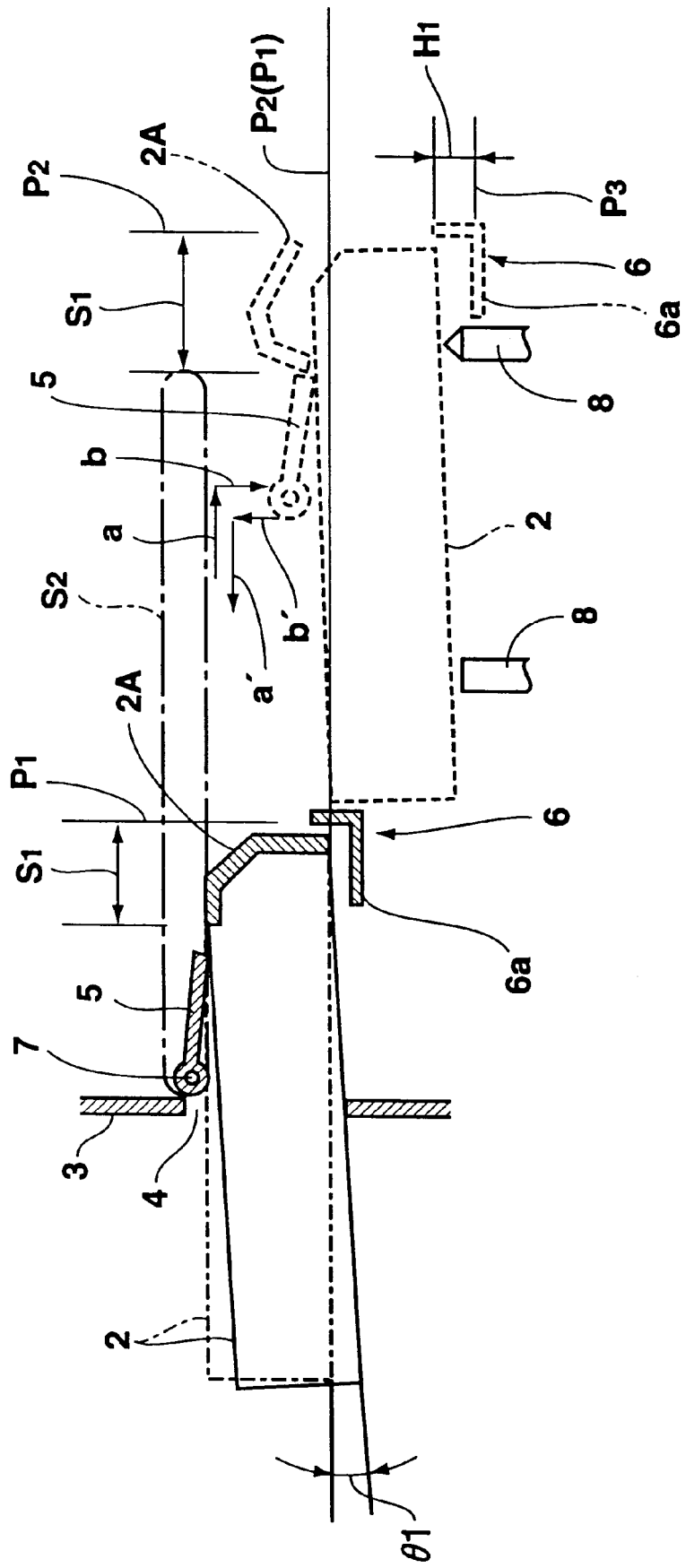
Figure 1F:
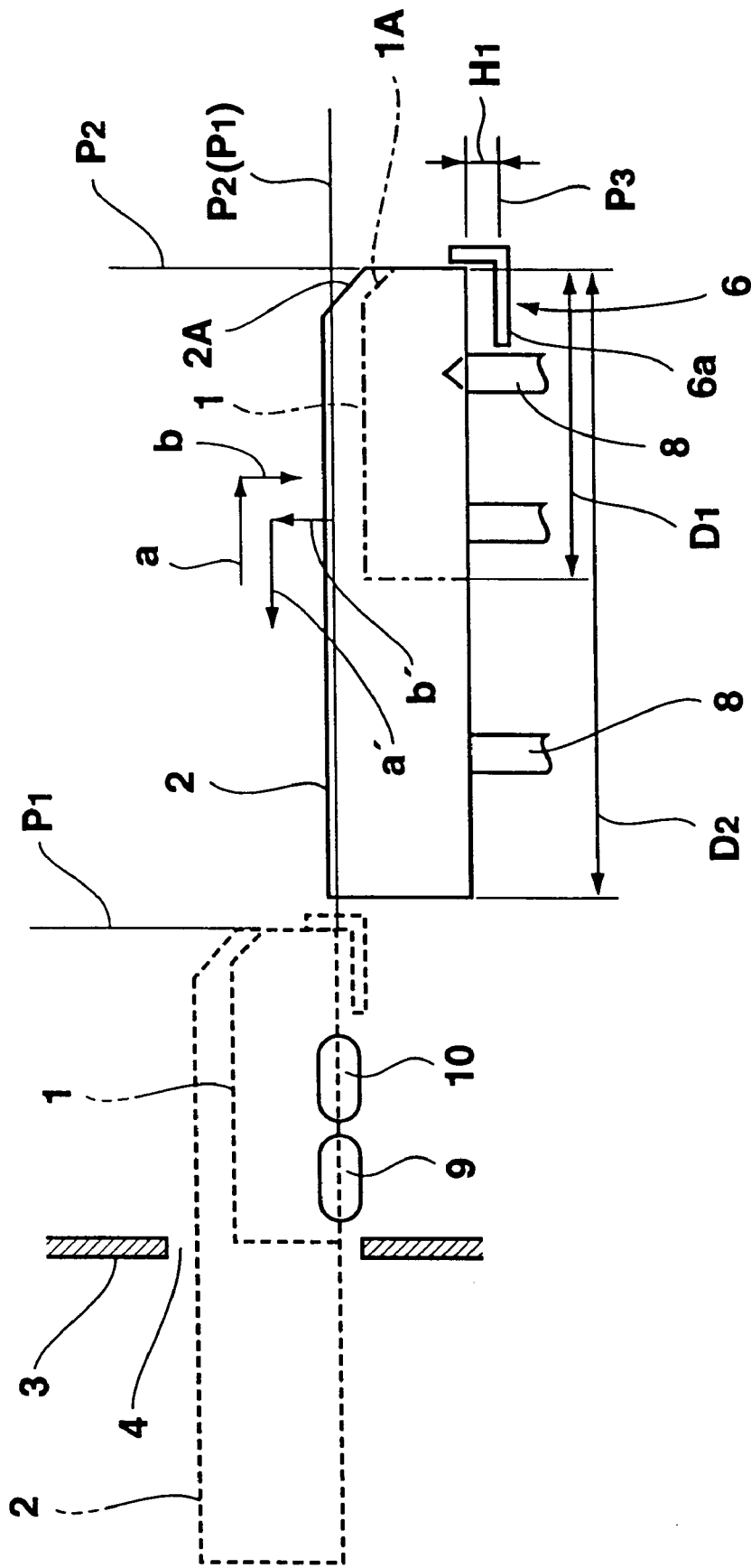
Figure 1G:
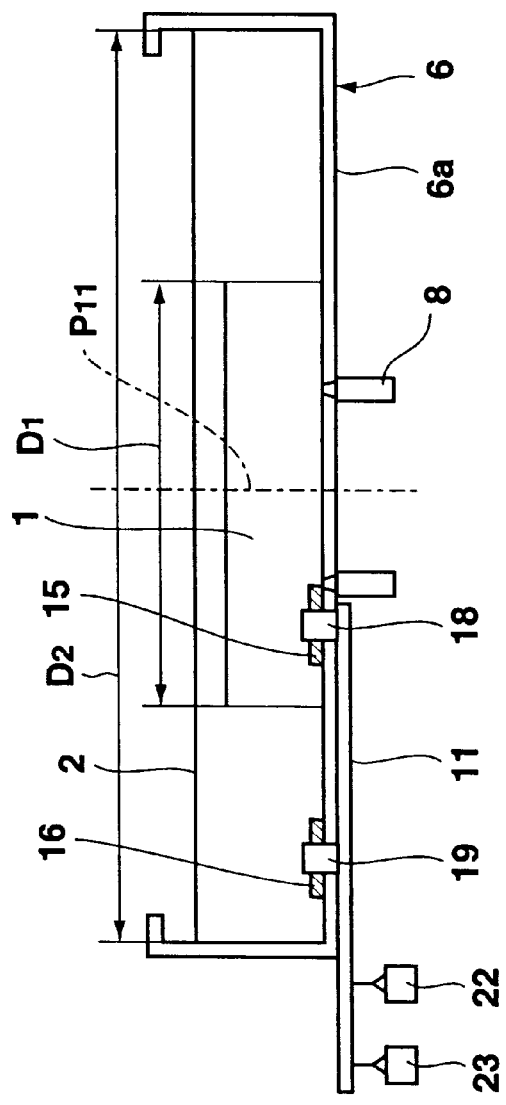
Figure 1H:
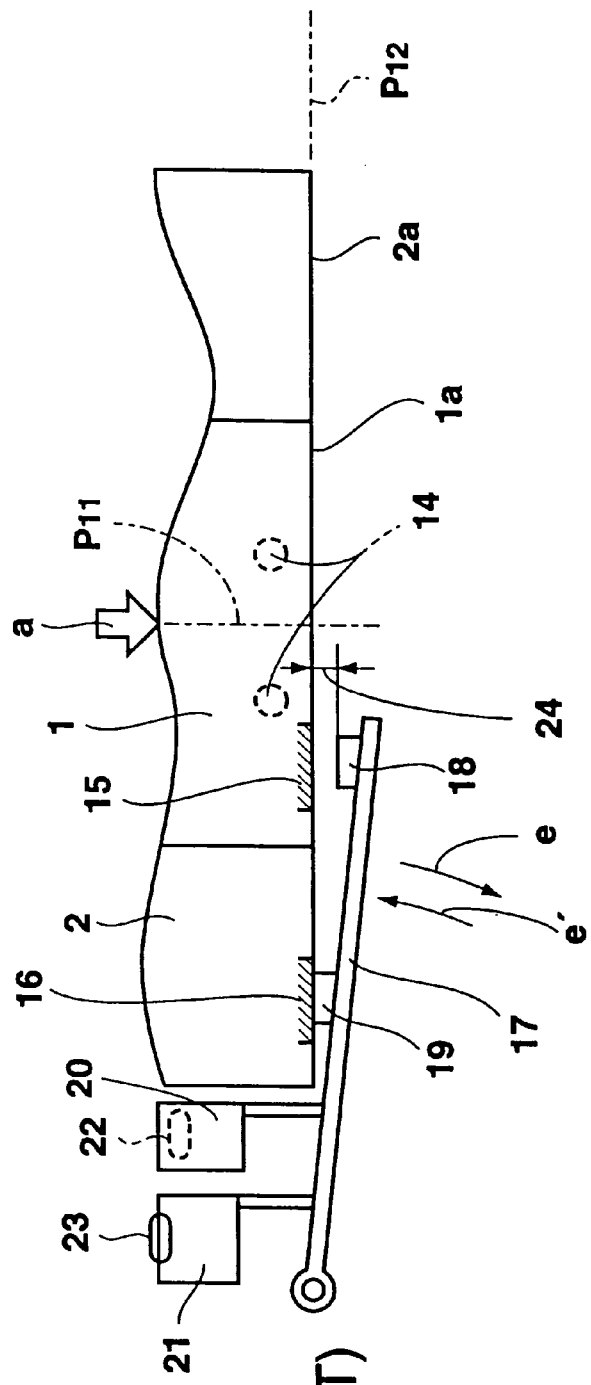
Figure 1I:
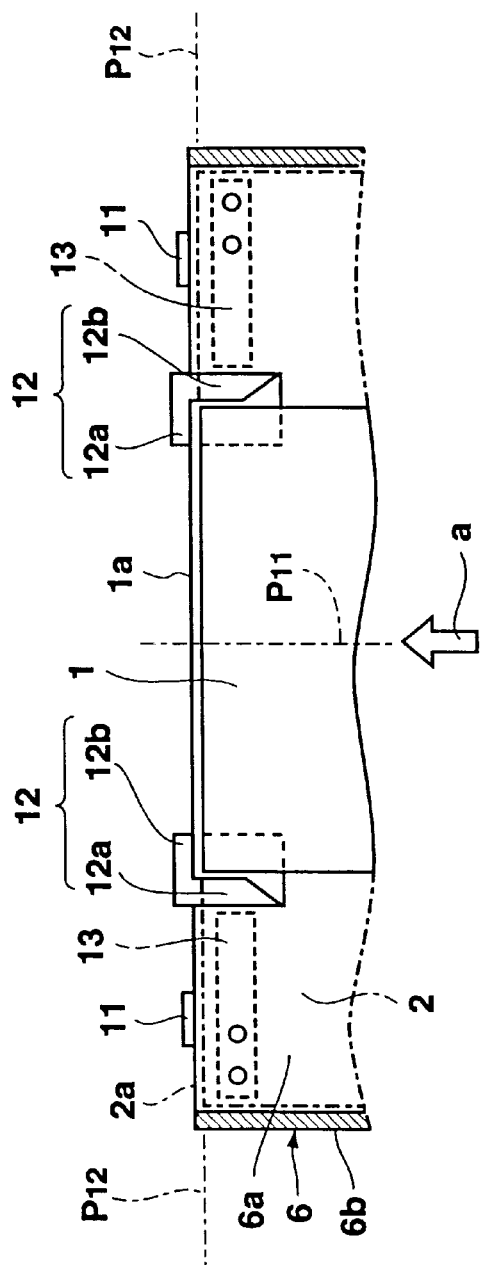
Figure 1J:
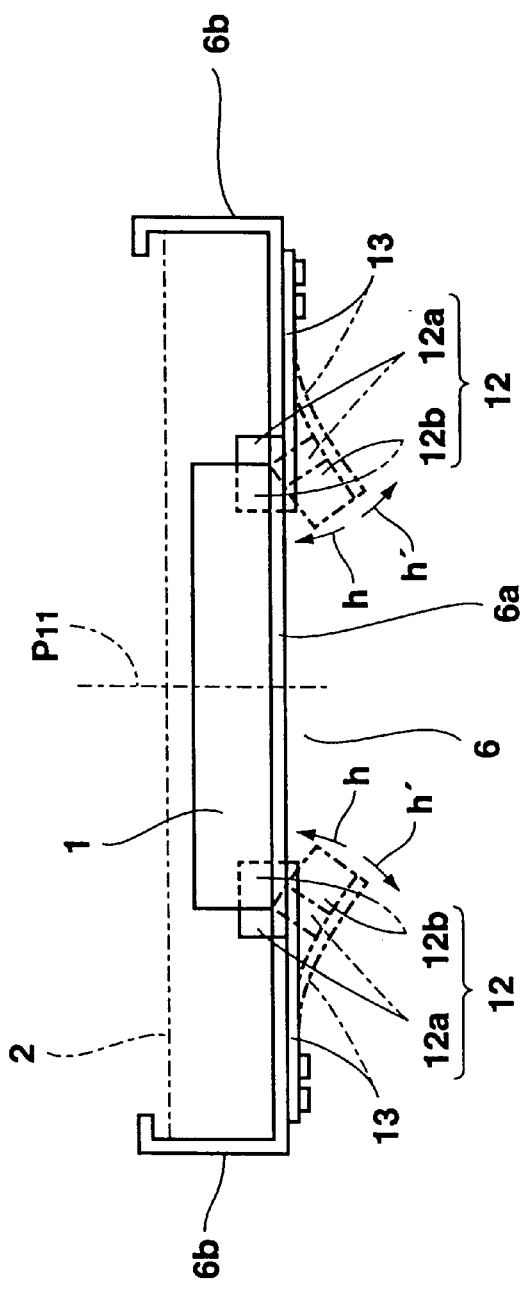

Preferred embodiments in which the present invention is applied to a cassette type recording/reproducing apparatus such as a video cassette recorder or the like will be described with reference to FIGS. 2 to 47J. The same structural portions as FIGS. 1A to 1J are represented by the same reference numerals, and the duplicative description thereof is omitted.

Description of the subject matter of the present invention

First, the subject matter of the present invention will be described with reference to FIG. 2.

In a cassette type recording/reproducing apparatus of the present invention, a tape cassette 1 is inserted in a direction of an arrow a into a cassette stage 6 through a cassette insertion port of a front panel as described later, and the tape cassette 1 is reciprocatively moved between a cassette insertion position and a cassette mount position as described later. A cassette discharge lever 51 which is pushed by the tape cassette 1 which is inserted through the cassette insertion port into the cassette stage 6 in the direction of the arrow a, is secured to a bottom plate 6a of the cassette stage 6 through a support pin 142 so as to be freely rotatable in the directions of arrows e,e' within a horizontal plane. A cam driven lever 28 which serves to rotationally drive the cassette discharge lever 51 in the direction of the arrow e' which corresponds to a cassette discharge direction is secured to a side plate 6b of the cassette stage 6 through a support pin 29 so as to be freely rotatable in the directions of arrows g,g' within a vertical plane. A cam 31 which is disposed at a fixed position which is overlapped with a movement locus of the cam driven lever 28 which is moved together with the cassette stage 6, is secured to a chassis side plate 32. There is further provided control means 50 for positionally regulating the cam driven lever 28 within a fixed range $\theta_{12}$ at the middle position of a swing range $\theta_{11}$ in which the cam driven lever 28 is rotated by the cam 31.

Figure 2A:
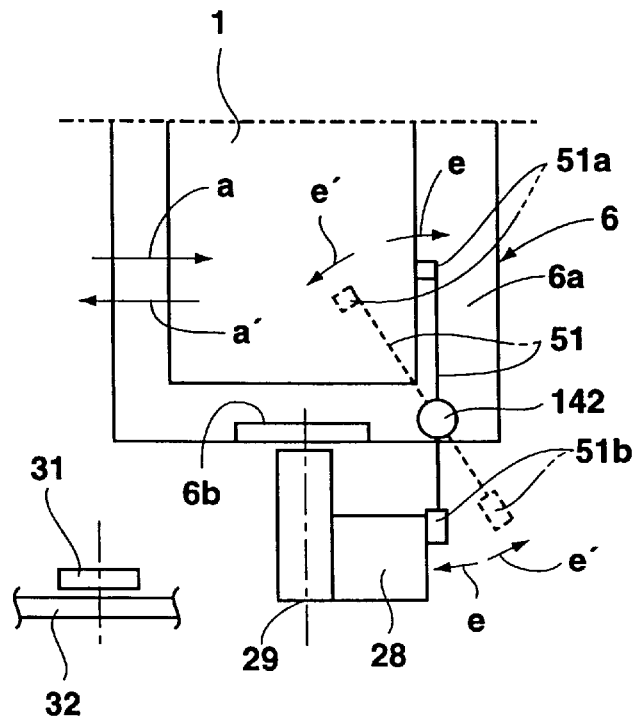

Accordingly, in the cassette type recording/reproducing apparatus of the present invention, as shown in FIG. 2A, when the tape cassette 1 is inserted in the direction of the arrow a into the cassette stage 6 through the cassette insertion port in a cassette loading operation, one end 51a of the cassette discharge lever 51 is pushed by the direction of the arrow e by the tape cassette 1, and the cassette discharge lever 51 is rotated in the direction of the arrow e. The tape cassette 1 is loaded from the cassette insertion position to the cassette mount position in the direction of the arrow a by the cassette stage 6, and in the course of the cassette loading operation, the lower end 28a of the cam driven lever 28 is once rotated in the direction of an arrow g by the cam 31 as shown in FIG. 2C. At the instantaneous time when the cam driven lever 28 gets over the cam 31 in the direction of the arrow a, the cam driven lever 28 is rotated and returned in the direction of the arrow g' by the control means 50. At this time, the lower end 28a of the cam driven lever 28 is stopped at such as a position as to keep a gap interval 27 from the other end 51b of the cassette discharge lever 51, whereby the lower end 28a of the cam driven lever 28 is prevented from coming into forcible contact with the other end 51b of the cassette discharge lever 51 from the direction of the arrow g'.

Accordingly, it can be prevented in advance that in the course of the cassette loading operation, the cam driven lever 28 is violently collided from the direction of the arrow g' by the other end 51b of the cassette discharge lever 51, so that an uncomfortable collision sound "click sound" occurs. Further, there can be prevented in advance such a cassette loading miss that the tape cassette 1 in the cassette stage 6 is pushed in the direction of the arrow e' by the one end 51a of the cassette discharge lever 51 due to the impingement at the collision time and displaced in the direction of the arrow a', so that the tape cassette 1 are not accurately engaged with plural cassette positioning pins (not shown) at the cassette mount position. In order to prevent the positional displacement of the tape cassette 1 in the cassette stage 6 as described above, it is unnecessary to take a special countermeasure to increase the clamp force to the tape cassette 1 in the cassette stage 6, and the clamp force can be sufficiently weakened.

Figure 2B:
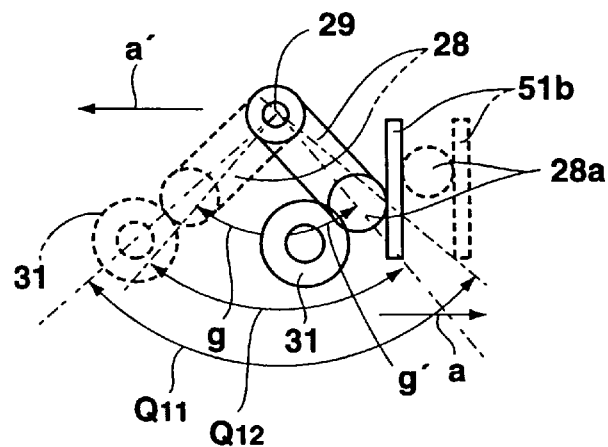
Figure 2C:
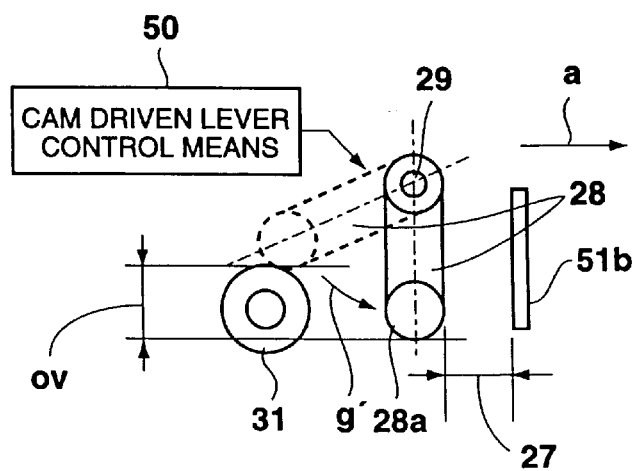
Figure 2E:
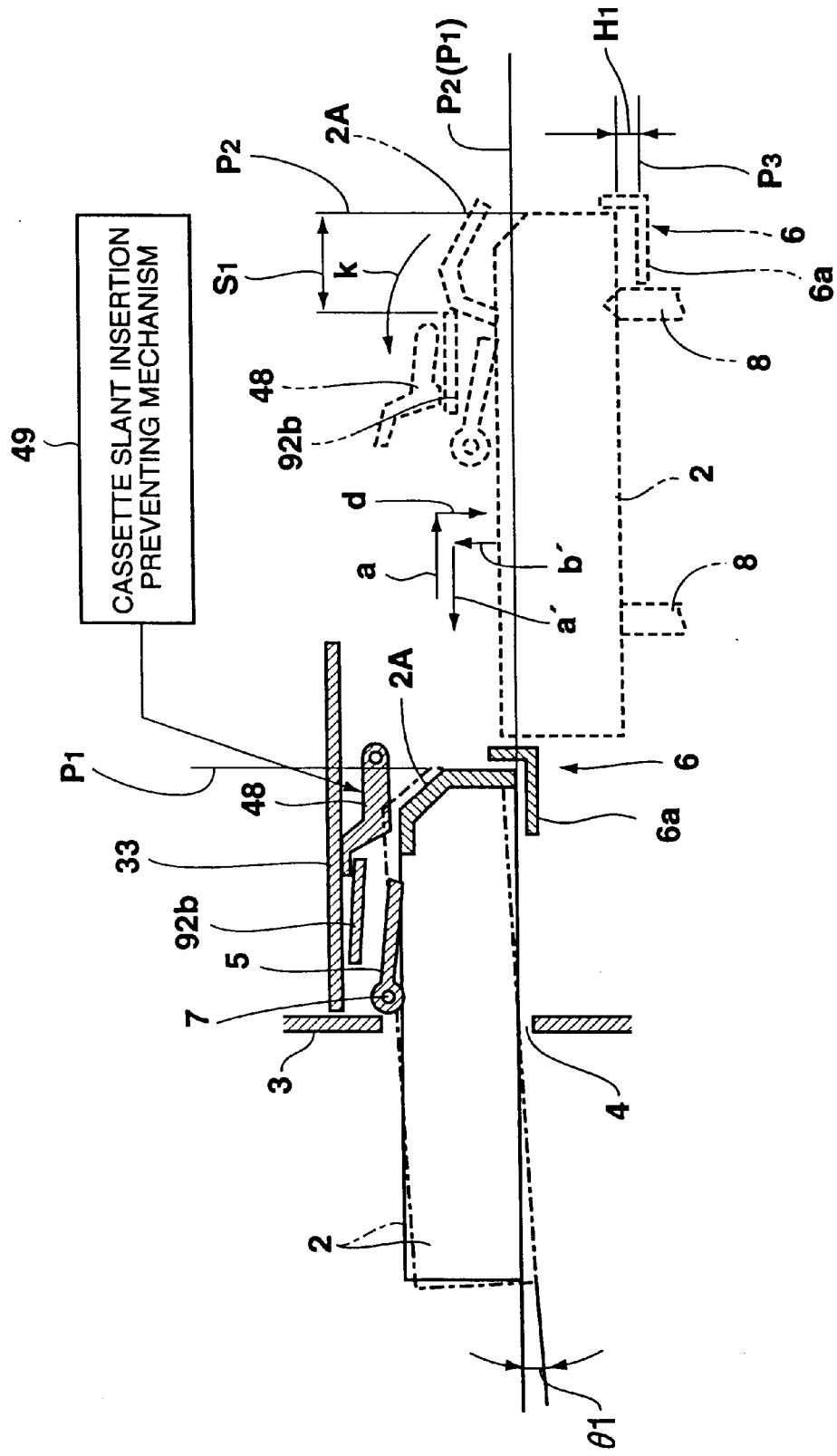
Figure 2F:
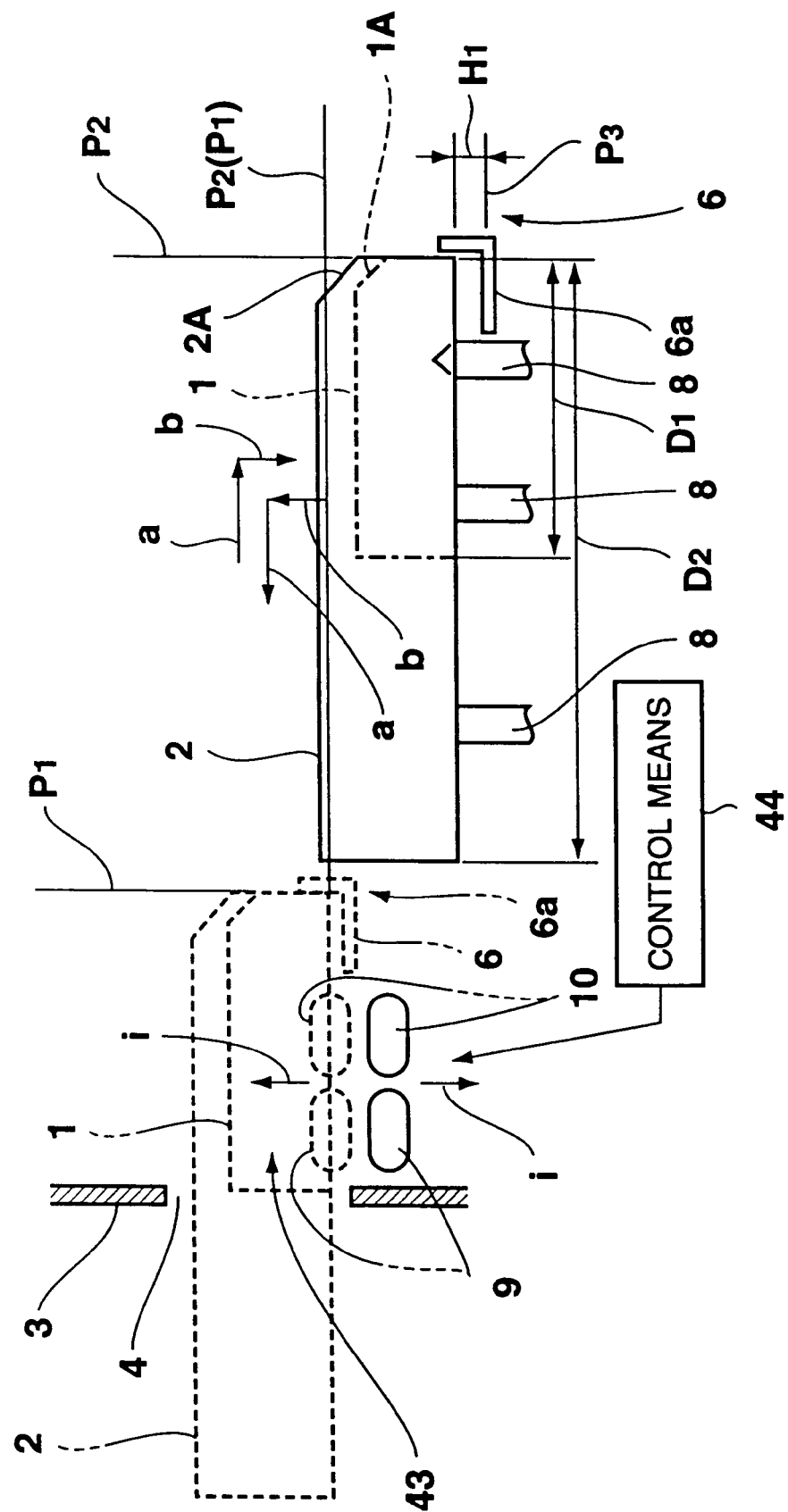
Figure 2G:
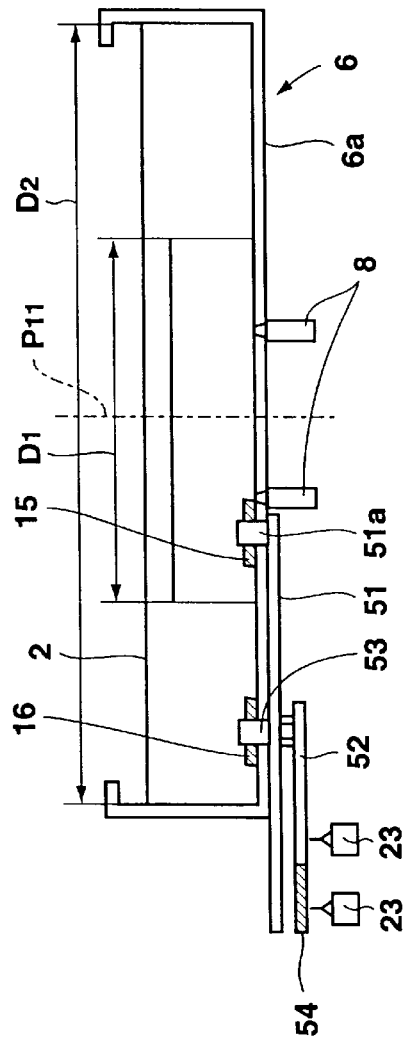
Figure 2H:
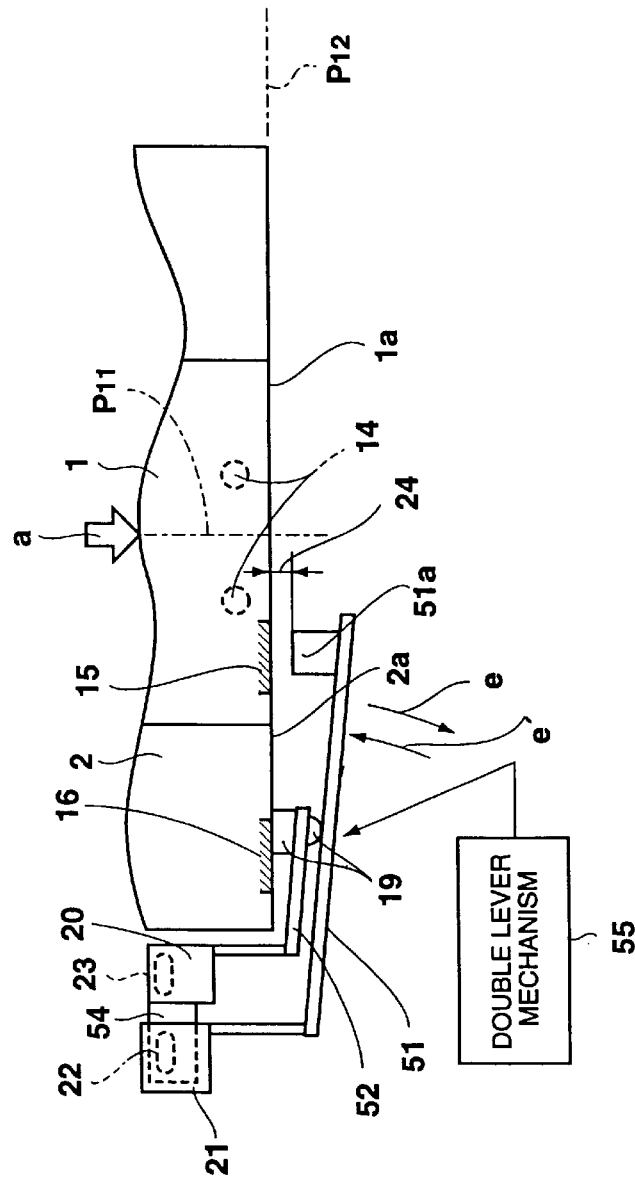
Figure 2I:
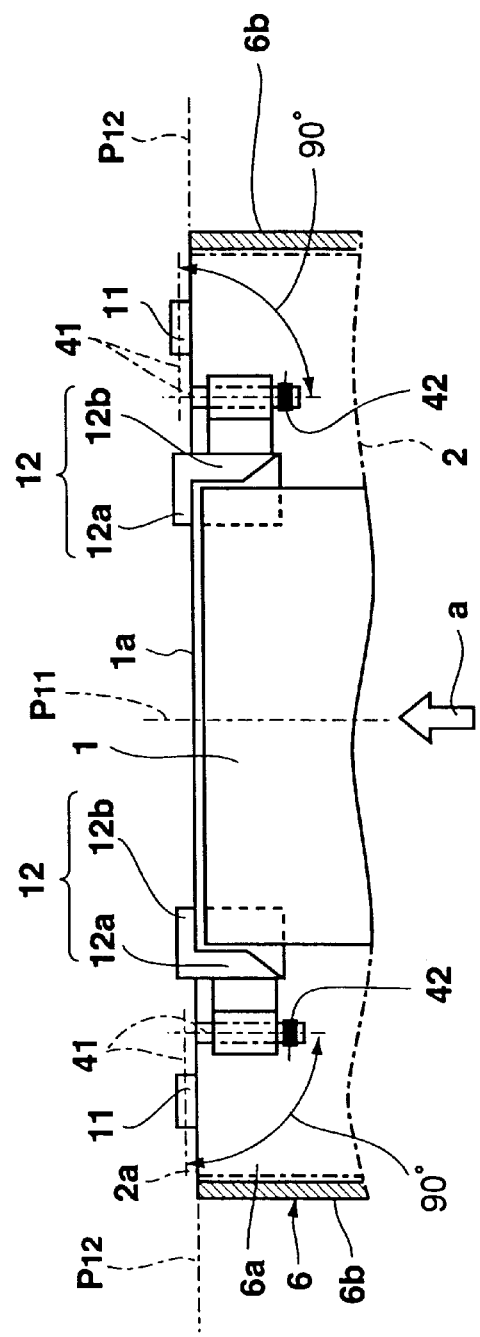
Figure 2J:
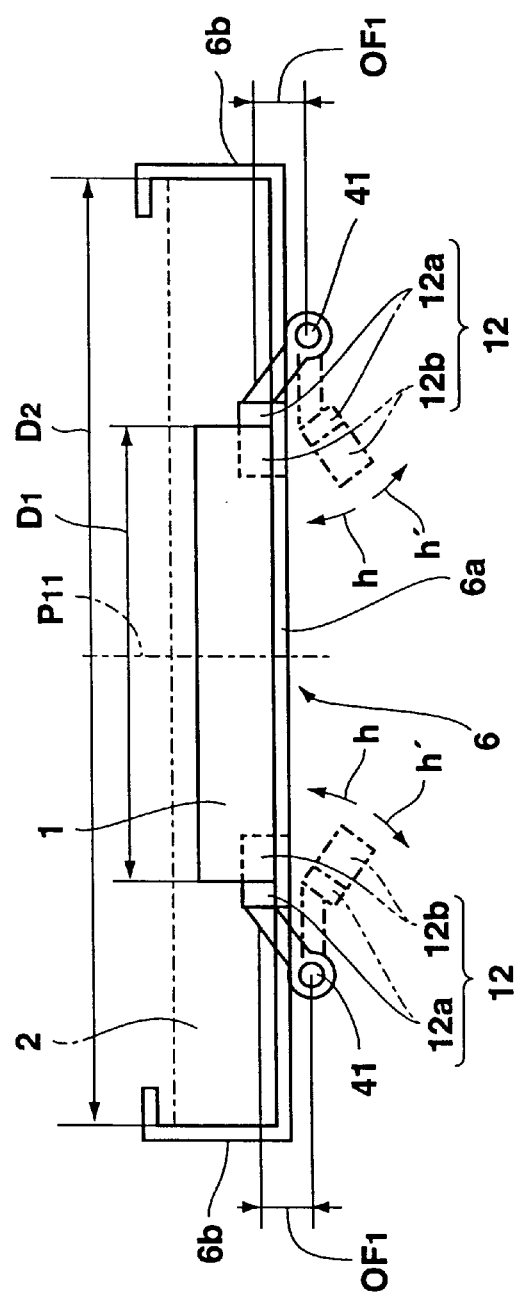

In the eject operation of the tape cassette 1 from the cassette mount position to the cassette insertion position in the direction of the arrow a' by the cassette stage 6, the cam driven lever 28 is relatively kicked from the direction of the arrow a by the cam 31 as shown in FIG. 2B, whereby the cam driven lever 28 is rotationally driven in the direction of the arrow g'. As shown in FIG. 2A, the other end 51b of the cassette discharge lever 51 is pushed in the direction of the arrow f' by the cam driven lever 28, and the tape cassette 1 in the cassette stage 6 is pushed in the direction of the arrow a' by the one end 51a of the cassette discharge lever 51 to violently push the tape cassette 1 to the outside of the cassette insertion port in the direction of the arrow a', thereby facilitating a pull-out operation of the tape cassette at the outside of the front panel. At this time, the clamp force to the tape cassette 1 in the cassette stage 6 can be sufficiently weakened. Accordingly, the tape cassette 1 can be easily inserted into the cassette stage 6 with a weak force in a cassette insertion operation, also the tape cassette 1 can be easily discharged with a weak force when the tape cassette 1 is discharged in the direction of the arrow a' by the cassette discharge lever 51 in the eject operation, and the rigidity of the cassette discharge lever 51 and the cam driven lever 28 can be sufficiently reduced.

Embodiments of the present invention

Next, the preferred embodiments according to the present invention will be described with reference to FIGS. 3 to 47J.

Description of Two types of tape cassettes

Figure 3:
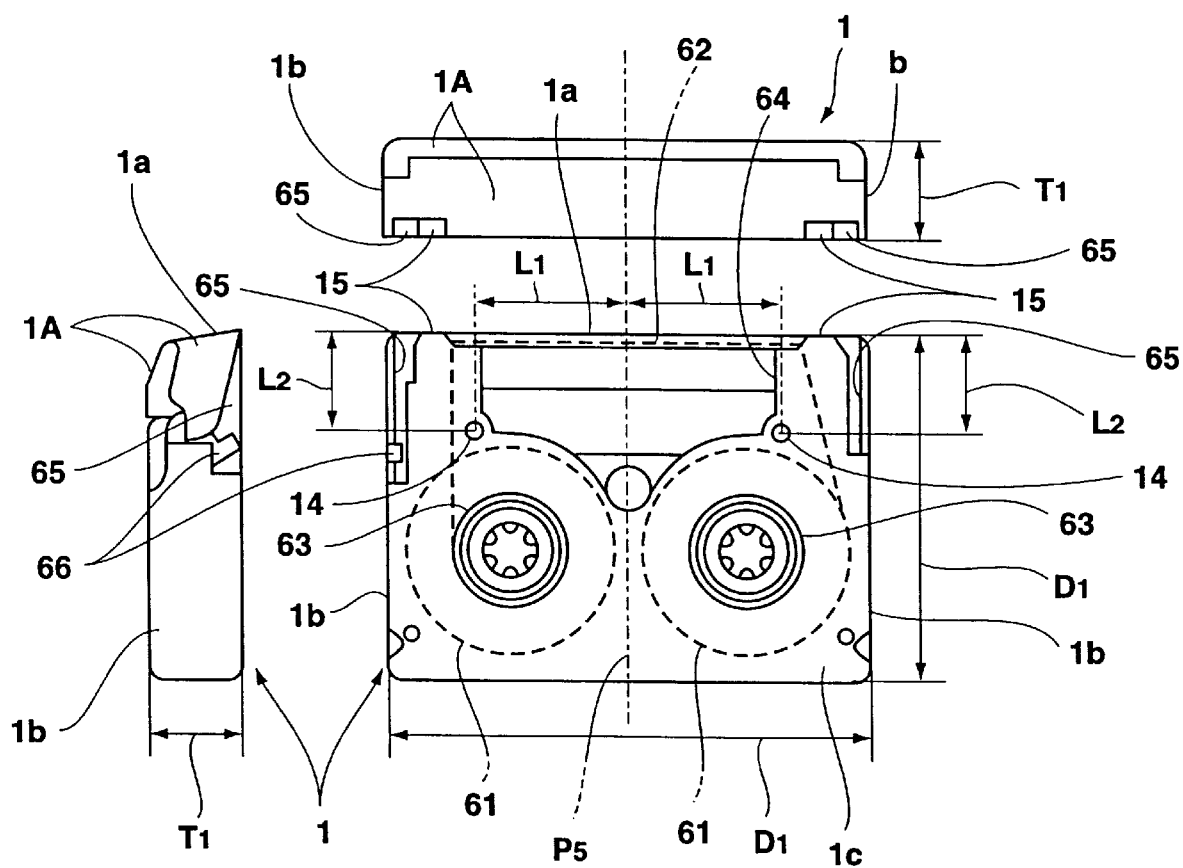
FIG. 3 shows a small-size tape cassette in bottom, front and side views.
Figure 4:
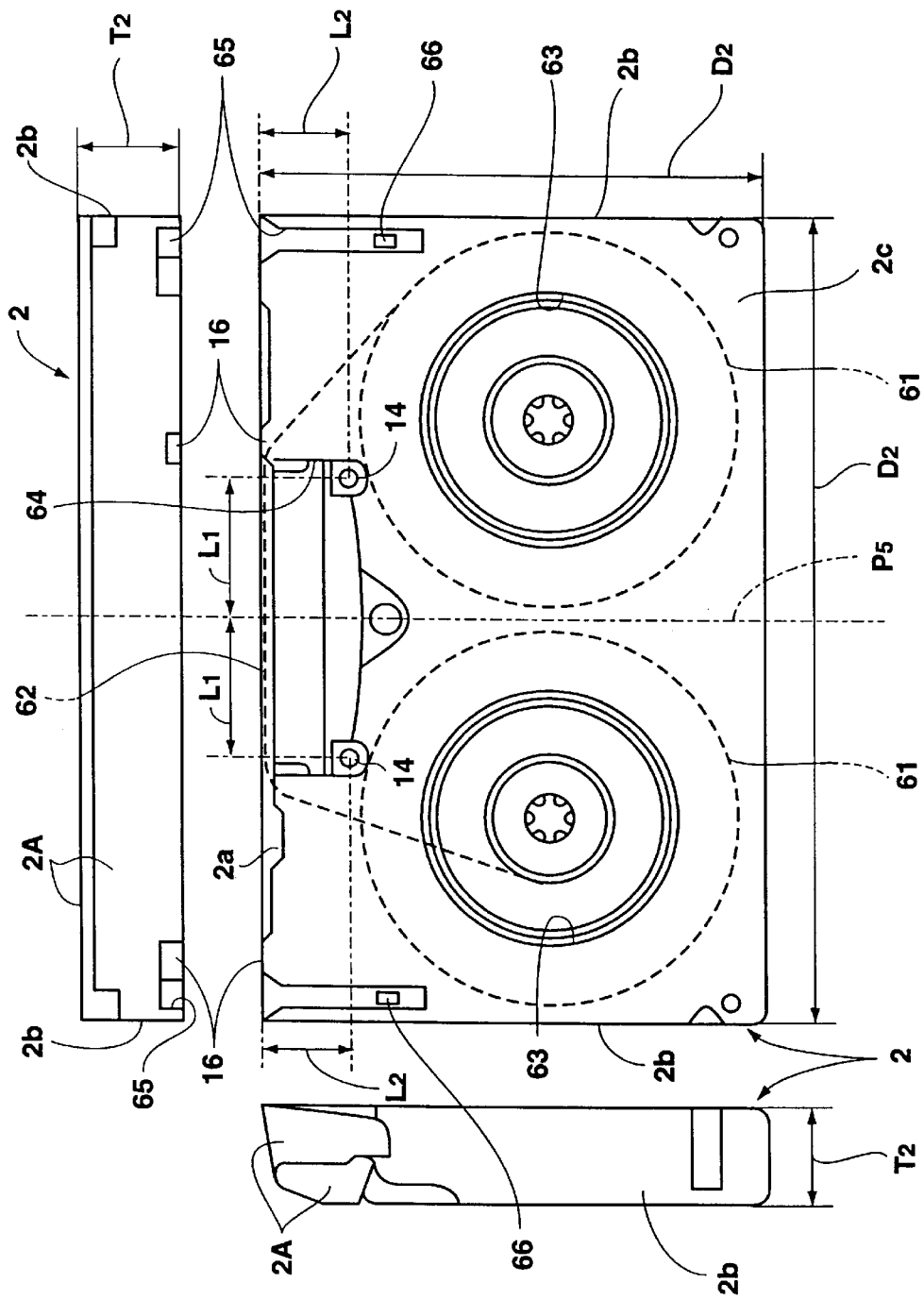
FIG. 4 shows a large-size tape cassette in bottom, front and side views.
Figure 5:
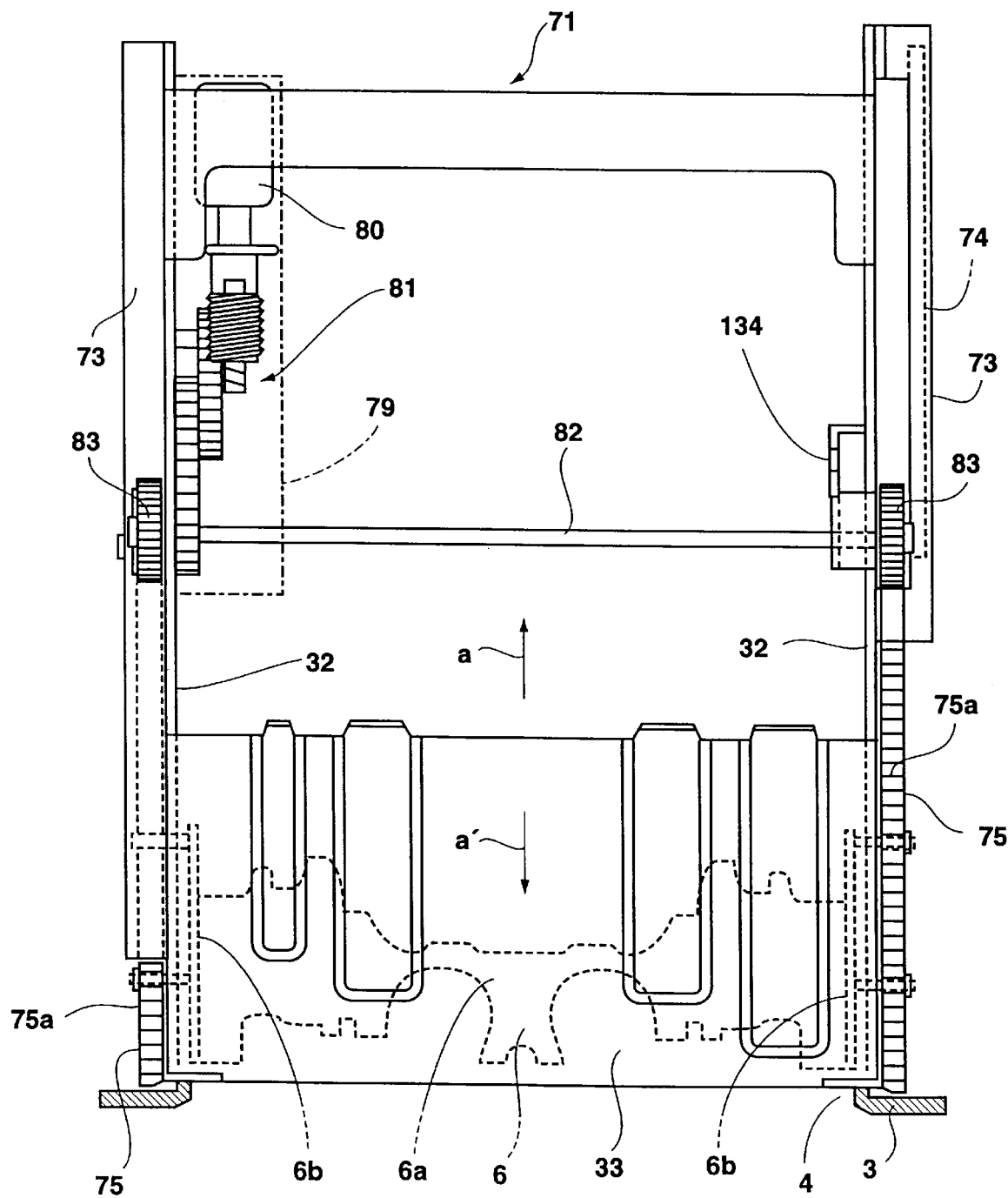
FIG. 5 is a plan view showing a cassette loading mechanism.

As shown in FIGS. 3 and 4, a magnetic tape 62 which are wound around a pair of right and left tape reels 61 having different diameters is accommodated in each of small-size and large-size tape cassettes 1, 2 which are different in size (the depth in the forward and rearward direction and the width in the right and left direction) $D_1$ and $D_2$ and in thickness $T_1$, $T_2$. Each of these magnetic tapes 62 is passed along the inner side of the front lid 1A,2A having an inner-and-outer dual structure which is secured to the front end 1a, 2a of the small-size and large-size tape cassettes 1, 2. Further, a cut-out 64 having substantially the same shape is formed at the center portion of the front end 1a, 2a side of the bottom plate 1c, 2c in which a pair of right and left reel table insertion holes 63 of the small-size and large-size tape cassettes 1, 2 are formed.

A pair of right and left positioning reference holes 14 are formed at both the right and left side positions of the cut-out 64 of the bottom plate 1c, 2 of the small-size and large-size tape cassettes 1, 2, and it is commonly used for the small-size and large-size tape cassettes 1,2. That is, the pair of right and left positioning reference holes 14 are allocated at the right and left sides at the same distance $L_1$ from the cassette center $P_5$ and they are formed at the rearward position from the front end 1a, 2a at the same dimension $L_2$. A pair of right and left slits 65 along both side surfaces 1b,2b of the small-size and large-size tape cassettes 1,2 which extend from the front lid 1A,2A to the bottom plate 1c, 2c are formed in parallel to the cassette center $P_5$ at both the right and left end sides of the small-size and large-size tape cassettes 1, 2. A lock lever 66 of the front lid 1A,2A is disposed at the rear side from the slits 65. In the small-size tape cassette 1, the lock lever 66 is disposed in only one slit 65. Further, a pair of right and left detection-target portions 15, 16 which are used to simultaneously perform the detection of an insertion position in the cassette stage 6 and the detection of a type (size) as described above are formed on the front end surface of the bottom plate 1c,2c which is the front end 1a, 2a of the small-size and large-size tape cassettes 1, 2. Of the pair of the right and left detection-target portions 15, 16, the detection-target portions 15, 16 at the right side of FIGS. 3 and 4 are formed at the common position to the reference hole 14, and the detection-target portions 15, 16 at the left side are formed at different positions with respect to the reference hole 14.

Description of Cassette stage

As shown in FIGS. 23 to 27, the cassette stage 6 is formed of a metal plate or the like, and it is constructed to have an upwardly opened and substantially U-shaped section by a horizontal bottom plate 6a, and a pair of right and left side plates 6b erecting vertically and upwardly from both the right and left ends of the bottom plate 6a. A pair of right and left cassette stoppers 11 for the large-size tape cassette 2 are integrally formed at both the right and left sides of the rear end of the bottom plate 6a (the end portion in the arrow a direction). Further, on the bottom plate 6a are fixed a pair of stopper blocks 12 for guiding the small-size tape cassette 1 onto the stage center $P_{11}$ and position it to the insertion reference position $P_{12}$.

Description of cassette loading mechanism

Next, as shown in FIGS. 5 to 8, a cassette loading mechanism 71 is disposed inside of the cassette insertion port 4 of the front panel 3, and the chassis of the cassette loading mechanism 71 comprises a horizontal chassis top plate 33 which is integrally formed with and bridged over the upper portions of a pair of right and left vertical chassis side plates formed of metal plates or the like, and it is designed to be downwardly opened and substantially U-shaped in section. A front base 34 serving as a fixing member which is formed of synthetic resin and designed to be upwardly opened and substantially U-shaped is horizontally suspended between the front ends (the end portions in the direction of the arrow a') of the pair of right and left chassis side plates 32 along the lower end and both the side edges of the cassette insertion port 4. Further, the cassette stage 6 is disposed horizontally at the rear position of the cassette insertion port 4 between the pair of right and left chassis side plates 32. Respective pairs of right and left L-type guide grooves 72 each comprising a horizontal passage 72a and a vertical passage 72b which is hung down from the rear end of the horizontal passage 72a, totally four L-type guide grooves 72 are formed in the pair of right and left chassis side plates 32. Rack guide plates 73 are secured in parallel on both the side surfaces of the end portions of the rear end sides (the end portions in the direction of the arrow a) of the pair of right and left chassis side plates 32, and horizontal guide grooves 74 are formed along the upper end edge sides on the inner side surfaces of the rack guide plates 73. Further, a pair of right and left rack plates 75 are disposed in parallel at the inside positions of the pair of right and left rack guide plates 74 on both side surfaces of the pair of right and left chassis side plates 32. Respective pairs of front and rear guide rollers 76 at each of the front and rear sides, which are fixed at the inside and outside of the positions near to both the front and rear ends (both ends in the directions of the arrow a,a') of the rack plates 75, are movably inserted in one horizontal passage 72a of the L-type guide grooves 72 and the horizontal guide groove 74, and thus these rack plates 75 are horizontally slidable along the pair of right and left chassis side plates 32 in the directions of the arrows a,a' which are the forward and rearward directions.

A pair of slant guide grooves 77 which are provided at each of front and rear sides and designed to be slant at a predetermined angle to the horizontal reference are formed at the front end sides (in the direction of the arrow a') of the pair of right and left rack plates 75, and these slant guide grooves 77 are disposed to cross each pair of L-type guide grooves 72. Further respective pairs of guide rollers 78 at the right and left sides, totally four guide rollers 78 are movably inserted in each L-type guide groove 72 and each slant guide groove 77 at the crossing point of these grooves. Further, a loading motor 80 is fixed through a motor holder 79 to the inside of the rear end side of one chassis side plate 32, and a driving shaft 82 which is forwardly and backwardly rotated through a gear train 81 by the loading motor 80 is horizontally suspended between the upper portions of the pair of right and left chassis side plates 32. A pair of right and left pinions 83 which are fixed to both the right and left ends of the driving shaft 82 are engaged with a pair of right and left racks 75a which are horizontally formed along the upper end edges of the pair of right and left rack plates 75.

When the cassette loading mechanism 71 rotates the pair of right and left pinions 83 forwardly and backwardly through the gear train 81 and the driving shaft 82 with the loading motor 80 to drive the racks 75a of the pair of right and left rack plates 75 in the directions of the arrows a,a' by the pinions 83 in synchronism with each other, the pair of right and left rack plates 75 are guided along the one horizontal passage 72a of the L-type guide grooves 72 and the horizontal guide groove 74 and horizontally and synchronously moved in the directions of the arrows a',a along the pair of right and left chassis side plates 32. At this time, each pair of right and left guide rollers 78 of the cassette stage 6 are synchronously moved in an L-shaped locus in the directions of the arrows a,b and the arrows a', b' along the horizontal passages 72a and the vertical passages 72b of the respective pairs of L-type guide grooves 72 of the pair of right and left chassis side plates 32 of each right and left guide rollers 78 of the cassette stage 6 by each pair of right and left rack plates 75. As a result, the cassette stage 6 is reciprocatively moved along the L-shaped locus in the directions of the arrows a,b and the directions of the arrows a', b' among a cassette insertion position $P_1$ indicated by a dotted line, a cassette retract position $P_2$ as indicated by a one-dotted chain line to which the cassette is horizontally retracted, and a cassette mount position $P_3$ as indicated by a two-dotted chain line to which the cassette is vertically and downwardly moved.

Description of Cassette Press Mechanism

As shown in FIGS. 9, 10, 29 and 30, a cassette press mechanism 91 is mounted at the upper side of the cassette stage 6. The cassette press mechanism 91 has a opening/closing lid 5 for opening/closing the cassette insertion port 4 of the front panel 3 from the inside, and a cassette press lever 92 which is upwardly and downwardly rotated while supporting the opening/closing lid 5. The cassette press lever 92 is designed to be downwardly opened and substantially U-shaped in section by a pair of right and left side plates 92a and a top plate portion 92b through which the upper end portions of the side plates 92a are horizontally linked, and the top plate portion 92b is formed on a mount stand of a cassette slant insertion preventing stopper as described later. The cassette press lever 92 is secured to the rear ends of the pair of right and left side plates 6b of the cassette stage 6 through a pair of right and left horizontal support pins 93 by the rear ends of the pair of right and left side plates 92a so as to be freely rotatable in the directions of the arrows d,d' which are the upward and downward directions. The cassette press lever 92 is rotationally urged in the direction of the arrow d' corresponding to a cassette press direction by a pair of right and left press springs 94 serving as rotational urging means comprising an extension spring to come into contact with and stop at the pair of right and left stoppers 95 which are integrally formed on the right and left side plates 6b of the cassette stage 6.

The opening/closing lid 5 is formed of synthetic resin or the like, and both the right and left sides of the upper end of the opening/closing lid 5 are secured to the insides of the front ends of the pair of right and left side plates 92a of the cassette press lever 92 through a pair of right and left horizontal support pins 7 so as to be freely rotatable in the directions of arrows c,c' which correspond to the forward and rearward direction and the upward and downward direction. The opening/closing lid 5 is rotationally urged in the direction of the arrow c' by a pair of right and left opening/closing lid springs 96 serving as rotational urging means for closing the lid which comprise torsion coil springs, whereby the opening/closing lid 5 abuts against stoppers integrally formed at the insides of the front end of the pair of right and left arm portions 92a, and stops at the lid closing position of the cassette insertion port 4 shown in FIG. 9.

Figure 9:
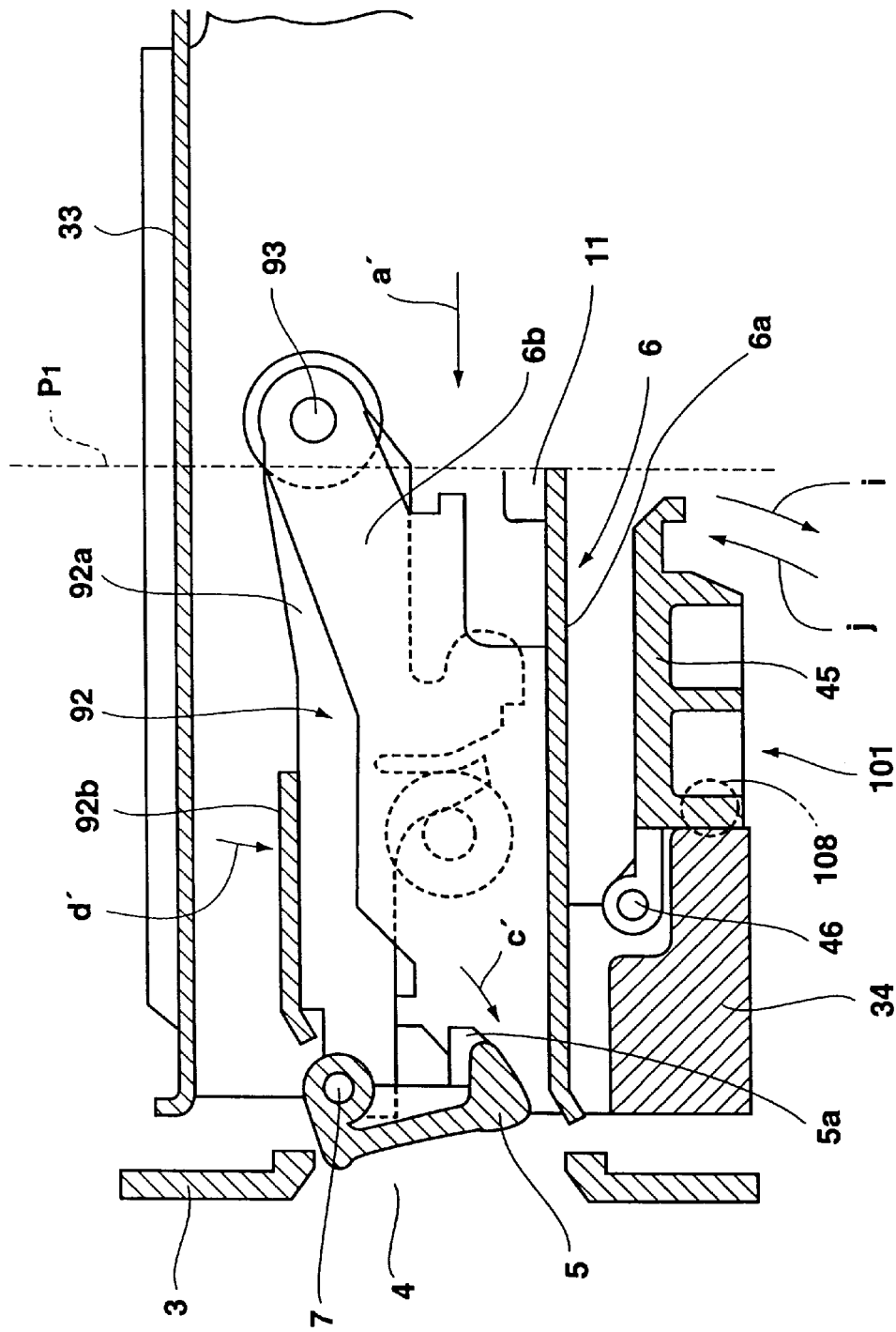
FIG. 9 is a cross-sectional side view showing an accommodation state of the cassette double insertion preventing lid.

As shown in FIG. 9, in the cassette press mechanism 91, when the cassette stage 6 is returned to the cassette insertion position $P_1$ from the direction of the arrow a', the opening/closing lid 5 is rotated in the direction of the arrow c' to the lid closing position at which the lid 5 is positioned substantially vertically.

Figure 10:
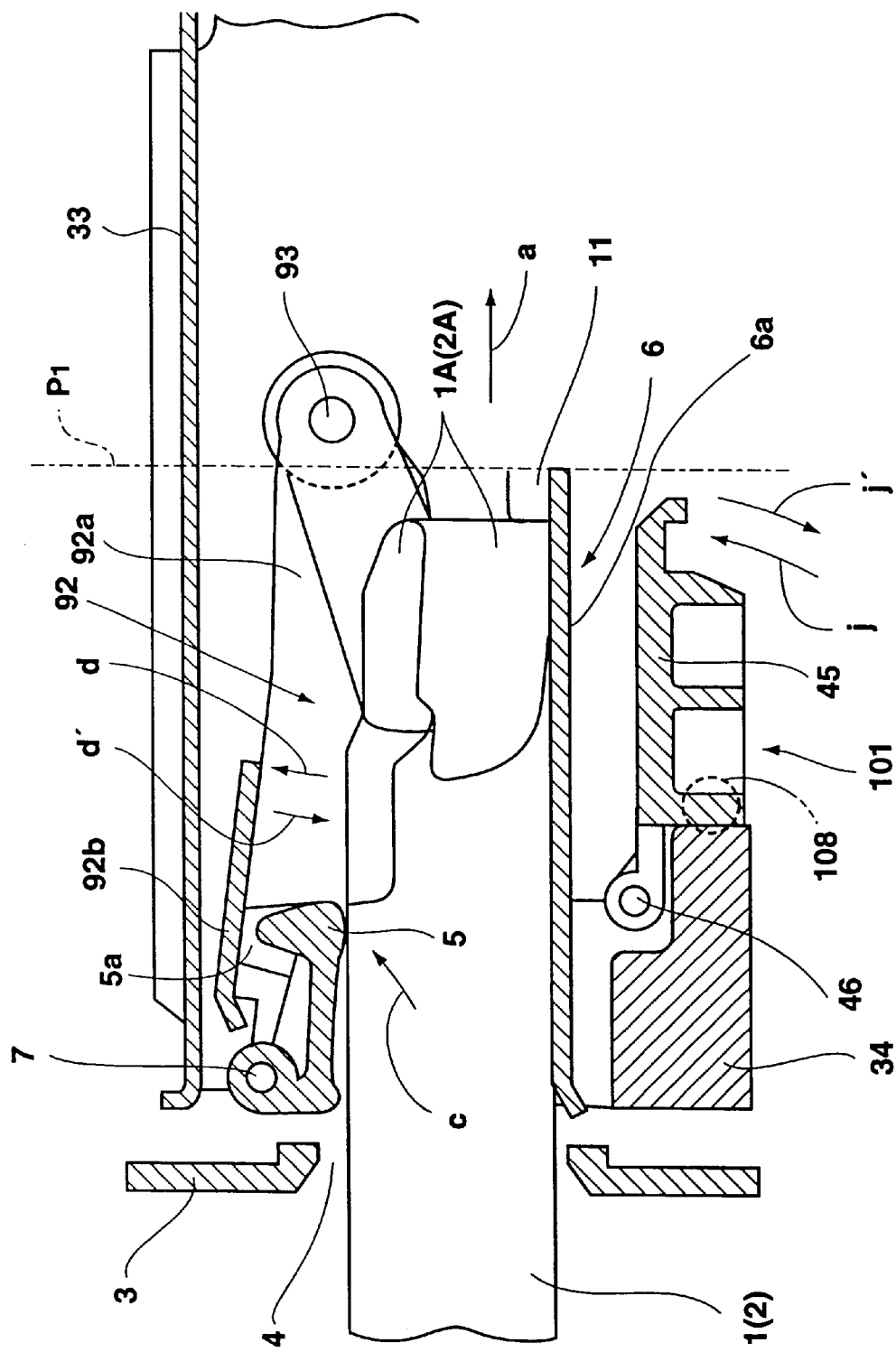
FIG. 10 is a cross-sectional side view showing an aspect when a tape cassette is inserted into a cassette stage in FIG. 9.

As shown in FIG. 10, when the small-size and large-size tape cassettes 1,2 are selectively inserted from the direction of the arrow a into the cassette stage 6 from the cassette insertion port 4 of the front panel 3, the opening/closing lid 5 is pushed and opened in the direction of the arrow c against the pair of right and left opening/closing lid springs 96 by the small-size and large-size tape cassettes 1, 2, whereby the opening/closing lid 5 gets on the upper portion of the small-size and large-size tape cassettes 1,2. At this time, in the course of the lid opening operation of the opening/ closing lid 5 in the direction of the arrow c, plural projections 5a which are integrally on the back surface of the opening/closing lid 5 abut against the top plate portion 92b of the cassette press lever 92 from the lower side, and the cassette press lever 92 is pushed upwardly in the direction of an arrow d against the pair of right and left press springs 94 together with the opening/closing lid 5. Further, the small-size and large-size tape cassettes 1, 2 are pressed and fixed onto the bottom plate 6a of the cassette stage 6 through the opening/closing lid 5 by the cassette press force which is a reaction force of the cassette press lever 92 in the direction of the arrow d'.

Description of Cassette Double Insertion Preventing Mechanism

As shown in FIGS. 8 to 13, a cassette double insertion preventing lid 45 of a cassette double insertion preventing mechanism 101 is fixed to the rear end (the end portion in the direction of the arrow a) of the front base 34 through a pair of right and left horizontal support pins 46 so as to be freely rotatable in the directions of arrows j,j' which correspond to the upward and downward directions. A pair of right and left opening/closing mechanisms 47 for opening/closing the cassette double insertion preventing lid 45 in the directions of the arrows j,j' are secured to both side surfaces of the pair of right and left chassis side plates 32. Each of these opening/closing mechanisms 47 comprises a seesaw type driving lever 103 which is mounted to the chassis side plate 32 through a horizontal support pin 102 so as to be rotationally driven in the directions of arrows m,m' corresponding to the upward and downward directions, a cam driven roller 104 which is fixed to the rear end of the driving lever 103, a cam groove 105 which is formed along the lower edge of the rack plate 75, a driving lever spring 106 serving as rotational urging means which comprises a tension spring for rotationally urging the driving lever 103 in the direction of the arrow m, a substantially L-shaped cam hole 107 formed at the front end of the driving lever 103, and a cam driven roller 108 which is fixed to both the right and left side surfaces of the cassette double insertion lid 45 so as to be freely movable in the cam hole 107. A pair of right and left cam driven rollers 108 are freely movably inserted into a pair of right and left cam grooves 107 so as to penetrate through a pair of right and left openings 109 formed which are formed in a pair of right and left chassis side plates 32.

Figure 12:
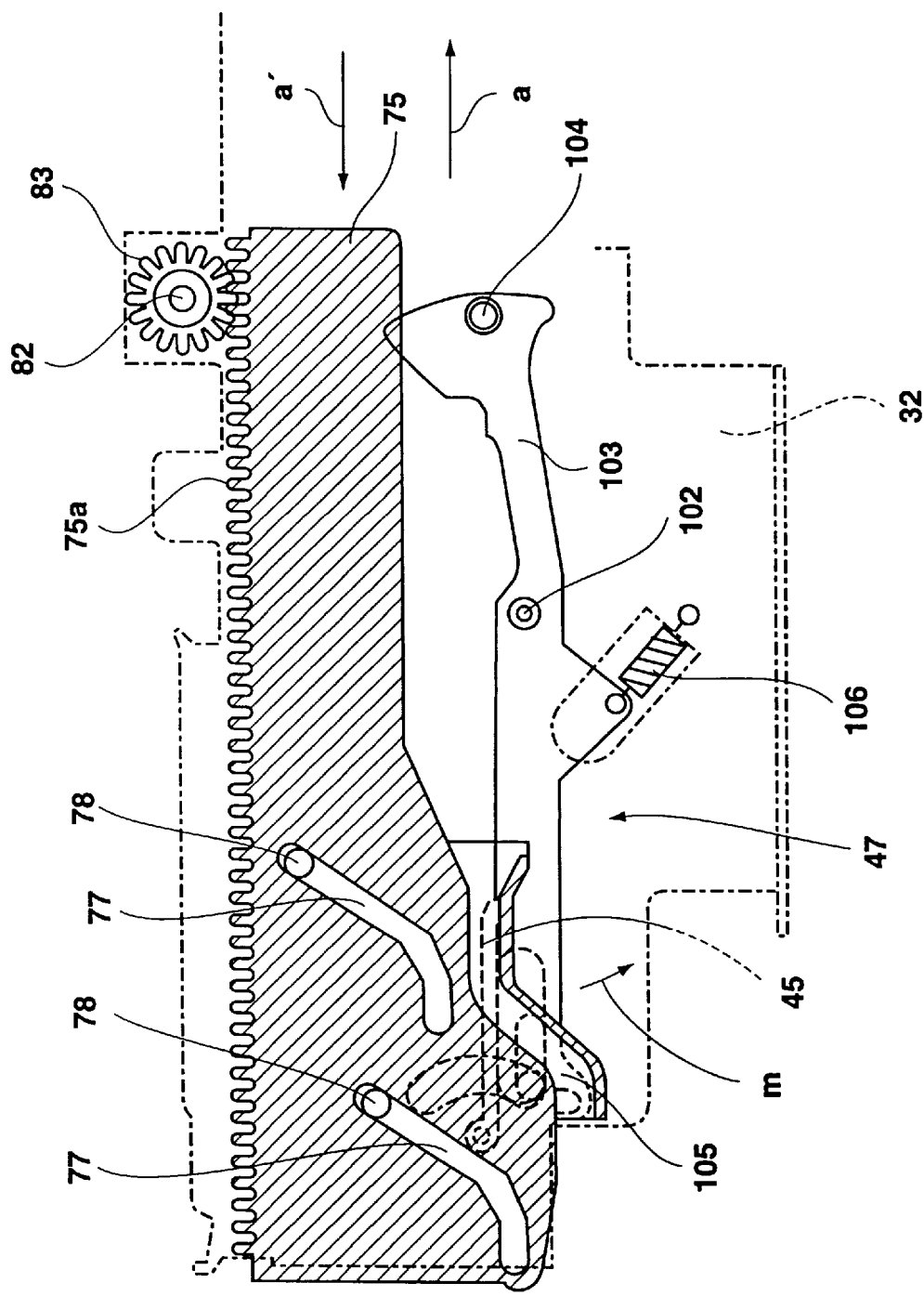
FIG. 12 is a partially notched side view showing an opening time point of an opening/closing mechanism for opening/closing the cassette double insertion preventing lid.

With respect to the cassette double insertion preventing mechanism 101, when the cassette stage 6 is returned to the cassette insertion position $P_1$ in the direction of the arrow a' as shown in FIG. 9, as shown in FIG. 12, the cam driven roller 104 gets out relatively in the direction of the arrow a from the cam groove 105 of the rack plate 75 which is returned in the direction of the arrow a', so that the drive lever 103 is rotationally driven in the direction of the arrow m by the driving lever spring 106, and the cam driven roller 108 is driven in the direction of the arrow m by the cam hole 107, whereby the cassette double insertion preventing lid 45 is tilted in a horizontal position in the direction of an arrow j' and retracted to the lower side of the cassette stage 6.

Figure 6:
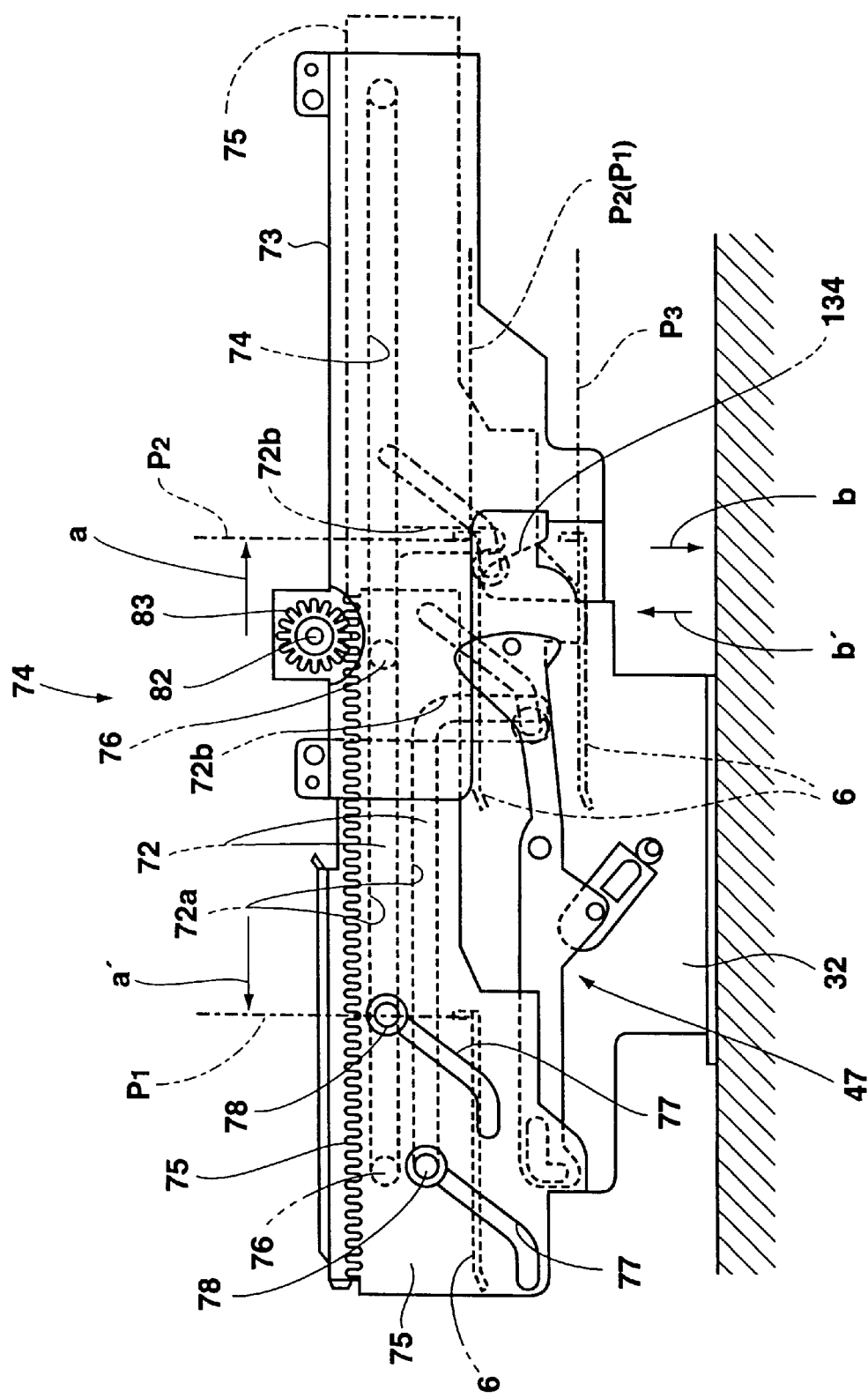
FIG. 6 is a side view of FIG. 5.
Figure 7:
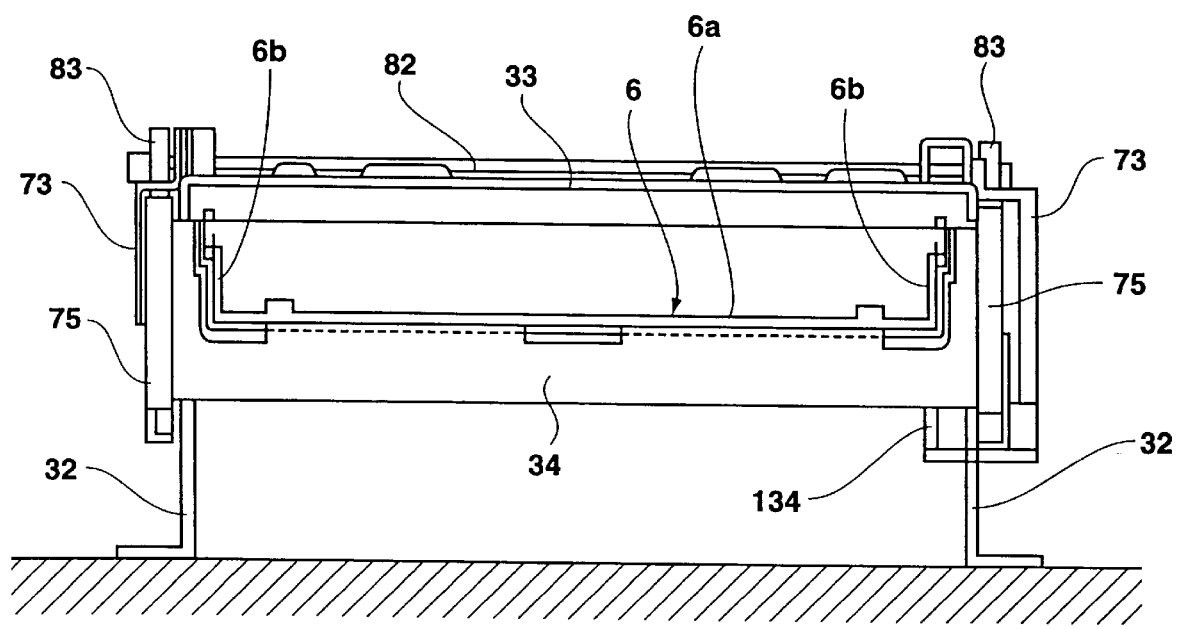
FIG. 7 is a front view of FIG. 5.
Figure 8:
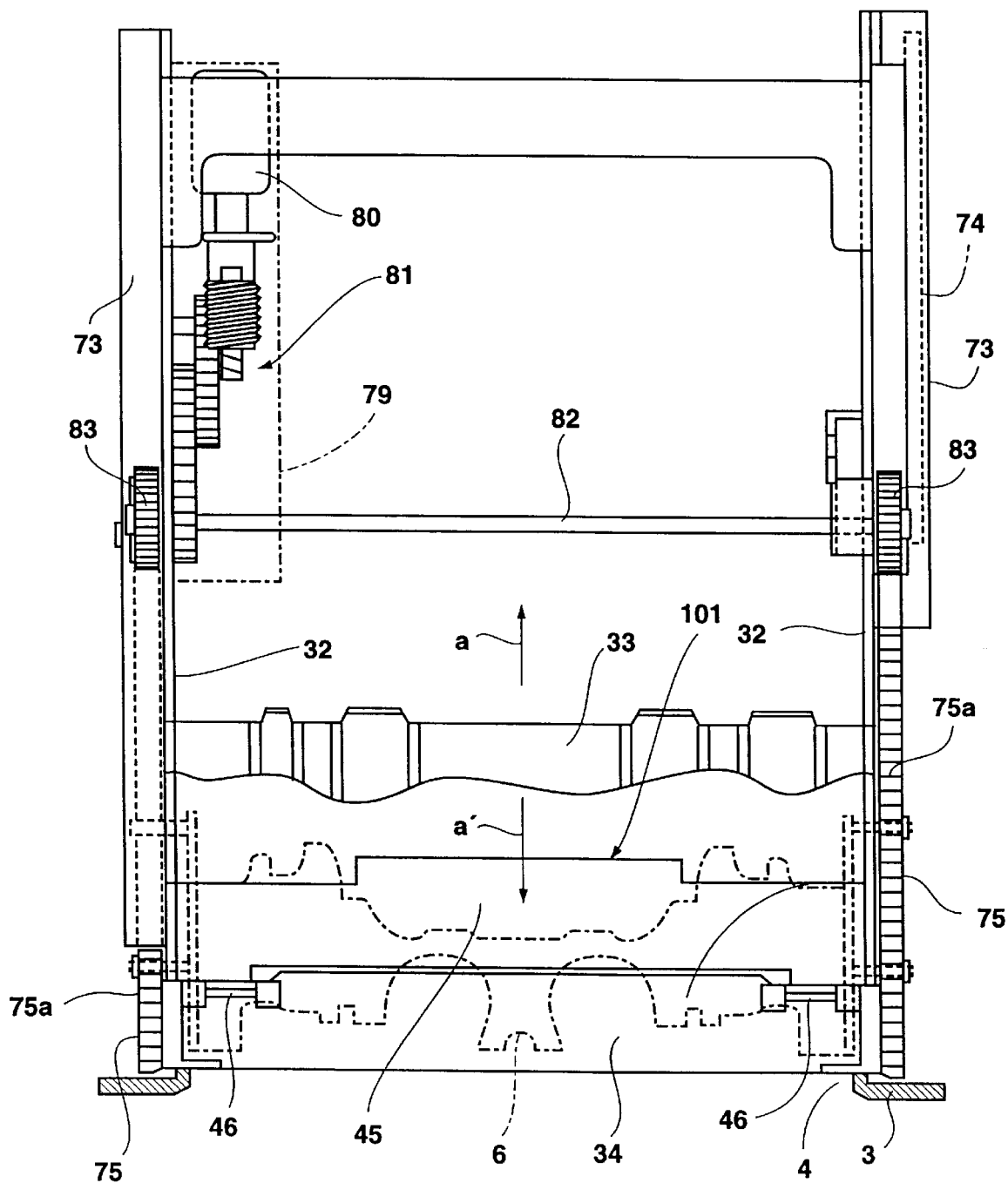
FIG. 8 is a partially notched plan view of FIG. 4 to show a cassette double insertion preventing mechanism.
Figure 13:
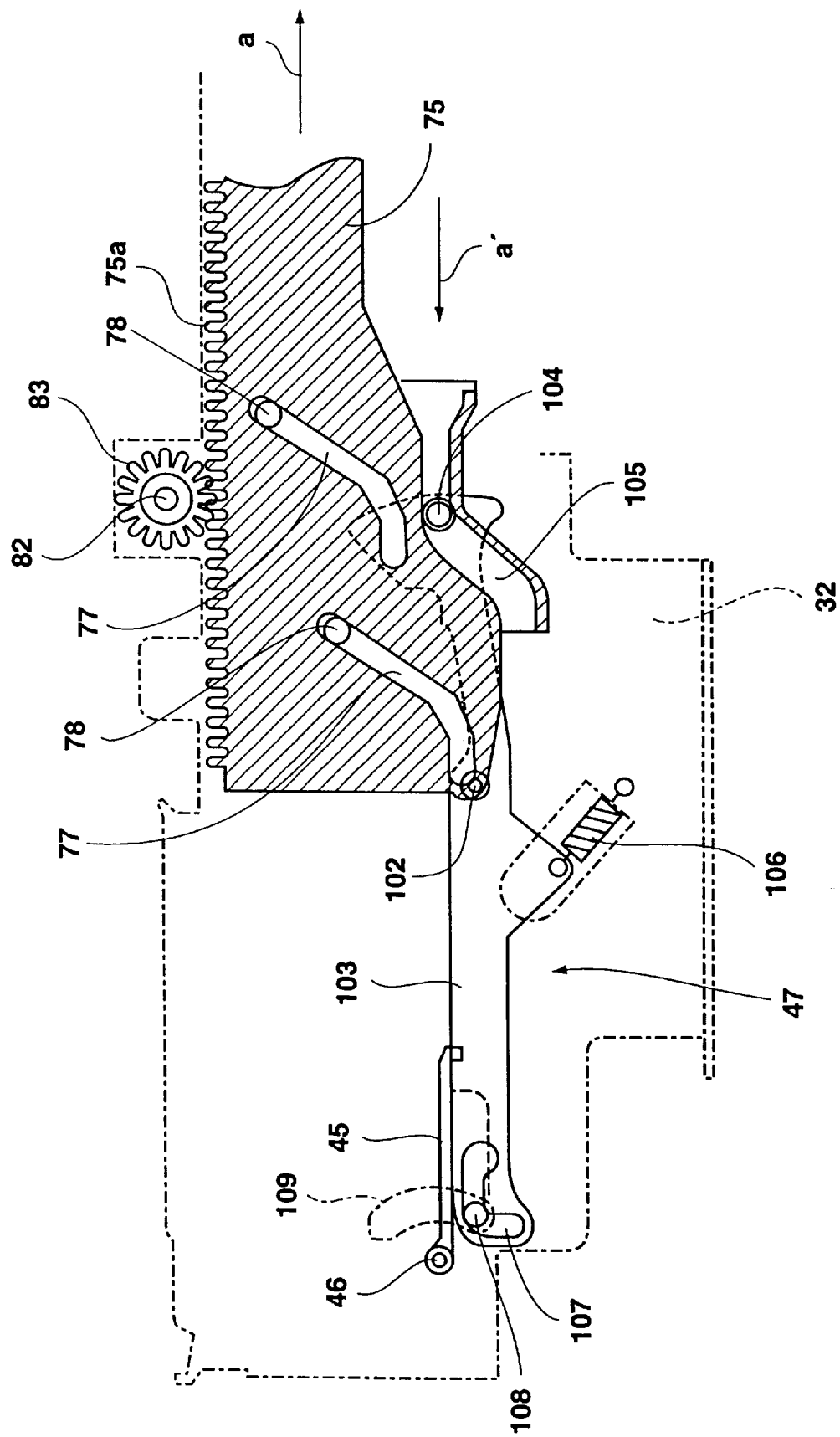
FIG. 13 is a partially notched side view showing a time point just before a lid closing operation of the opening/closing mechanism.
Figure 14:
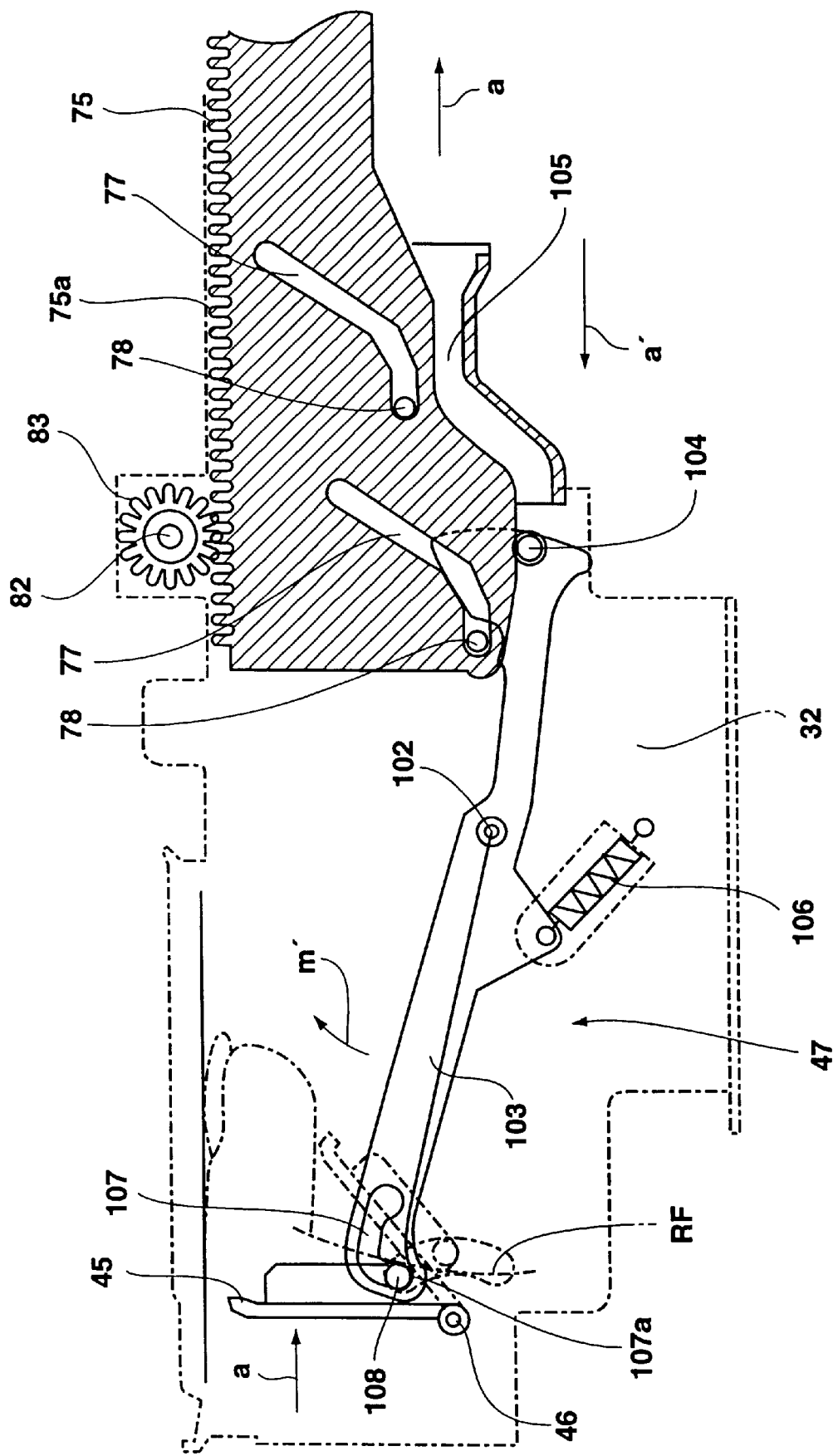
FIG. 14 is a partially notched side view showing a lid closing time point of the opening/closing mechanism.

Next, as show in FIG. 10, when the rack plate 75 of the cassette loading mechanism 71 is slid in the direction of the arrow a in order to move the cassette stage 6 in the directions of the arrows a,b from the cassette insertion position $P_1$ shown in FIG. 6 through the cassette retract position $P_2$ to the cassette mount position $P_3$ after one of the small-size and the large-size tape cassettes 1, 2 is selectively inserted into the cassette stage 6 from the cassette insertion port 4, as shown in FIGS. 13 and 14, the cam driven roller 104 is passed relatively in the direction of the arrow a' through the cam groove 105, and the driving lever 103 is rotationally driven against the driving lever spring 106 in the direction of the arrow m' by the cam groove 105. At this time, the cam driven roller 108 is driven in the direction of the arrow m' by the cam hole 107, and as indicated by a solid line, the cassette double insertion preventing lid 45 is vertically erected in the direction of the arrow j, whereby the cassette double insertion preventing lid 45 closes the cassette insertion port 4 from the inside.

Figure 11:
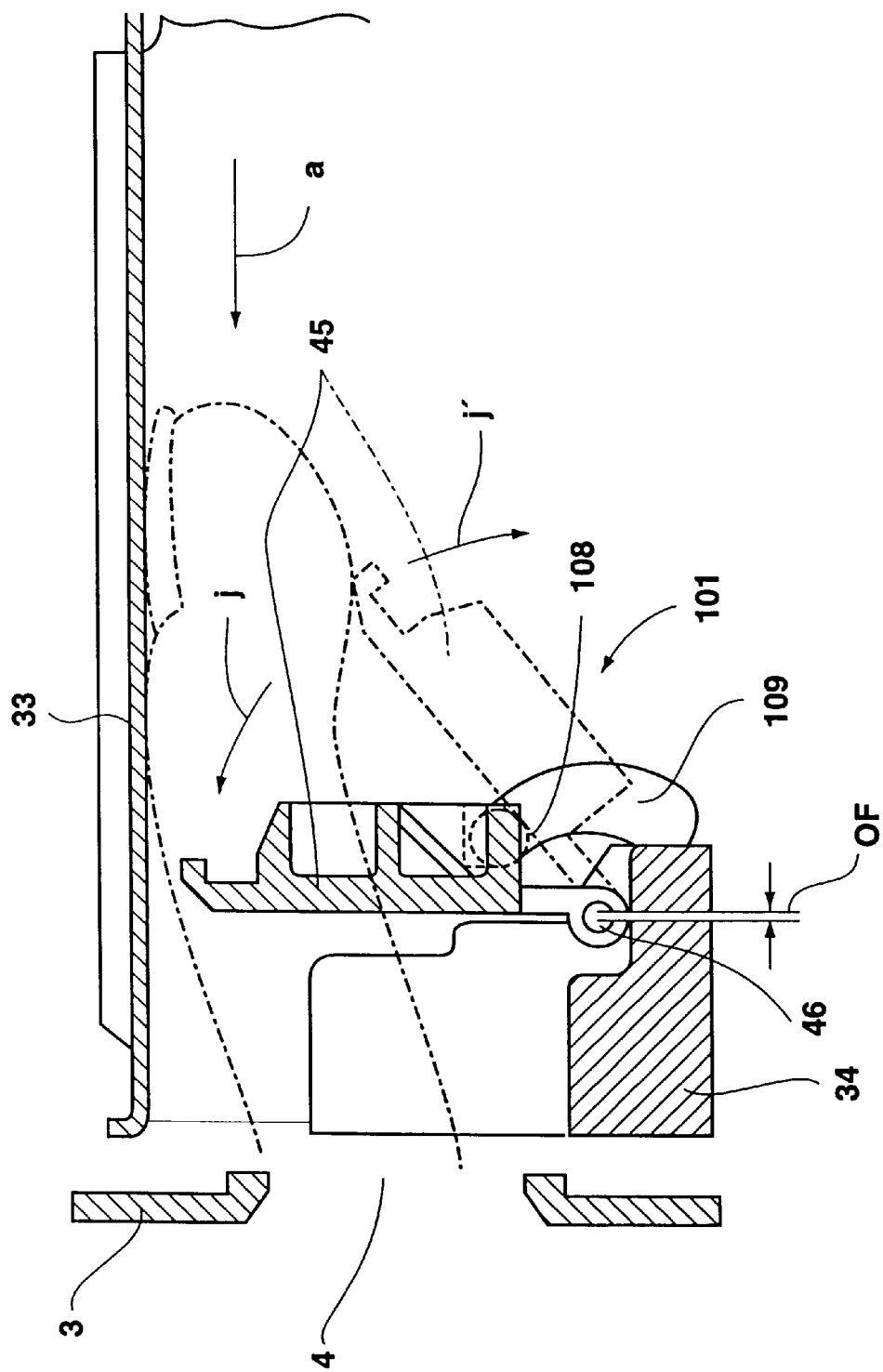
FIG. 11 is a cross-sectional side view when a cassette insertion port is closed by the cassette double insertion preventing lid.

When the cassette double insertion preventing lid 45 is rotationally driven in the direction of the arrow to the lid closing position as indicated by a solid line of FIG. 11, the cam driven roller 108 reaches one end 107a of the cam hole 107 and is locked at it is, so that the cassette double insertion preventing lid 45 is locked at the lid closing position at it is. That is, one end 107a of the cam hole 107 is formed of RF which is R-surface with the support pin 102 at the center thereof, and even when an external force is applied from the cassette insertion port 4 to the cassette double insertion preventing lid 45 in the direction of the arrow a, the external force is received by the support pin 102, so that there occurs no force for rotating the cassette double insertion preventing lid 45 in the direction of the arrow j'. Therefore, the cassette double insertion preventing lid 45 can be fixedly locked at the lid closing position.

Further, as shown in FIG. 11, the cassette double insertion preventing lid 45 is offset-OFF to the arrow j' direction side which is the lid closing direction to the center of the support pin 46. Accordingly, when as indicated by a one-dotted chain line of FIG. 11, a finger or the like is carelessly pinched between the tip of the cassette insertion preventing lid 45 and the chassis top plate 33 in the course of the lid closing operation of the cassette double insertion preventing lid 45 in the direction of the arrow j, and the pinched finger or the like is pulled out in the direction of the arrow a', an escaping force in the direction of the arrow j' which is the lid closing direction acts on the cassette double insertion preventing lid 45, and thus the finger or the like can be safely pulled out in the direction of the arrow a'.

As described above, according to the cassette double insertion preventing mechanism 101, when the small-size and large-size cassettes 1,2 are selectively loaded from the cassette insertion position $P_1$ to the cassette mount position $P_3$ by the cassette stage 6, the cassette insertion port 4 can be closed from the inside by the cassette double insertion preventing lid 45. In addition, the cassette double insertion preventing lid 45 can be fixedly locked. Therefore, so-called double cassette insertion error in which a next tape cassette or foreign matter is erroneously inserted from the cassette insertion port, can be prevented in advance. When the small-size and the large-size tape cassettes 1,2 are ejected from the cassette mount position $P_3$ to the cassette insertion position $P_1$, the cassette double insertion preventing lid 45 is rotated in the direction of the arrow j' through a counter operation at the loading time, whereby the it can be retracted to the lower side of the cassette stage 6 shown in FIG. 9.

Description of Cassette Erroneous Insertion preventing mechanism

As shown in FIGS. 15 to 22, the cassette erroneous insertion preventing mechanism 111 has a pair of rotational right and left cassette identification members 9 formed of synthetic resin or the like, a cassette insertion guide 10 and control levers 112. The cassette identification members 9, the cassette insertion guide 10 and the control levers 112 are secured to the front base 34 through support pins 113, 46 (common to the cassette double insertion preventing lid 45) and 114 respectively so as to be freely rotatable in the directions of arrows n,n' corresponding to the upward and downward directions, in the directions of arrows o,o' and in the directions of arrows p,p' respectively. The cassette identification members 9 are rotationally urged in the direction of the arrow n' corresponding to the upward direction by an identification member spring corresponding to the rotational urging means which is formed of a torsional coil spring, the cassette insertion guide 10 is rotationally urged in the direction of the arrow o corresponding to the downward direction by an insertion guide spring 116 corresponding to rotational urging means which is formed of a leaf spring, and the control lever 112 is rotationally urged in the direction of the arrow p corresponding to the downward direction by a control lever spring 117 corresponding to rotational urging means which is formed of a tension coil spring stronger than the identification member spring 115.

The pair of right and left cassette identification members 9 are disposed at both the right and left sides inside the cassette insertion port 4, and the cassette insertion guide 10 and the pair of right and left control levers 112 are disposed at the positions which are displaced from the pair of right and left cassette identification members 9 toward the cassette insertion direction side (the arrow a direction side). Further, the cassette insertion guide 116 is disposed between the pair of right and left cassette identification members 9, and the pair of right and left control levers 112 are disposed at the right and left sides of the pair of right and left cassette identification members 9. Further, a pair of right and left projections 118 which are brought into contact with and separated from a pair of right and left arms 112a which are integrally formed on the upper end of the right and left sides of the pair of right and left control levers 112, are formed at the right and left sides of the front end (the end portion in the arrow a' direction) of the bottom plate 6a of the cassette stage 6, and the control means 44 is constructed by the pair of right and left control levers 112 and the projections 118.

A pair of right and left engaging pins 112b which are integrally formed onto the inside of the upper end of the pair of right and left control levers 112 are engaged with a pair of right and left engaging pieces 9a which are integrally formed in a substantially arcuate shape onto the outside of the upper ends of the pair of right and left cassette identification members 9, and the pair of right and left engaging pins 9b which are formed integrally onto the inside of the pair of right and left cassette identification members 9 are engaged with a pair of right and left engaging pieces 10a which are integrally formed in a substantially L-shaped form to both the right and left ends of the cassette insertion guide 10. The cassette insertion guide 10 is projected toward the cassette discharge direction side (the arrow a' direction side) from the pair of right and left support pins 46, and a pair of right and left projecting portions 119 are integrally formed at the right and left sides of the tip side of the cassette insertion guide 10. The end surfaces of the pair of right and left projecting portions 119 in the direction of the arrow a' are formed on the cassette stopper surface 120, and the inside surfaces of the pair of these right and left projecting portions 119 are formed on a pair of right and left cassette guide surfaces 121 to guide the small-size tape cassette 1 onto the stage center $P_{11}$ in the cassette stage 6.

Figure 17:
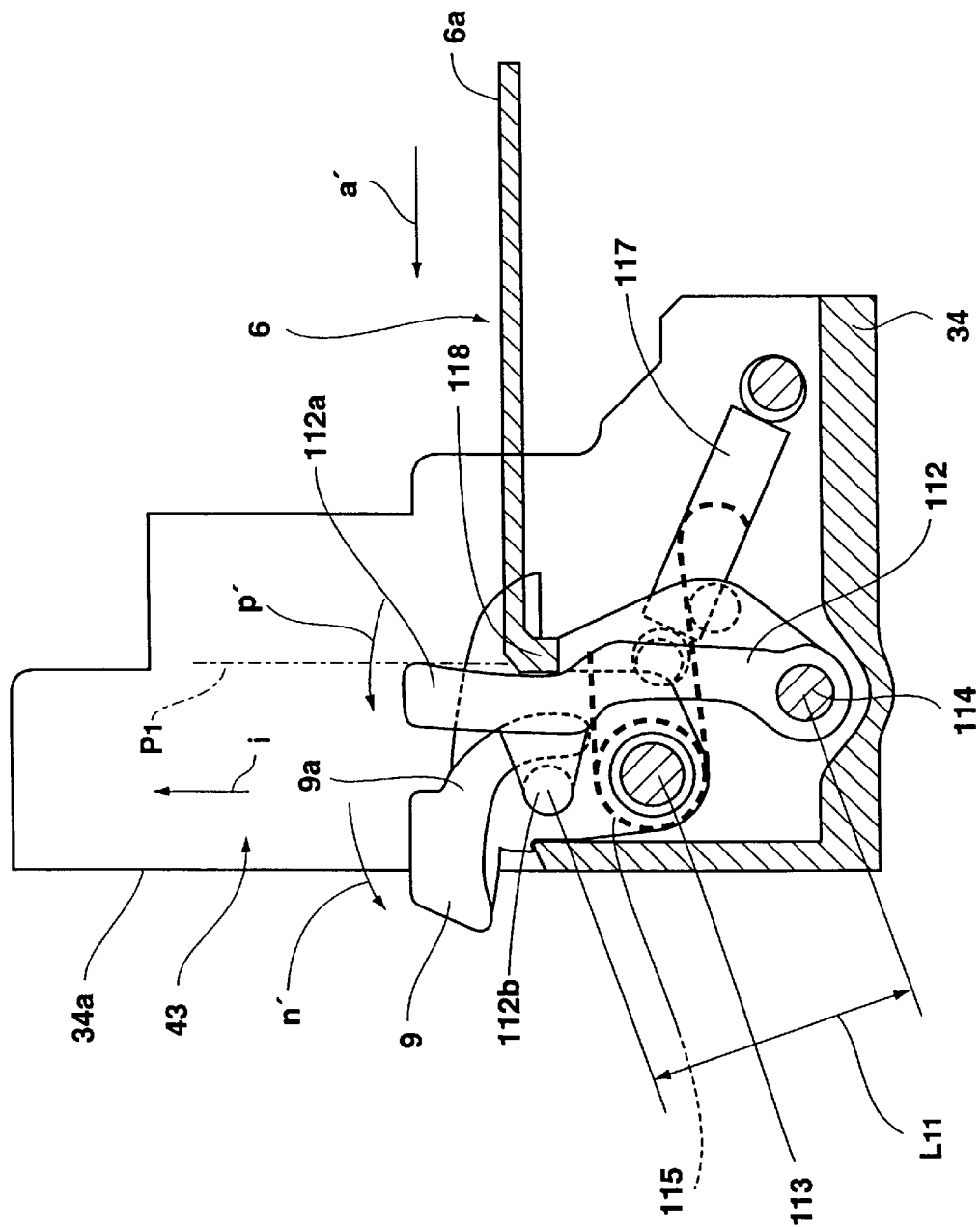
FIG. 17 is a partially notched side view showing an aspect that a cassette identifying member is moved to an operation position in a cassette insertion space by a control lever by returning a cassette stage to a cassette insertion position.
Figure 18:
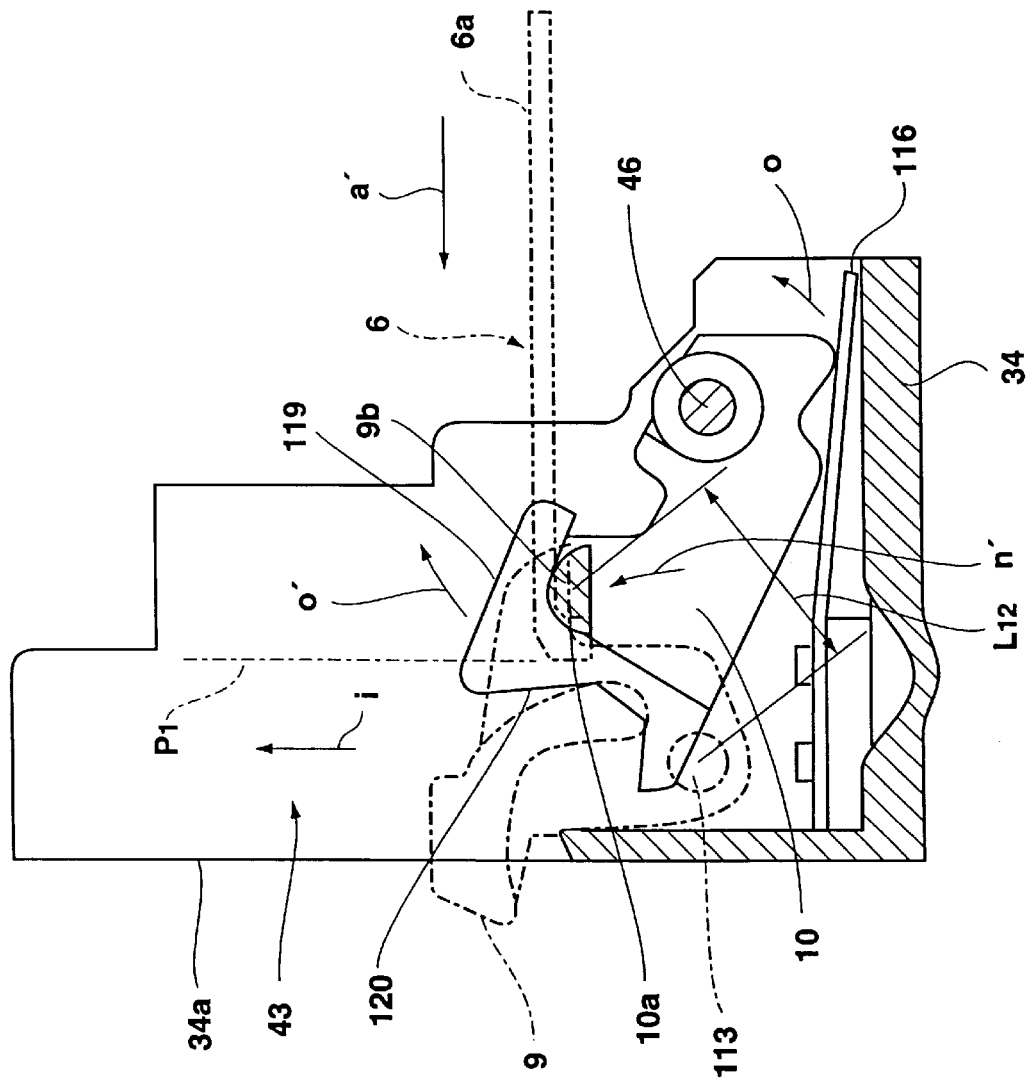
FIG. 18 is a partially notched side view showing an aspect that a cassette insertion guide is moved to an operation position in the cassette insertion space by the cassette identifying member.

With respect to the cassette insertion preventing mechanism 111, as shown in FIGS. 17 and 18, when the cassette stage 6 is returned in the direction of the arrow a' to the cassette insertion position $P_1$, the pair of right and left projections 118 are brought into contact with the arms 112a of the pair of right and left control levers 112 from the arrow a' direction, and rotates the pair of right and left control levers 112 against the control lever spring 117 in the direction of the arrow p' corresponding to the upward direction to lock the control levers 112 as they are. At this time, following the rotation of the engaging pins 112b of the pair of right and left control levers 112 in the direction of the arrow p', the pair of right and left cassette identification members 9 are rotated in the direction of the arrow n' corresponding to the upward and forward direction by the pair of right and left identification member springs 115, so that the pair of right and left cassette identification members 9 get into a cassette insertion space 43 from the lower side and projected from the direction of the arrow n' to the position which is closest to the cassette insertion port 4. The pair of right and left engaging pieces 10a of the cassette insertion guide 10 is pushed upwardly in the direction of the arrow n by the pair of right and left engaging pins 9b of the pair of right and left cassette identifying members 9 to rotate the cassette insertion guide 10 against the insertion guide spring 116 in the direction of the arrow o'. Accordingly, the pair of right and left projecting portions 119 get into the cassette insertion space 43 at the position where it is displaced to the direction side of the arrow a by the pair of right and left cassette identification members 9. Accordingly, the cassette 6 is returned to the cassette insertion position $P_1$, whereby the cassette identification members 9 and the cassette insertion guide 10 are upwardly moved in the direction of an arrow I to the operation position in the cassette insertion space 43.

Figure 15:
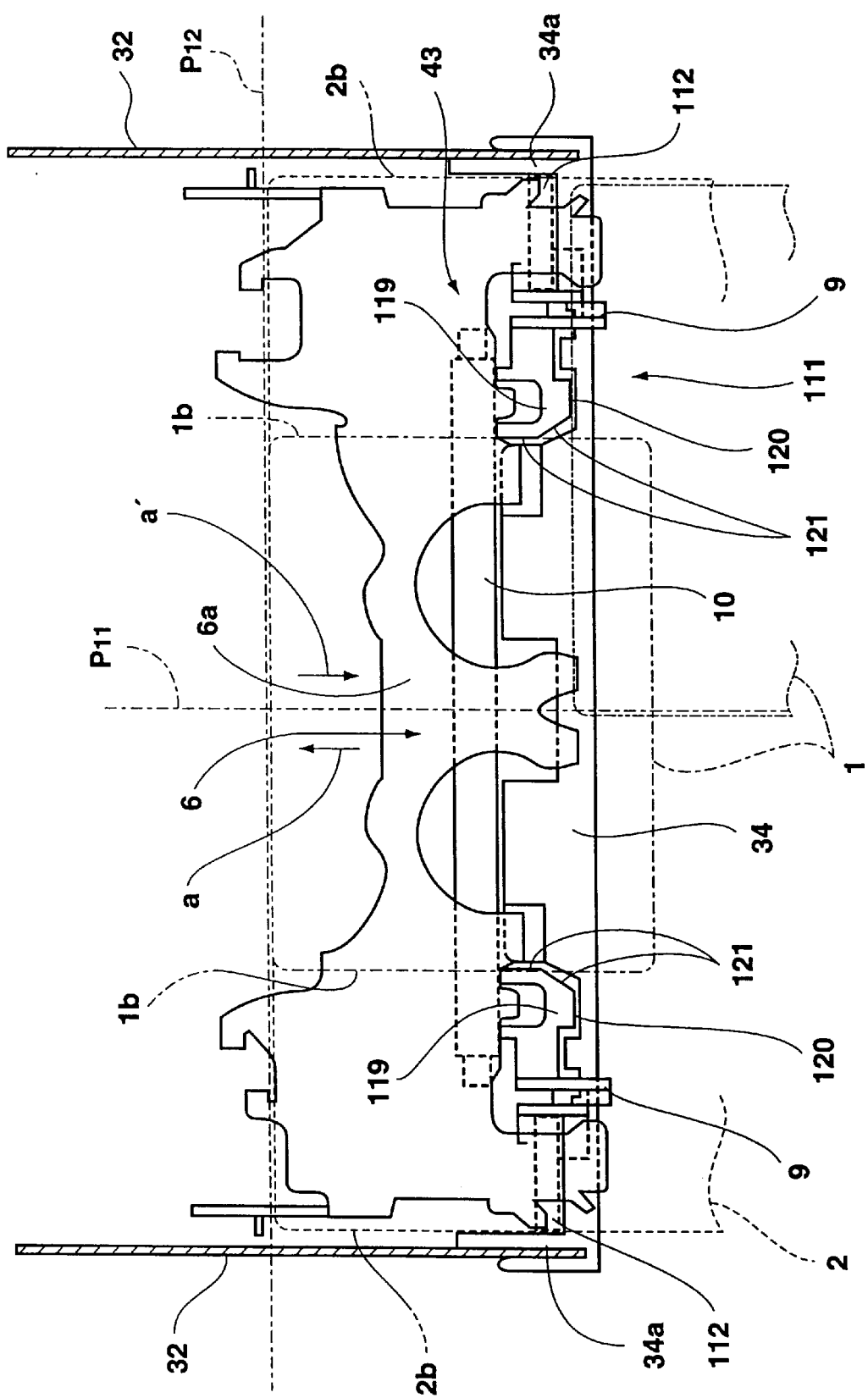
FIG. 15 is a partially notched plan view showing a cassette erroneous insertion preventing mechanism.
Figure 16:
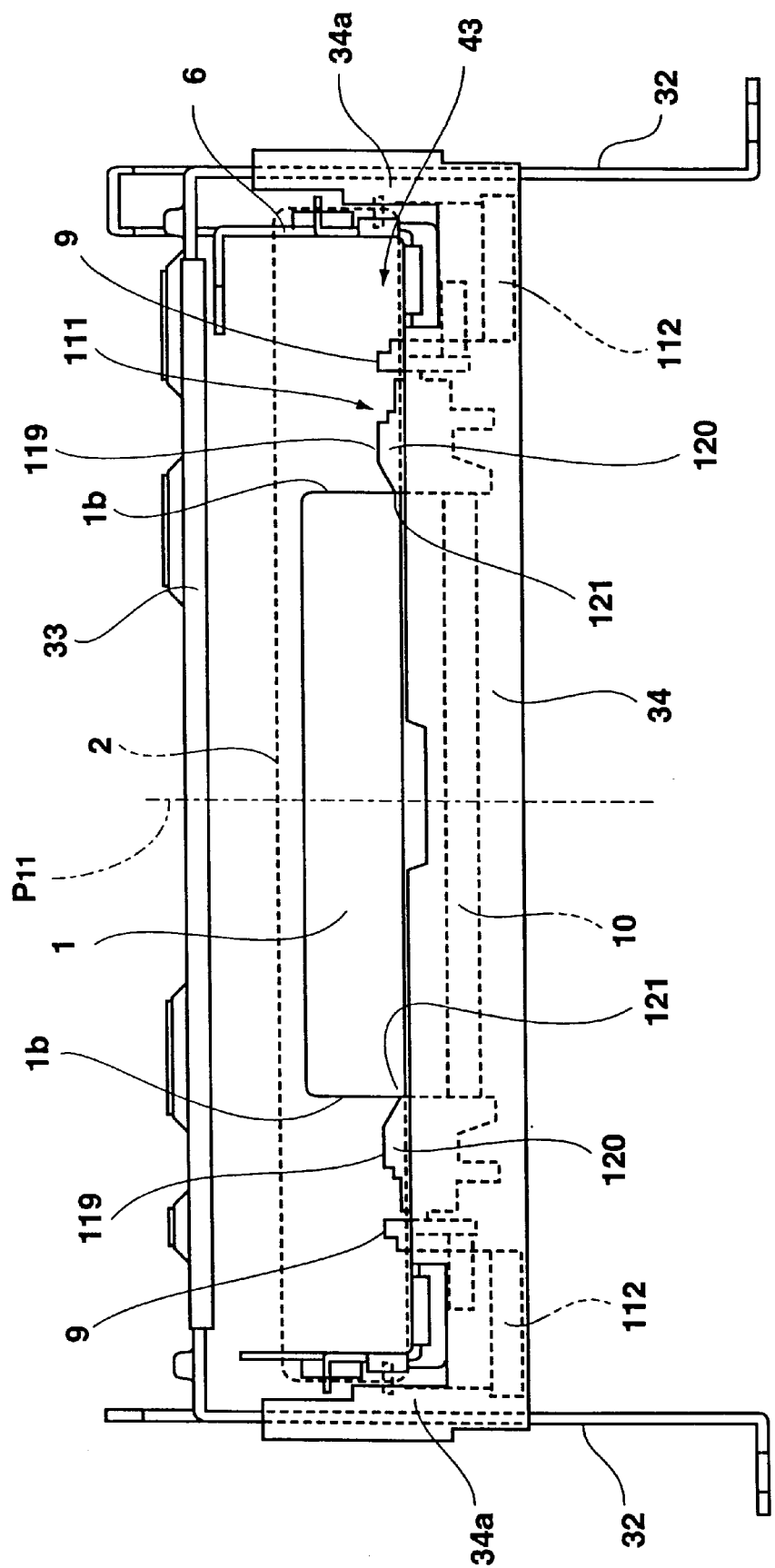
FIG. 16 is a front view of FIG. 14.

At this time, as indicated by a one-dotted chain line in FIG. 15 and by a solid line in FIG. 16, if the small-size tape cassette 1 is inserted substantially along the stage center $P_{11}$ when the small-size tape cassette 1 is inserted in the direction of the arrow a from the cassette insertion port 4 into the cassette stage 6, both the right and left side surfaces 1b of the small-sized tape cassette 1 are guided between the pair of right and left cassette guide surfaces 121 of the cassette insertion guide 10, and the small-size tape cassette 1 is accurately guided onto the stage center $P_{11}$, whereby the small-size tape cassette 1 can be accurately inserted to the insertion reference position $P_{12}$ in the cassette stage 6.

At this time, as indicated by a two-dotted chain line in FIG. 15, when the small-size tape cassette 1 or another similar tape cassette is erroneously inserted in the direction of the arrow a into the cassette stage 6 from a position which is greatly deviated from the stage center $P_{11}$ to the right side or left side, the cassette insertion guide 10 is not downwardly pulled to the lower side of the cassette insertion space 43 even when any one of the pair of right and left cassette identification members 9 is pushed by the small-size tape cassette 1. Therefore, the small-size tape cassette 1 is brought into contact with the cassette stopper surface 120 of any one of the pair of right and left projecting portions 119 of the cassette insertion guide 10, whereby the erroneous insertion of the small-size tape cassette 1 or another similar tape cassette can be prevented in advance.

Figure 19:
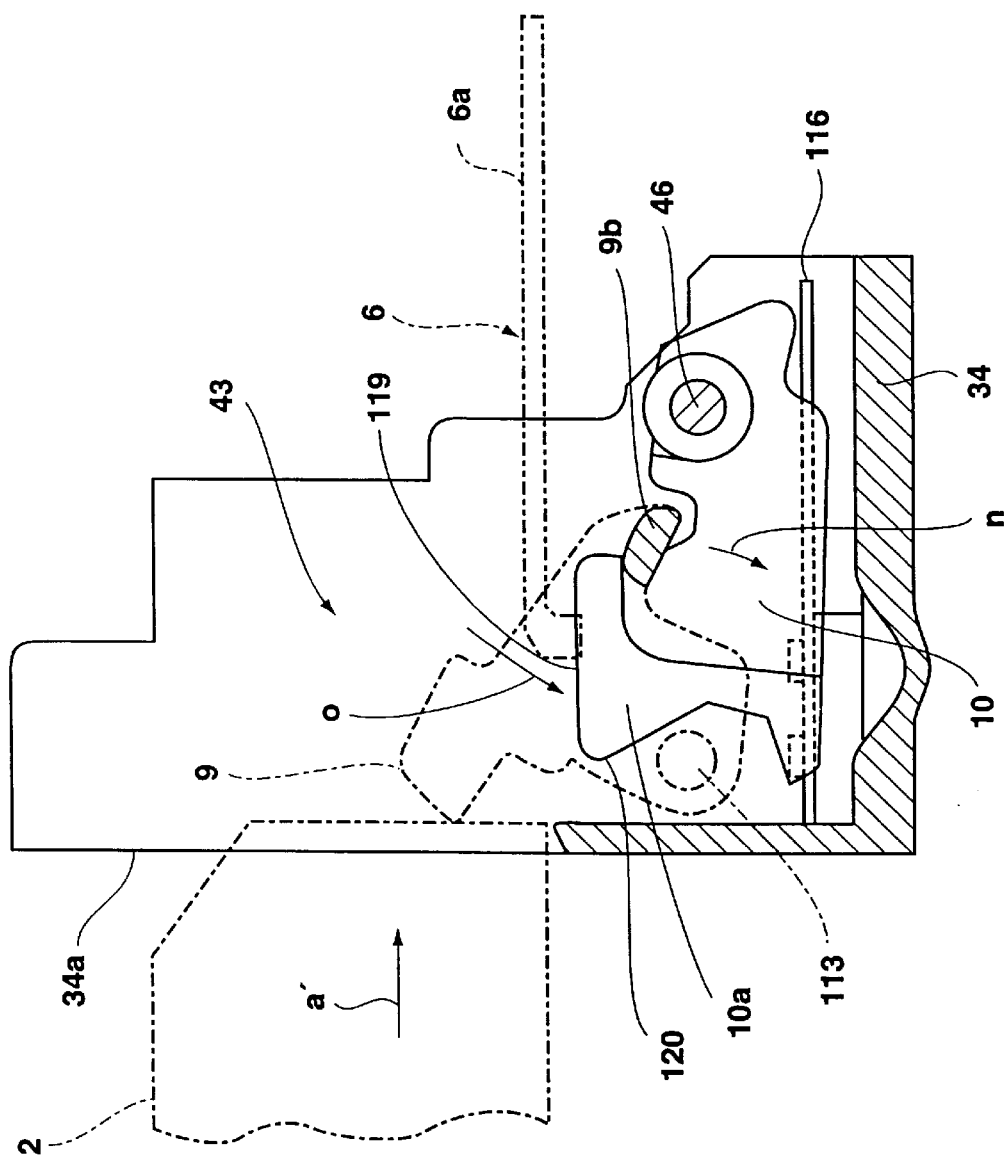
FIG. 19 is a partially notched side view showing an aspect that the cassette identifying member identifies a large-size tape cassette and the cassette insertion guide is escaped out of the cassette insertion space.

Next, as indicated by a dotted line in FIGS. 15 and 16, when the large-size tape cassette 2 is inserted from the cassette insertion port 4 into the cassette stage 6 in the direction of the arrow a, both the right and left side surfaces 2b of the large-size tape cassette 2 are guided by both the right and left side walls 34a of the front base 34, and inserted along the stage center $P_{11}$. At this time, as shown in FIG. 19, the large-size tape cassette 2 is brought into contact with the pair of right and left cassette identification members 9 from the direction of the arrow a at the same time, and these pair of right and left cassette identification members 9 are rotated against the pair of right and left identification springs 115 in the direction of the arrow n at the same time. In this case, at the instantaneous time when the pair of right and left cassette identification members 9 are slightly rotated in the direction of the arrow n, the pair of right and left engaging pins 9b are disengaged from the pair of right and left engaging pieces 10a of the cassette insertion guide 10 in the direction of the arrow n at the same time, and the cassette insertion guide 10 is rotated in the direction of the arrow o by the insertion guide spring 116, whereby the pair of right and left projecting portions 119 are instantaneously pulled to the lower side of the cassette insertion space 43. Accordingly, the cassette insertion guide 10 can subsequently smoothly insert the large-size tape cassette 2 to the insertion reference position $P_{12}$ in the cassette stage 6 with no disturbance of the insertion of the large-size tape cassette 2 by the cassette insertion guide 10.

Figure 20:
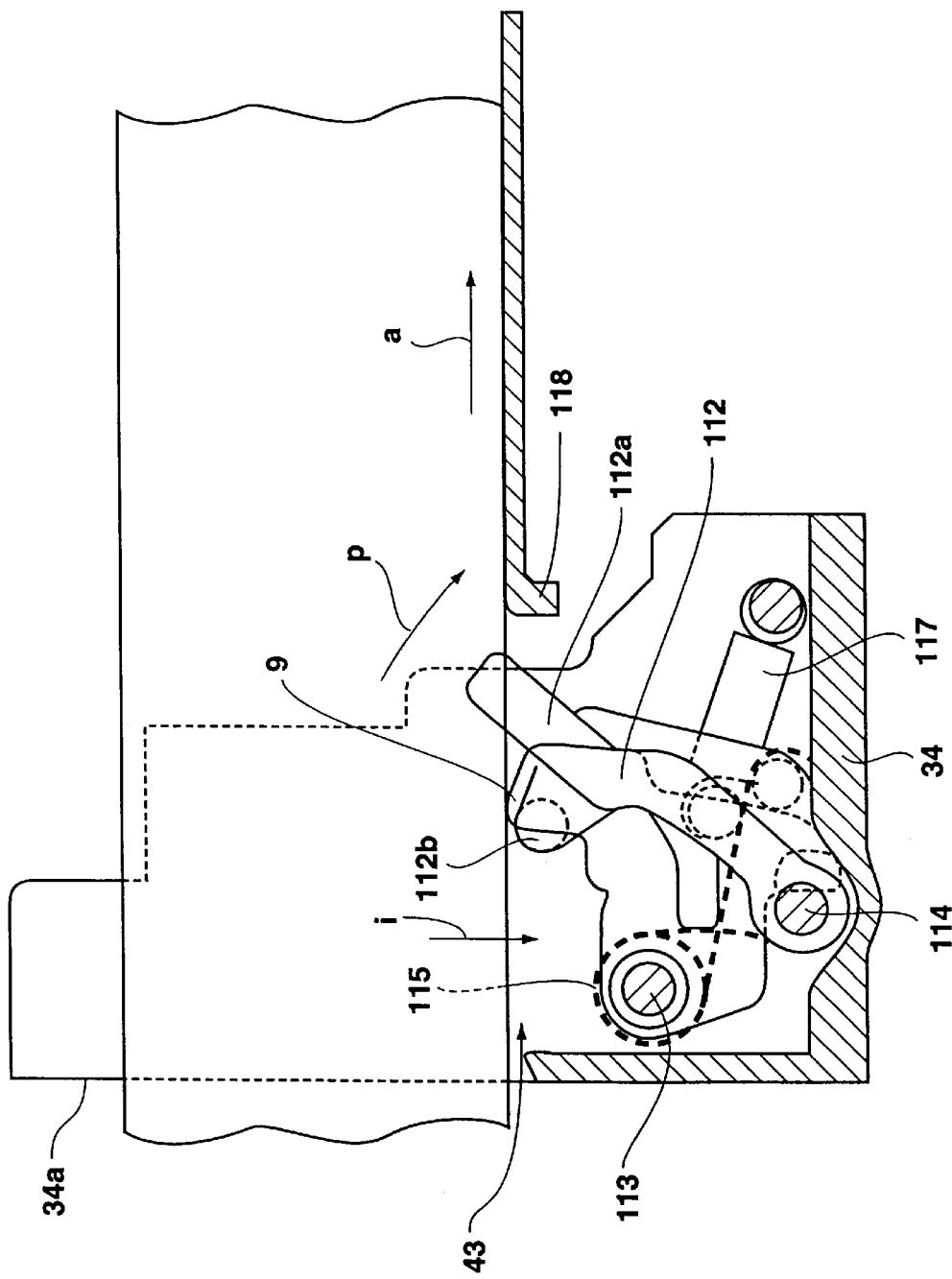
FIG. 20 is a partially notched side view showing an aspect that the cassette stage is moved from the cassette insertion position to the cassette mount position side and the cassette identifying member is moved to an accommodation position out of the cassette insertion space by the control lever.
Figure 21:
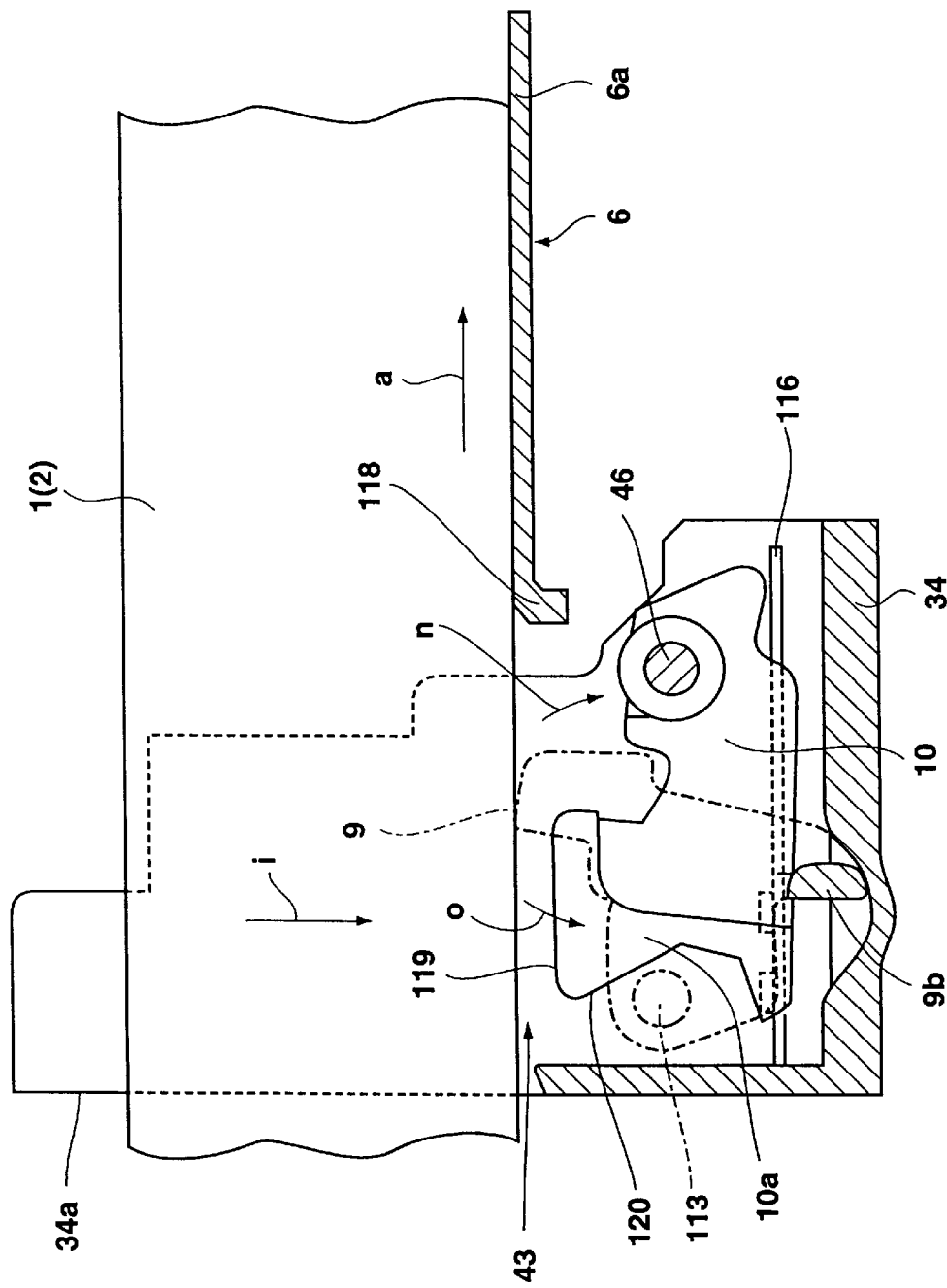
FIG. 21 is a partially notched side view showing an aspect that the cassette insertion guide is moved to the accommodation position out of the cassette insertion space by the cassette identifying member.

Next, when the cassette stage 6 starts to move from the cassette insertion position $P_1$ in the direction of the arrow a in order to load the small-size and large-size tape cassettes 1,2 to the cassette mount position Pa after the selective insertion of the small-size and large-size tape cassettes 1,2 into the cassette stage 6, as shown in FIGS. 20 and 21, the pair of right and left projections 118 of the cassette stage 6 are separated from the arms 112a of the pair of right and left control levers 112 in the direction of the arrow a. Therefore, the pair of right and left control levers 112 are simultaneously rotated in the direction of the arrow p by the pair of right and left control lever springs 117, and the pair of right and left engaging pins 112b pushes the pair of right and left engaging pieces 9a of the pair of right and left cassette identification members 9 in the direction of the arrow p. At this time, the pair of right and left cassette identification members 9 are rotated in the direction of the arrow n against the pair of right and left identification member springs 115, so that the cassette insertion guide 10 is rotated in the direction of the arrow o by the insertion guide spring 116.

Accordingly, immediately after the cassette stage 6 starts to move from the cassette insertion position $P_1$ in the direction of the arrow a, the pair of right and left cassette identification members 9 and the cassette insertion guide 10 are descended in the direction of an arrow i' to the lower side of the cassette insertion space 43 from the operation position where they are ascended in the cassette insertion space 43 by the pair of right and left control levers 112, and accommodated at the accommodation position in the front base 34. Thereafter, the pair of right and left control levers 112 are locked at the rotational position in the direction of the arrow p as they are by the pair of right and left control lever springs 117. Therefore, the pair of right and left cassette identification members 9 and the cassette insertion guide 10 are locked at the accommodation position in the front base 34 as they are.

Therefore, in the cassette loading position, the pair of right and left cassette identification members 9 and the cassette insertion guide 10 are downwardly pulled to the lower side of the cassette insertion space 43, and accommodated in the front base 34. Accordingly, it has a very good outward appearance, and even when a finger or the like is carelessly inserted through the cassette insertion port 4, it is hard to come into contact with the cassette identification members 9 or the cassette insertion guide 10. Further, since the pair of right and left control levers 112 are urged downwardly, that is, in the direction of the arrow p by the pair of right and left control lever springs 112, even when a finger or the like comes into contact with these control levers 112, the control levers 112 are immediately rotationally returned in the direction of the arrow p if the finger is detached. Therefore, it can be perfectly prevented that the cassette identification members 9 and the cassette insertion guide 10 are locked to be pulled out into the cassette insertion space 34 by a prank operation. Accordingly, there can be prevented such a risk that the cassette stage 6 collides against the cassette identification members 9 or the cassette insertion guide 10 which are carelessly pulled out into the cassette insertion space 34 at the eject time of the cassette stage 6, so that these members mutually damage each other. Therefore, high safety can be kept.

According to the cassette erroneous insertion preventing mechanism 11 as described above, as shown in FIGS. 17 and 18, the support pins 113 of the cassette identification members 9 and the support pins 114 of the control levers 112 are separately disposed and the acting point distance $L_{11}$ from the support pin 114 of the control lever 112 is set to be longer than the acting point distance $L_{12}$ from the support pin 113 of the cassette identification member 9 to the engaging pin 9b, whereby a rotational angle of the control levers 112 which is required to rotate the cassette identification members 9 can be reduced. The depth dimension of the overall cassette erroneous insertion preventing mechanism 11 in the direction of the arrow a,a' can be greatly reduced, and thus the depth dimension of the cassette stage 6 in the directions of the arrows a,a' can be increased. Particularly, the loading and ejecting operations of the large-size tape cassette 2 can be performed with high stability. Further, the arms 112a of the control lever 112 can be shortened, and the friction area between the arms and the projections 118 of the cassette stage 6 can be reduced, so that resistance to wear can be enhanced.

Description of Stopper Block

Next, as show in FIGS. 23 to 28, a pair of right and left stopper blocks 12 which are formed of synthetic resin or the like and molded in a symmetrical shape at the right and left sides are inserted into the pair of right and left openings 35 which are formed in the bottom plate 6a of the cassette stage 6, and disposed so as to be equally shared to the right and left sides with respect to the stage center $P_{11}$. Both the right and left side ends which corresponds to the outsides of the pair of right and left stopper blocks 12 are fixed between a pair of projection pieces 36 which are vertically bent downwardly from the bottom plate 6a by a pair of right and left horizontal support pins 41 so as to be freely rotatable in the directions of the arrows h,h' which correspond to the upward and downward directions. Further, a pair of right and left cassette guides 12a are symmetrically formed integrally onto the upper surfaces of the pair of right and left stopper blocks 12, and on these upper surfaces, a pair of right and left cassette stoppers 12b which comprise vertically-shaped ribs are integrally formed at the end portions of the cassette insertion direction side (the arrow a direction side) at the inner positions of the cassette guides 12a. A slant surface 12C which is gradually upwardly oblique in the cassette insertion direction (the arrow a direction) is integrally formed at the end portion at the cassette discharge direction side (the arrow a' direction side) on the upper surfaces of the pair of right and left stopper blocks 12, and stopper pieces 12d are integrally formed at the end portions in the cassette discharge direction side on the lower surfaces of the pair of right and left stopper blocks 12.

Figure 25:
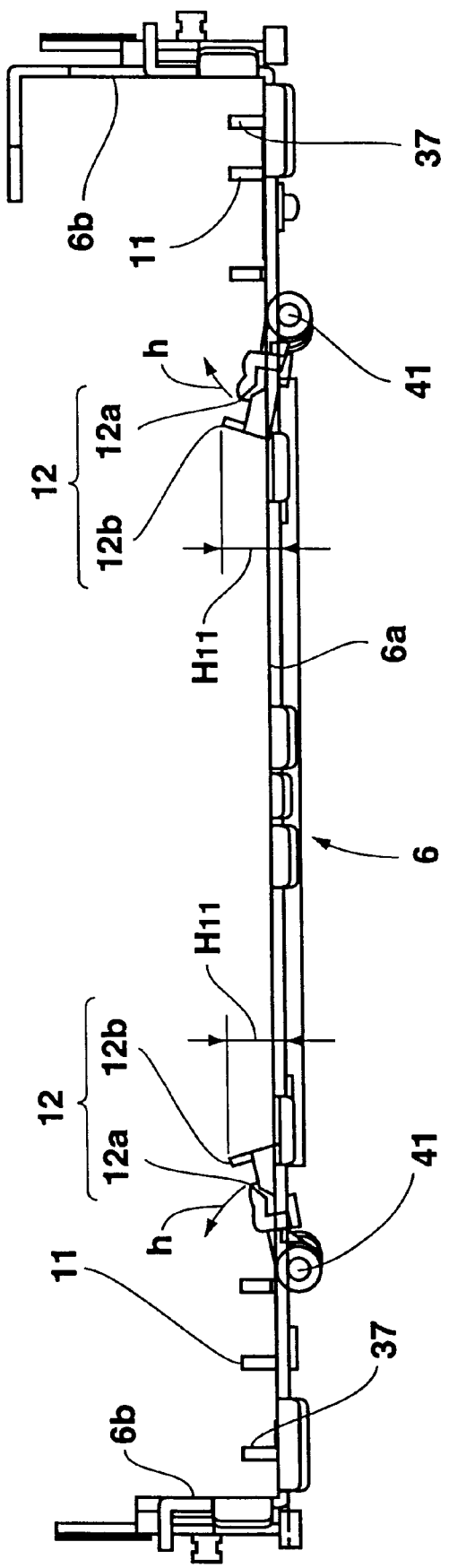
FIG. 25 is a front view showing an aspect that the stopper block invades from the lower side into the cassette stage at the maximum level.

The axial lines $P_{13}$ of the pair of right and left support pins 41 are set in the range of 0° to 90° with respect to the stage center $P_{11}$ which is the cassette insertion direction. In this case, the axial lines $P_{13}$ of the pair of right and left support pins 41 are set to have a taper angle $\theta_{11}$ so that they are tapered in the cassette insertion direction (the direction of the arrow a) with respect to the stage center $P_{11}$. Accordingly, the pair of right and left stopper blocks 12 are designed so as to freely move into and out of the cassette stage 6 in the directions of the arrows h,h' from the lower side of the bottom plate 6a. By the pair of right and left torsional coil springs 42 serving as the rotational urging means which are inserted and secured to the outer peripheries of the pair of right and left support pins 41, these right and left stopper blocks 12 get into the cassette stage 6 from the direction of the arrow h as shown in FIG. 25 to bring the stopper piece 12d into contact with the bottom plate 6a from the lower side and stop it. Accordingly, in such a state that these right and left stopper blocks 12 get into the cassette stage 6 from the direction of the arrow h, the pair of right and left cassette stoppers 12b are upwardly offset $OF_1$ from the pair of right and left support pins 41.

Figure 32:
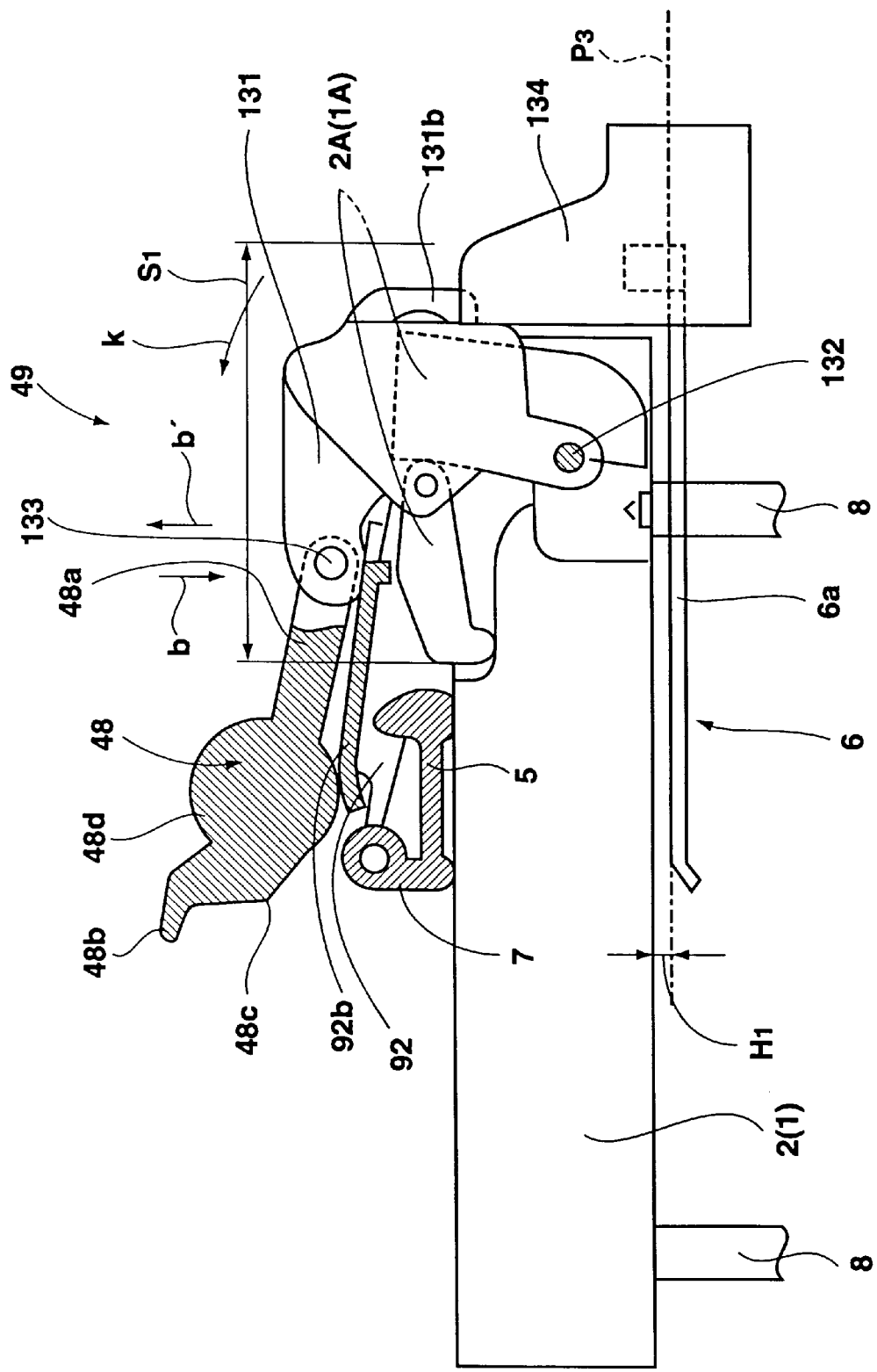
FIG. 32 is a partially side view showing an aspect that a cassette slant insertion preventing stopper is escaped to the front and upward side of the cassette stage when the tape cassette is loaded to the cassette mount position.

The pair of right and left stopper blocks 12 are constructed as described above, and as shown in FIG. 25, before the cassette is inserted into the cassette stage 6, the pair of right and left stopper blocks 12 gets into the cassette stage 6 from the direction of the arrow h by the pair of right and left torsional coil springs 42, and these cassette stoppers 12b are upwardly projected to the position corresponding to a predetermined height $H_{11}$. As shown in FIG. 32, the height $H_{11}$ is set to be higher than the height at which the small-size tape cassette 1 is upwardly floated from the bottom plate 6a of the cassette stage 6 when it is loaded onto the plural cassette positioning pins 8 of the cassette mount position $P_3$. That is, if the cassette stoppers 12b are downwardly detached from the bottom plate 1c of the small-size tape cassette 1 when the small-size tape cassette 1 is loaded to the cassette mount position $P_3$ and upwardly floated with respect to the bottom plate 6a, there is a probability that the cassette stoppers 12b cannot restore to the original engagement positions of the bottom plate 6a of the small-size tape cassette 1 when the small-size tape cassette 1 is mounted on the bottom plate 6a again at the cassette eject time. However, the above inconvenience would never occurs if the height $H_{11}$ is set to be higher than $H_1$.

Figure 22:
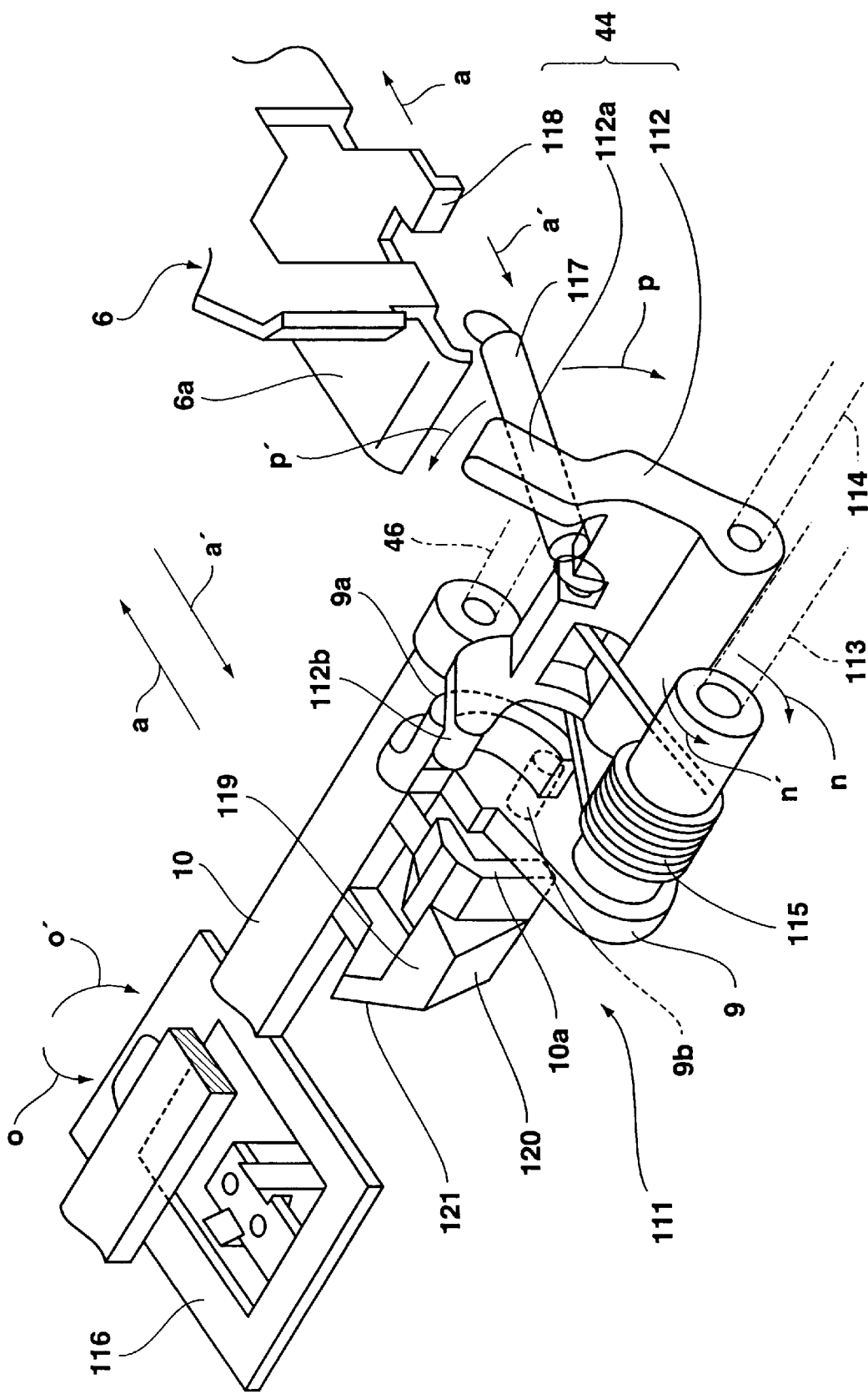
FIG. 22 is a partially notched perspective view showing the cassette erroneous insertion preventing mechanism.
Figure 23:
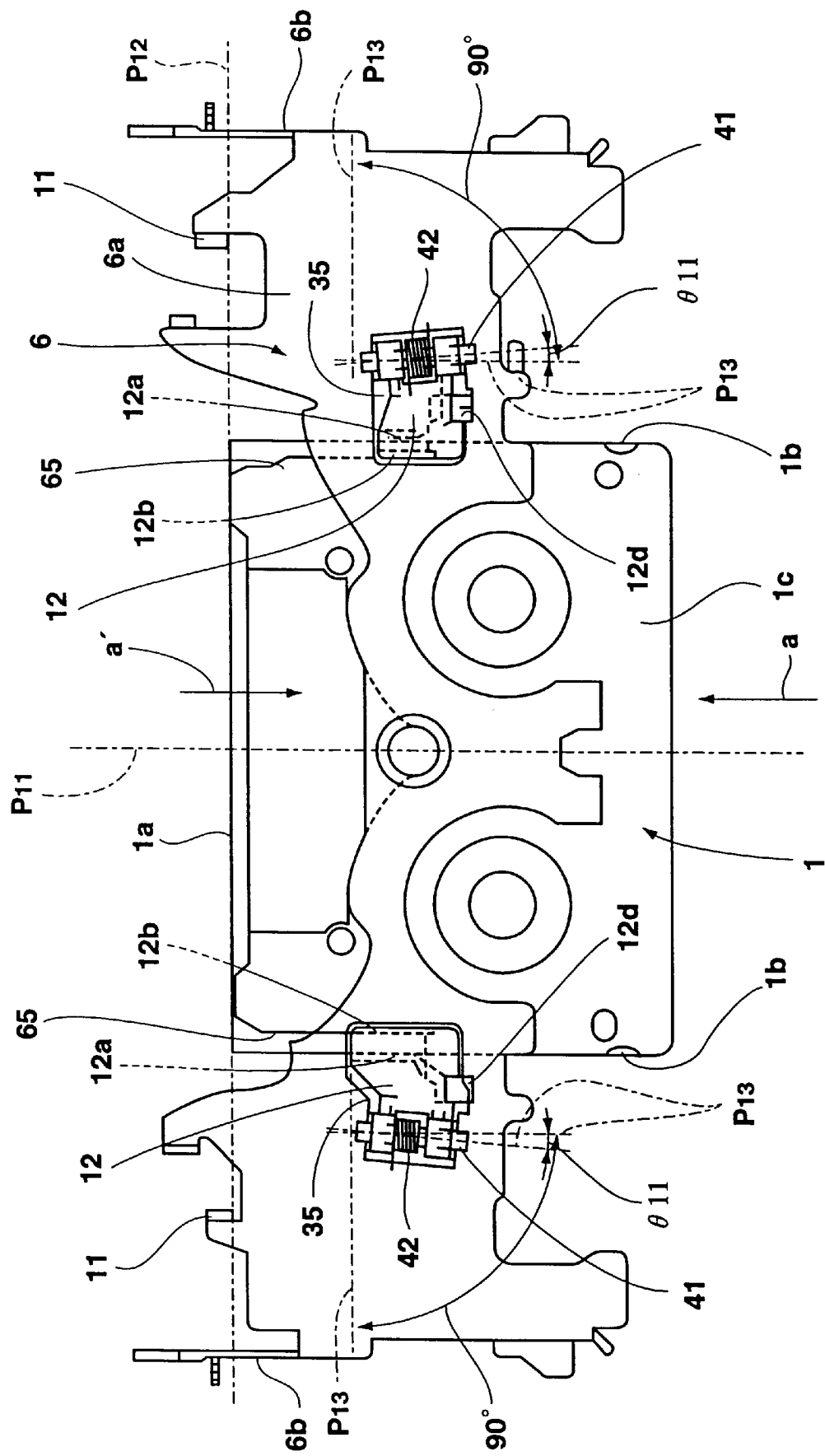
FIG. 23 is a bottom view showing an aspect that a small-size tape cassette inserted in the cassette stage is positioned to an insertion reference position on a stage center by a stopper block.

Next, as shown in FIGS. 23 to 26, when the small-size tape cassette 1 is inserted from the direction of the arrow a substantially onto the stage center $P_{11}$ in the cassette stage 6, the pair of right and left stopper blocks 12 are pushed by the bottom plate 1c of the small-size tape cassette 1, slightly rotated in the direction of the arrow h' against the pair of right and left torsional coil springs 42, and stopped at the stage that the cassette guides 12a and the cassette stoppers 12b are in a substantially vertical position. The pair of right and left cassette guides 12a guide the right and left side surfaces 1b of the small-size tape cassette 1 to position the small-size tape cassette 1 onto the stage center $P_{11}$, and also the pair of right and left cassette stoppers 12b are relatively inserted into the pair of right and left slits 65 of the small-size tape cassette in the direction of the arrow a' to position the front end 1a of the small-size tape cassette 1 to the insertion reference position $P_{12}$. At this time, one cassette stopper 12b pushes the lock lever 66 of the small-size tape cassette 1 in the direction of the arrow a' to release the lock of the front lid 1A At this time, the pair of right and left stopper blocks 12 are freely rotatably secured to the bottom plate 6a by the pair of right and left support pins 41 which are set in the range of 0° to 90° with respect to the stage center $P_{11}$, and further the cassette stoppers 12b are offset-$OF_1$ upwardly with respect to the support pins 41. Therefore, even when the small-size tape cassette 1 violently collides against the pair of right and left cassette stoppers 12b, these cassette stoppers 12b are not escaped in the direction of the arrow h' which corresponds to the downward direction, and also the small-size tape cassette 1 can be received firmly. Accordingly, the front end 1a of the small-tape cassette 1 can be positioned to the insertion reference position $P_{12}$ with high precision at all times. In this case, if the pair of right and left support pins 41 are designed to have a tapered angle $\theta_{11}$ so that they are tapered in the cassette insertion direction (the direction of the arrow a) as shown in FIG. 22, the small-size tape cassette 1 is brought into contact with the pair of right and left cassette stoppers 12b from the direction of the arrow a. When a thrust force is applied to the pair of right and left stopper blocks 12 in the direction of the arrow a, the pair of stopper blocks 12 are mutually attractively approached to each other by the amount corresponding to the backlash of the pair of right and left support pins 41, and both the right and left side surfaces 1b of the small-size tape cassette 1 are pinched by the pair of cassette guides 12a from both the right and left sides, whereby the small-size tape cassette 1 can be positioned onto the stage center $P_{11}$ with high precision.

Figure 24:
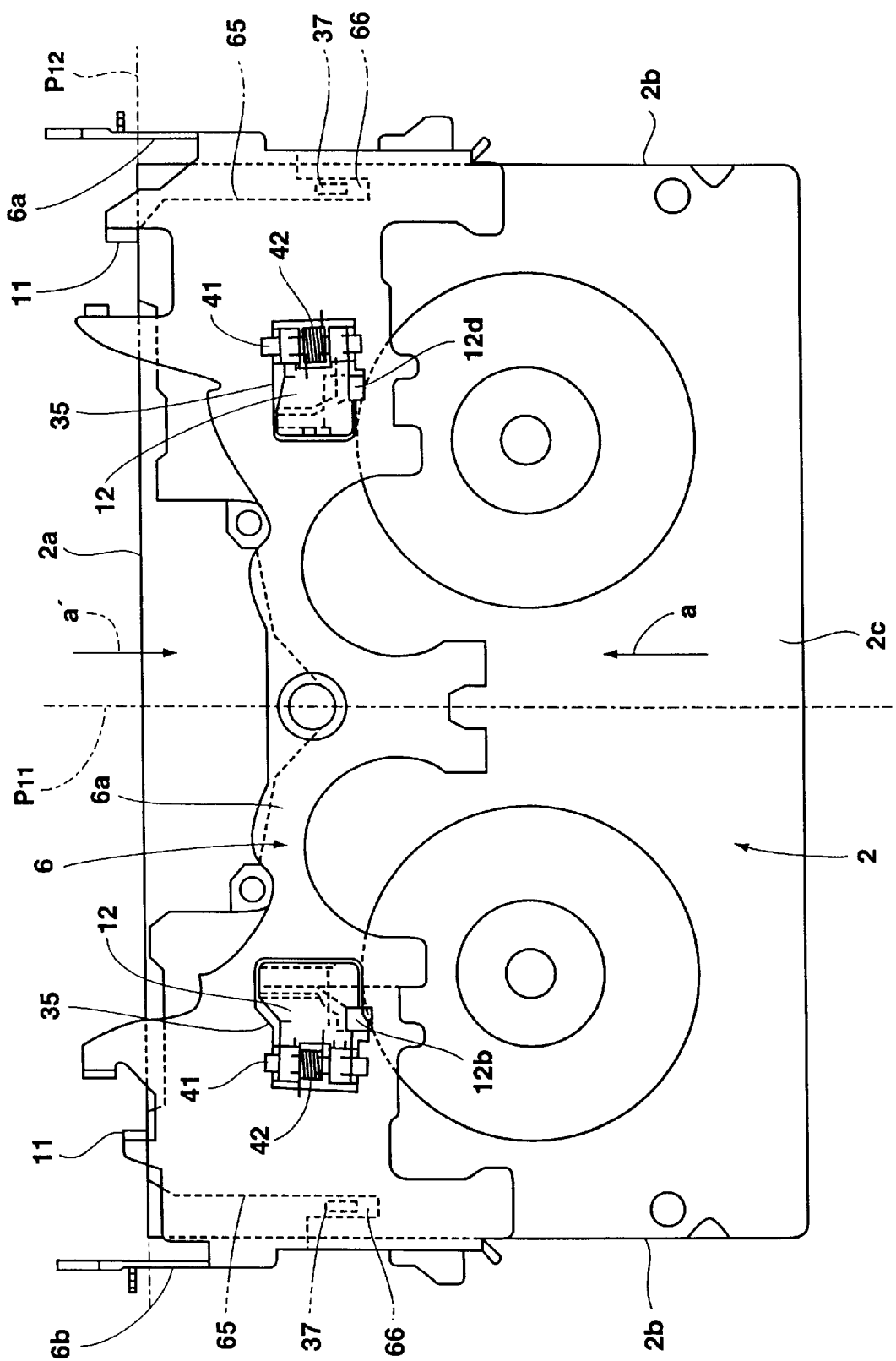
FIG. 24 is a bottom view showing an aspect that a large-size tape cassette inserted into the cassette stage is positioned to the insertion reference position on the stage center.
Figure 26:
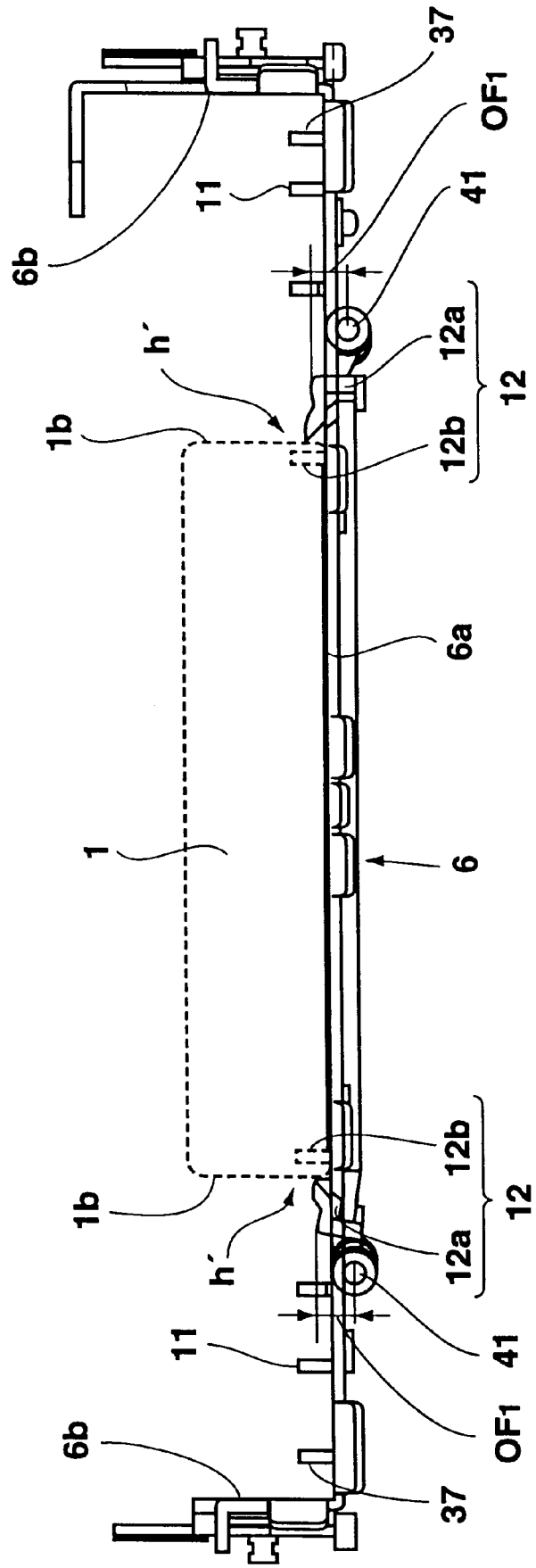
FIG. 26 is a front view showing an aspect that the small-size tape cassette inserted into the cassette stage is positioned on the stage center by the stopper block.
Figure 27:
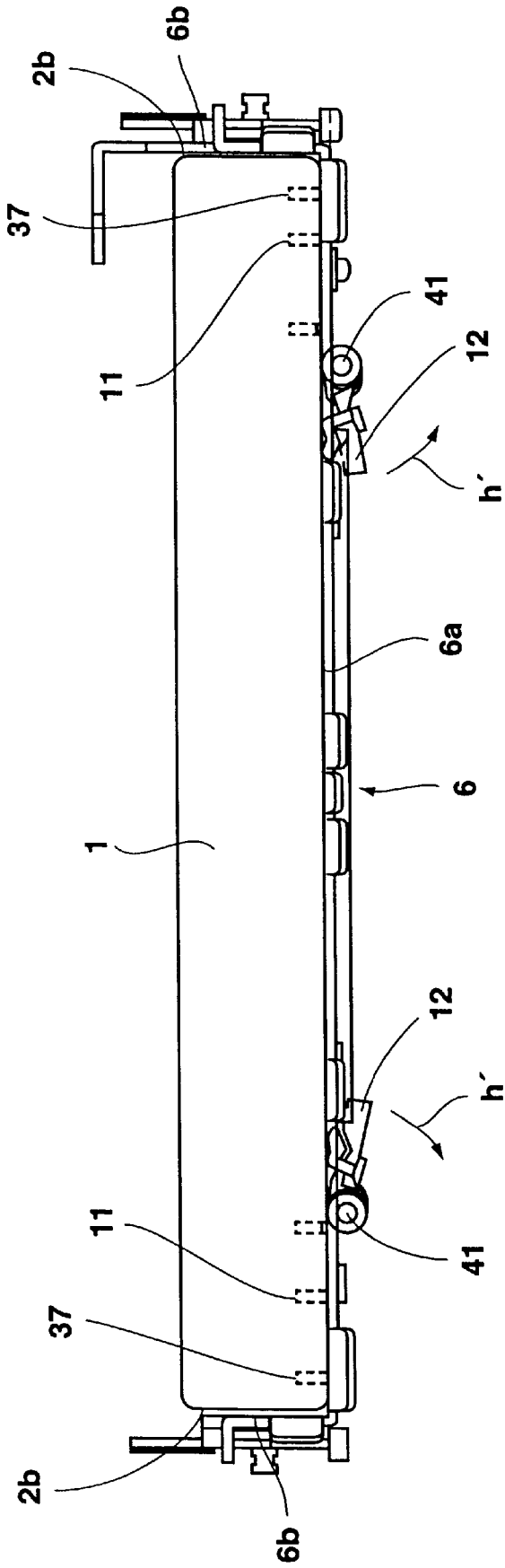
FIG. 27 is a front view showing an aspect that the stopper block is escaped to the lower side of the cassette stage by the large-size tape cassette inserted into the cassette stage.
Figure 28:
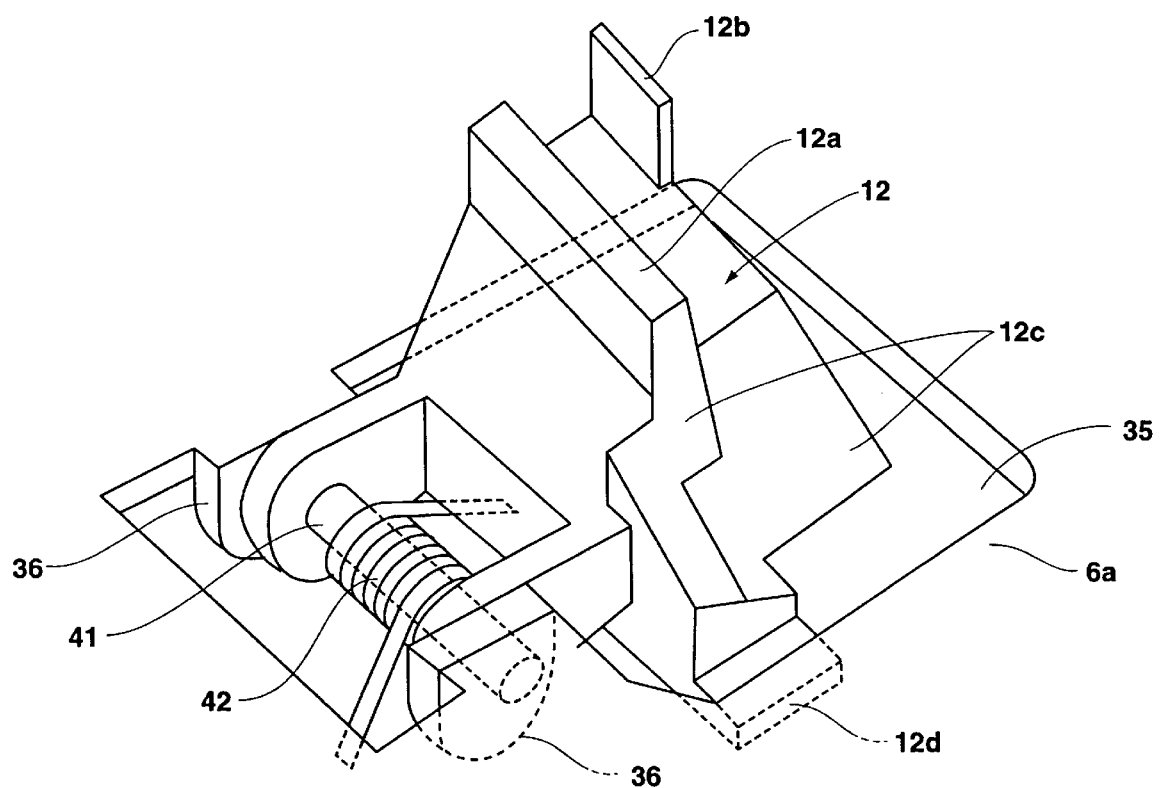
FIG. 28 is a perspective view showing the stopper block.

Next, as shown in FIGS. 24 and 26, when the large-size tape cassette 2 is inserted from the direction of the arrow a into the cassette stage 6, the tip 2a thereof gets over the slant surfaces 12c of the pair of right and left stock blocks 12, and the pair of right and left stopper blocks 12 are intensively escaped against the pair of right and left torsional coil springs 42 in the direction of the arrow h' until they are put under the bottom plate 6a. Accordingly, the pair of right and left stopper blocks 12 never obstruct to insert the large-size tape cassette 2, and thus the large-size cassette tape 2 can be smoothly inserted into the cassette stage 6 in the direction of the arrow a. At this time, the pair of right and left cassette guides 37 formed on the bottom plate 6a are relatively inserted from the direction of the arrow a' into the pair of right and left slits 65 of the large-size tape cassette 2, and the large-size tape cassette 2 is positioned onto the stage center $P_{11}$. When the front end 2a of the large-size tape cassette 2 abuts against the pair of right and left cassette stoppers 11 on the bottom plate 6a to be positioned to the insertion reference position $P_{12}$, the pair of right and left cassette guide pieces 37 relatively pushes the pair of right and left lock levers 66 in the direction of the arrow a' to release the lock of the front lid 2A.

Accordingly, since the pair of right and left torsional coil springs 42 which serve to rotationally urge the pair of stopper blocks 12 in the direction of the arrow h may merely produce such a weak force as to support the dead weight of the stopper blocks 12, the force with which the pair of right and left stopper blocks 12 upwardly lifts the small-size and large-size tape cassettes 1, 2 under the reaction force of the these torsional coil springs, can be reduced extremely. As described above, the clamp force to press and fix the small-size and large-size tape cassettes 1,2 onto the bottom plate 6a by the cassette press lever 92 can be sufficiently reduced. Accordingly, the insertion operation of the small-size and large-size tape cassettes 1,2 into the cassette stage 6 can be easily performed with very weak force, and also the small-size and large-size tape cassettes 1,2 can be easily inserted and accurately positioned to the insertion reference position $P_{12}$.

Description of Cassette Slant Insertion Preventing Mechanism

Next, as shown in FIGS. 29 to 32, the cassette slant insertion preventing mechanism 49 has a cassette slant insertion preventing stopper 48 and a lid opening/closing lever 131 which are formed of synthetic resin or the like. The front lid opening/closing lever 131 is secured to the right and left side plates 6b of the cassette stage 6 through a pair of right and left horizontal support pins so as to be freely rotatable in the directions of arrows k,k' corresponding to the upward and downward directions, and the rear end (the end portion of the arrow a direction side) 48a of the cassette slant insertion preventing stopper 48 is secured to the upper end 131a of the front lid opening/closing lever 131 through a pair of right and left horizontal support pins 133 so as to be freely rotatable in the directions of arrows g,q' corresponding to the upward and downward directions.

A hook portion 131b which is commonly engageable with the front lids 1A, 2A of the small-size and large-size tape cassettes 1,2 from the lower side is integrally formed at the position which is at the lower end side of the front lid opening/closing lever 131 and near to the center thereof. Further, plural engaging projections 48a onto the top plate portion 92b of the cassette press lever 92 which serves as a stopper support portion are integrally formed to the front end (the end portion in the arrow a' direction side) of the cassette slant insertion preventing stopper 48 so as to be spaced from one another at intervals in the right and left directions. Plural guide surfaces 48b are formed so as to extend from the plural projections 48a to the lower surface of the cassette insertion preventing stopper 48, and plural semi-circular projections 48c which abut against the lower surface of the chassis top plate 33 serving as a stopper press portion are integrally formed on the upper surface of the cassette slant insertion preventing stopper 48 so as to be spaced from one another at intervals in the right and left direction.

Figure 29:
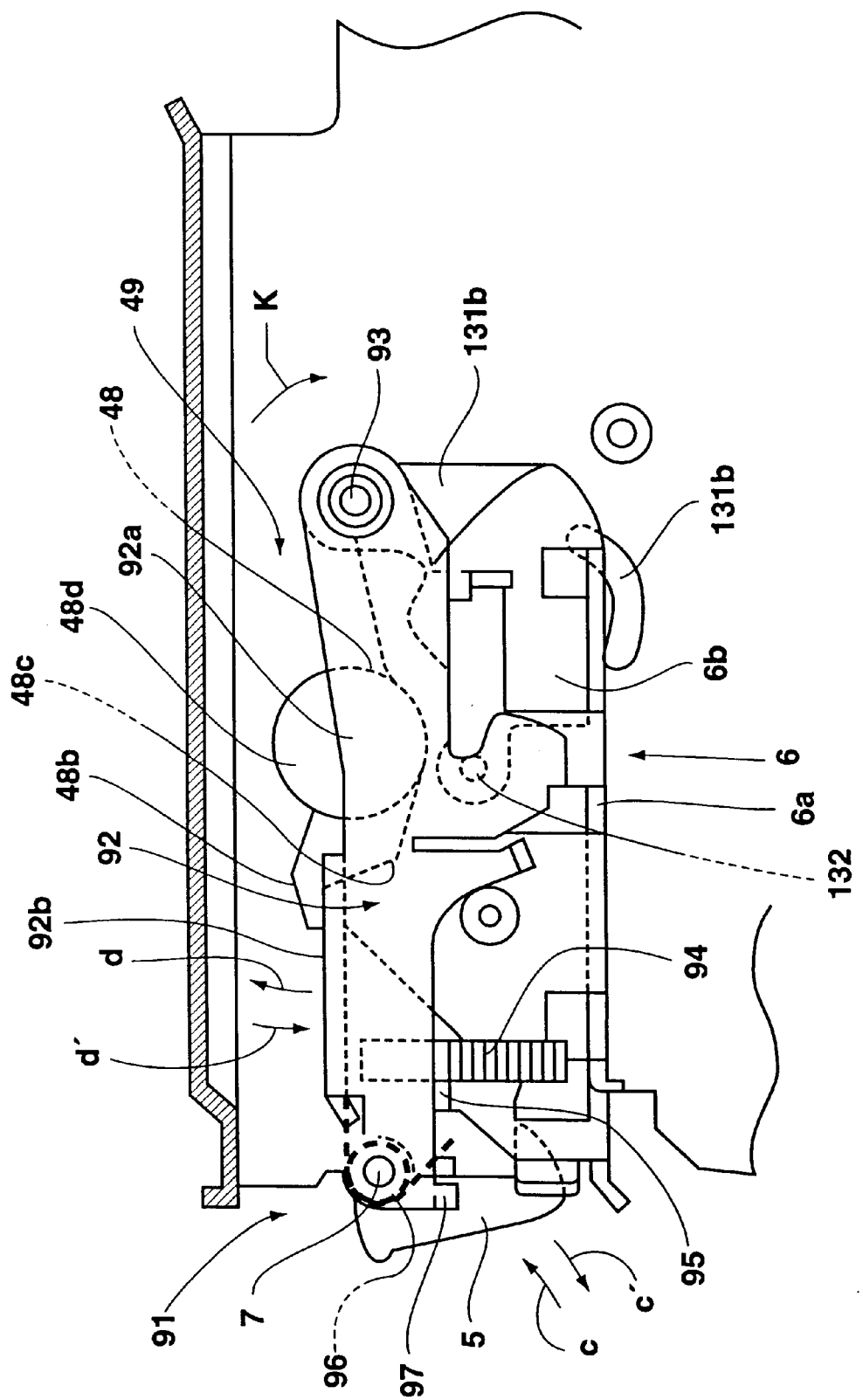
FIG. 29 is a partially notched side view showing a cassette press mechanism of the cassette stage and a cassette slant insertion preventing mechanism.
Figure 30:
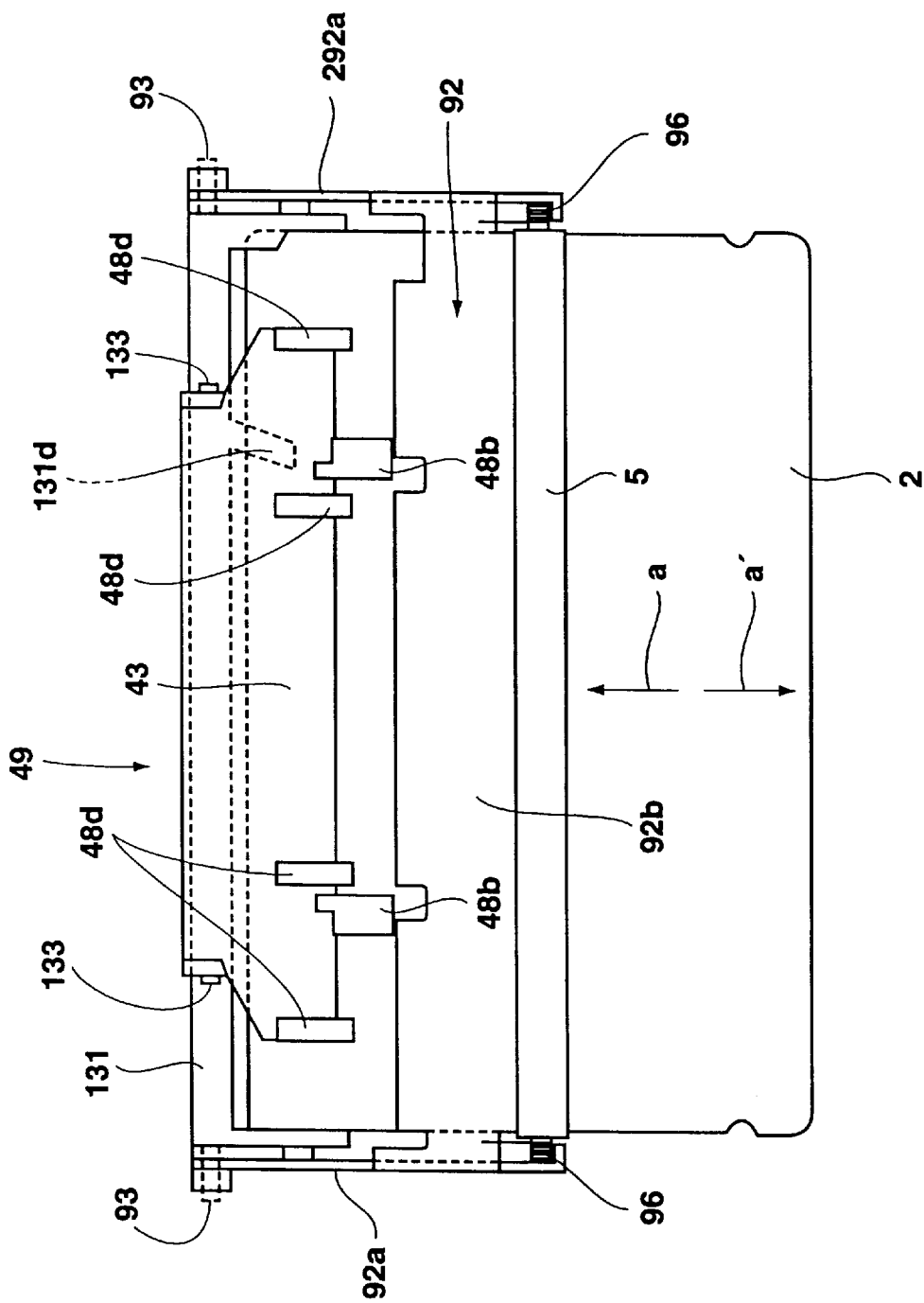
FIG. 30 is a plan view of the cassette stage of FIG. 29.
Figure 31:
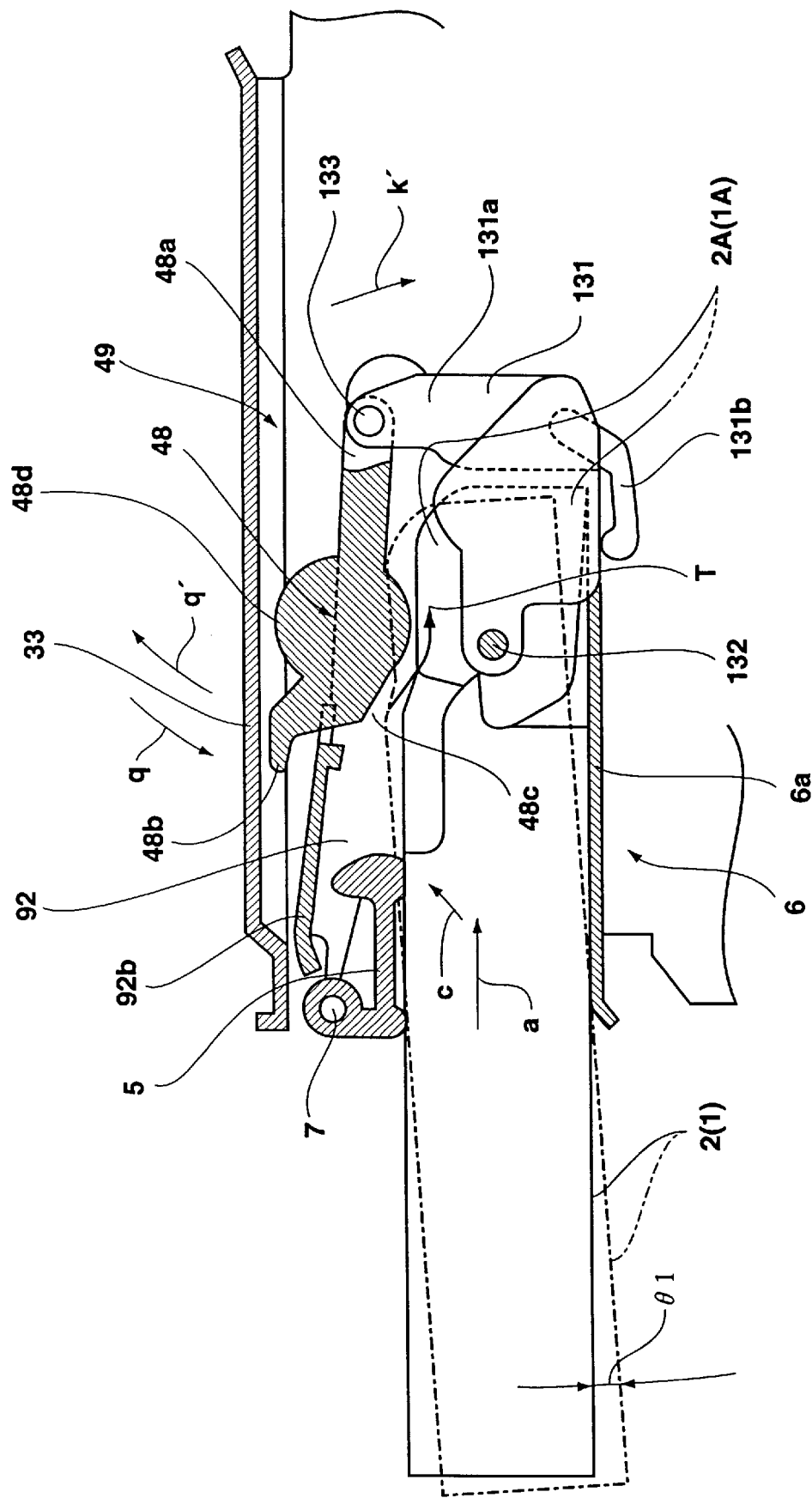
FIG. 31 is a partially notched side view showing an aspect that the tape cassette is prevented from being obliquely inserted into the cassette stage by the cassette slant insertion preventing mechanism.

As shown in FIGS. 29 and 31, before insertion of the cassette into the cassette stage 6, the cassette slant insertion preventing stopper 48 and the front lid opening/closing lever 131 are rotated in the direction of the arrow k' due to their dead weight, and the plural projections 48a of the cassette slant insertion preventing stopper 48 are mounted on the top plate portion 92b. As shown in FIG. 31, the small-size and large-size tape cassettes 1,2 are selectively inserted from the cassette insertion port 4 in the direction of the arrow a. If the small-size and large-size tape cassettes 1,2 are obliquely inserted at an upwardly oblique angle $\theta_1$ with respect to the horizontal reference as indicated by a solid line when the tape cassettes 1,2 are selectively inserted into the cassette stage 6 in the direction of the arrow a while the opening/closing lid 5 is pushed and opened in the direction of the arrow c by these tape cassettes 1,2, the front lids 1A,2A of the small-size and large-size tape cassettes 1,2 are brought into contact with the plural guide surfaces 48c of the cassette slant insertion preventing stoppers 48 obliquely from the lower side to thereby push up the cassette slant insertion preventing stopper 48 in the direction of the arrow q'. At this time, the plural projections 48d of the cassette slant insertion preventing stopper 48 abut against the lower surface of the chassis top plate 33 from the lower surface, and the floatation of the cassette slant insertion preventing stopper 48 in the direction of the arrow q' is prevented.

The front lids 1A,2A of the small-size and large-size tape cassettes 1,2 are guided by the plural guide surfaces 48a, and held down in the direction of the arrow r corresponding to the forward and downward direction, thereby preventing the slant insertion of the small-size and large-size tape cassettes 1,2 into the cassette stage 6 in advance. The small-size and large-size which are selectively inserted into the cassette stage 6 are horizontally pressed and fixed onto the bottom plate 6a by the cassette press force of the cassette press lever 92. After the cassette insertion, when the small-size and large-size tape cassettes 1,2 are selectively loaded to the cassette mount position $P_3$ from the direction of the arrow b as shown in FIG. 32 after the small-size and large-size tape cassettes 1,2 are horizontally retracted from the cassette insertion position $P_1$ to the cassette retract position $P_2$ in the direction of the arrow a, as show in FIGS. 5 to 7, the front lid opening/closing lever 131 is relatively pushed up in the direction of the arrow b' by the front lid opening/closing plate 134 which is integrally formed with one rack guide 73 and fixed at a fixed position, whereby the front lid opening/closing lever 131 is rotated in the direction of the allow k.

The cassette slant insertion preventing stopper 48 is pushed out in the direction of the arrow k by the front lid opening/closing lever 131, and the cassette slant insertion preventing stopper 48 is pushed up from the direction of the arrow k onto the top plate portion 92b of the cassette press lever 92 by the guide surface 48. At the same time, a part of the front lid 1A,2A of the small-size and large-size tape cassettes 1,2 is hooked by a hook portion 131b of the front opening/closing lever 131, whereby the front lids 1A, 2A are opened in the direction of the arrow k. That is, the front opening/closing lever 131 can smoothly open the front lids 1A, 2A while retracting the cassette slant insertion preventing stopper 48 from the inside of the opening/closing space $S_1$ in the direction of the arrow k rearwardly and upwardly. The small-size and large-size tape cassettes 1,2 which are selectively loaded from the direction of the arrow b to the cassette mount position $P_3$ are selectively held onto the plural cassette positioning pins 8 at the cassette mount position $P_3$ through the common reference hole 14, whereby the small-size and large-size tape cassettes 1,2 are pushed up (floated) to the height $H_1$ above the bottom plate 6a of the cassette stage 6. At the same time, the small-size and large-size tape cassettes 1,2 are accurately pressed and horizontally fixed onto the plural cassette positioning pins 8 by the cassette press force of the cassette press lever 92.

In FIG. 31, by fixing a leaf spring member or the like for elastically pressing the cassette slant insertion preventing stopper 48 downwardly at the lower side of the chassis top plate 33, the small-size and large-size tape cassettes 1,2 can be more effectively prevented from being obliquely inserted in a forward and upward direction.

Description of Cassette Insertion and Type Detection mechanism

Next, as shown in FIGS. 33 to 42 a cassette insertion and type detection mechanism 14 for selecting the insertion position and type of the small-size and large-size tape cassettes 1,2 which are selectively inserted into the cassette stage 6 is secured to the lower portion of the bottom plate 6a of the cassette stage 6. The cassette insertion and type detection mechanism 141 is designed so that as shown in FIGS. 3 and 4, the common detection target portions 15,16 at one end side of the respective pairs of right and left detection target portions 15,16 which are formed in the small-size and large-size tape cassettes 1,2 are detected by one common detection lever 51, and the first and second detection target portions which are arranged at different positions at the other end side are detected by a double lever mechanism 55 comprising first and second detection levers 51 and 52. The two detection levers 51 which are symmetrical between the right and left sides are formed of metal plates or the like, and the second detection lever 52 at the double lever mechanism 55 is formed of synthetic resin or the like.

One detection lever 51 and the first and second detection levers 51, 52 of the double lever mechanism 55 are fixed in the neighborhood of both the right and left ends of the lower portion of the bottom plate 6a of the cassette stage 6 through the vertical support pins 142 so as to be freely rotatable symmetrically in the directions of the arrows e,e' on the horizontal plane. Accordingly, the first and the second detection levers 51, 52 of the double lever mechanism 55 are freely rotationally secured to the common support pin 142. The two detection levers 51 at both the right and left sides are rotationally urged in the direction of the arrow e' by the pair of right and left tension coil springs 144 serving as the rotational urging means, and the second detection lever 52 of the double lever mechanism 55 is rotationally urged in the direction of the arrow e' by the torsion coil spring 145 serving as the rotational urging means. A pair of light reflection type optical sensors 22 are secured to the lower portion of the bottom plate 6 at the side of one detection lever 51 while the sensors are put face down, and two pairs of light reflection type optical sensors 22, 23 for detecting the positions of the first and second detection levers 51 and 52 respectively are secured to the lower portion of the bottom plate 6a at the side of the double lever mechanism 55 while the sensors are put face down. Further, light reflection plates 56 and 57 are secured to the totally three detection levers 51 and 52, and a projection 53 for pushing the first detection lever 51 in the direction of the arrow e and an optical shutter 54 for inhibiting the operation of the optical sensor 22 for detecting the position of the first detection lever 51 are integrally formed with the second detection lever 52 of the double lever mechanism 55. The optical shutter 54 is designed so as to be movable in a space between the optical sensor 22 and the light reflection plate 56 in the directions of the arrows e,e'. Further, one end 51a which is the inner side end of each of the two detection levers 51 at both the right and left sides is constructed as a detection portion, and the projection 53 in the second detection lever 52 of the double lever mechanism 55 is constructed as a detection portion. The one ends 51a of the two detection levers 51 and the projection 58 of the second detection lever 52 are vertically projected into the cassette stage 6 at the front side of the front end (the end portion in the arrow a direction side) of the bottom plate 6a of the cassette stage 6.

Figure 33:
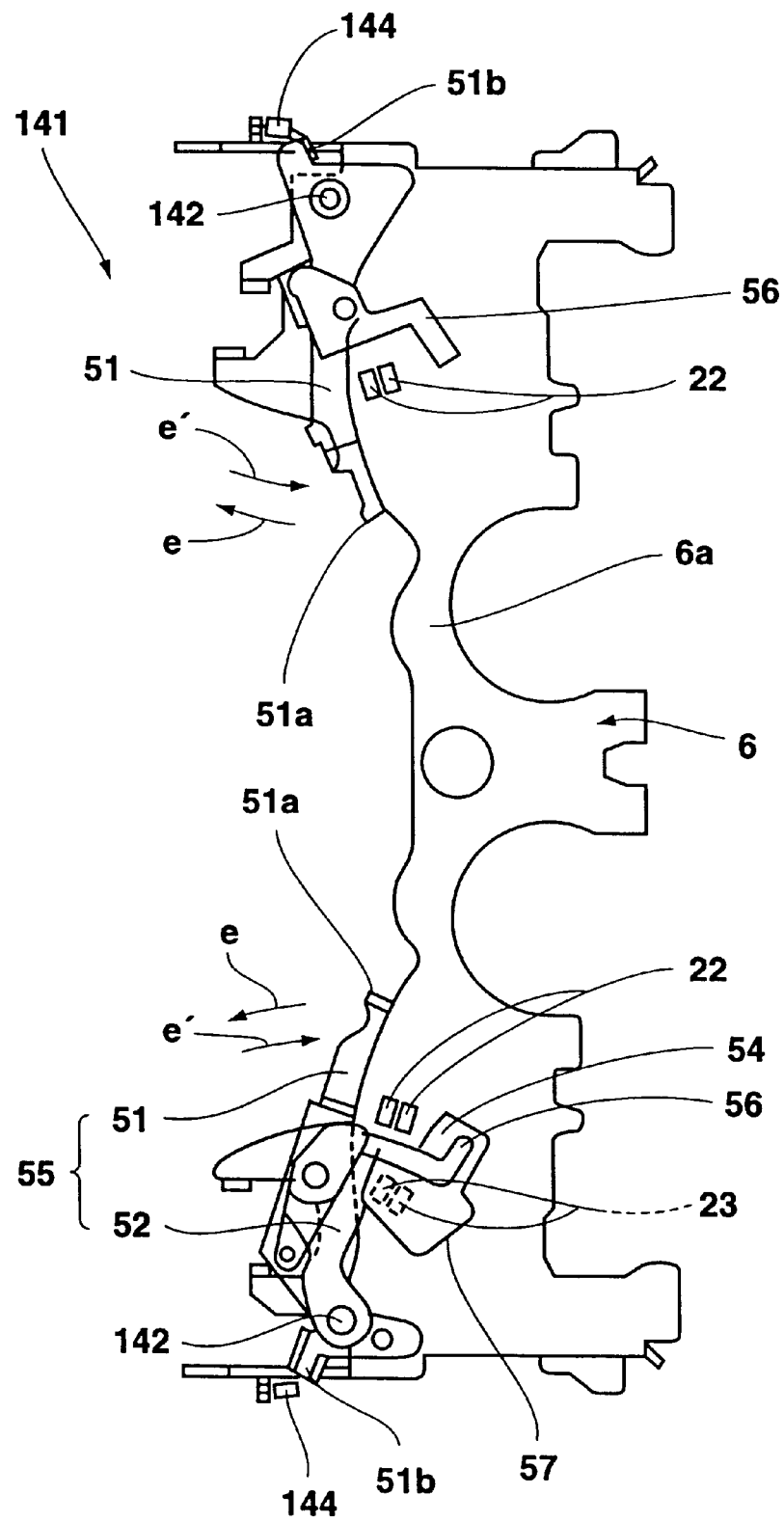
FIG. 33 is a bottom view showing a cassette insertion and type detection mechanism secured to the cassette stage.
Figure 34:
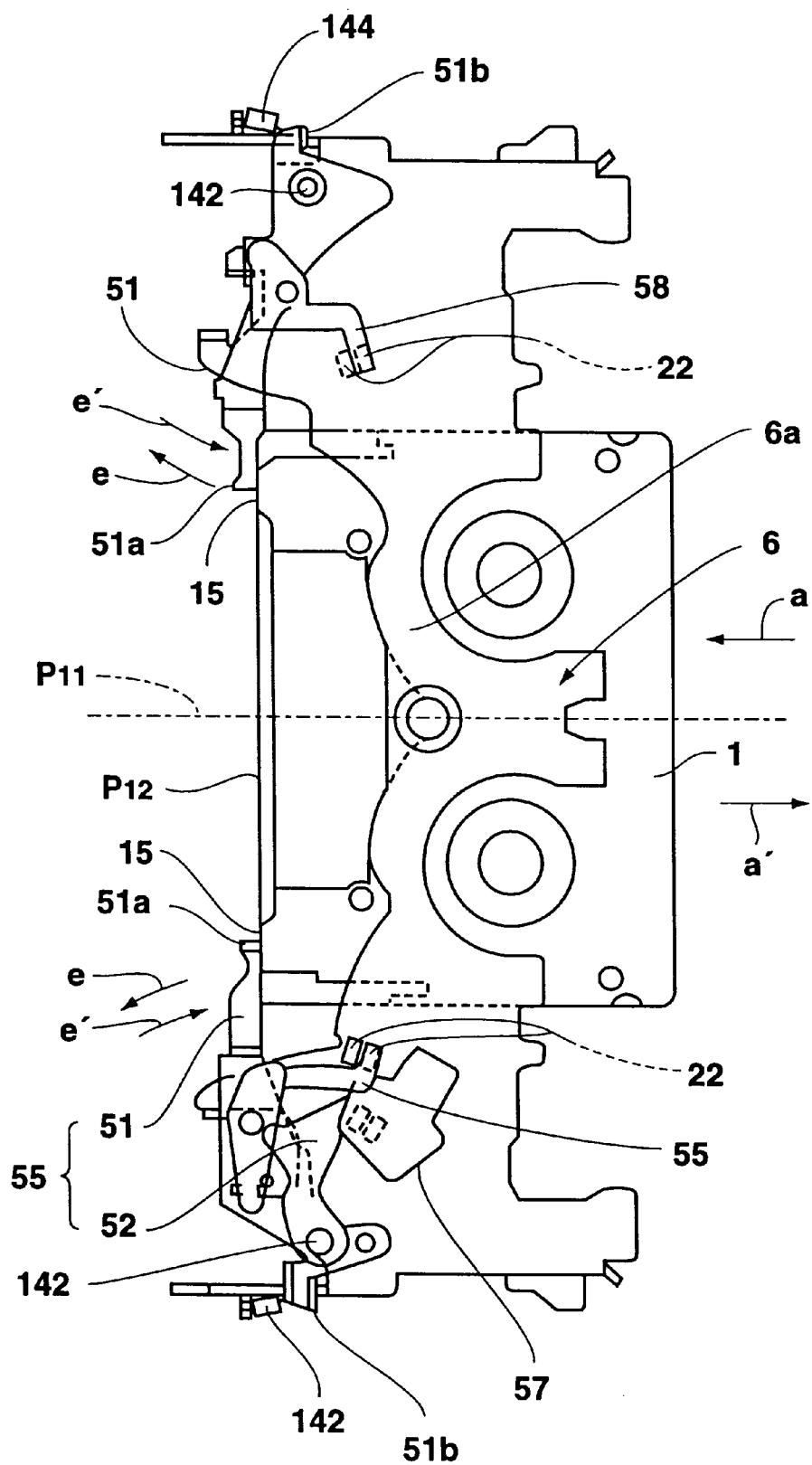
FIG. 34 is a bottom view showing the insertion position detection and the type detection of the small-size tape cassette inserted into the cassette stage.
Figure 36:
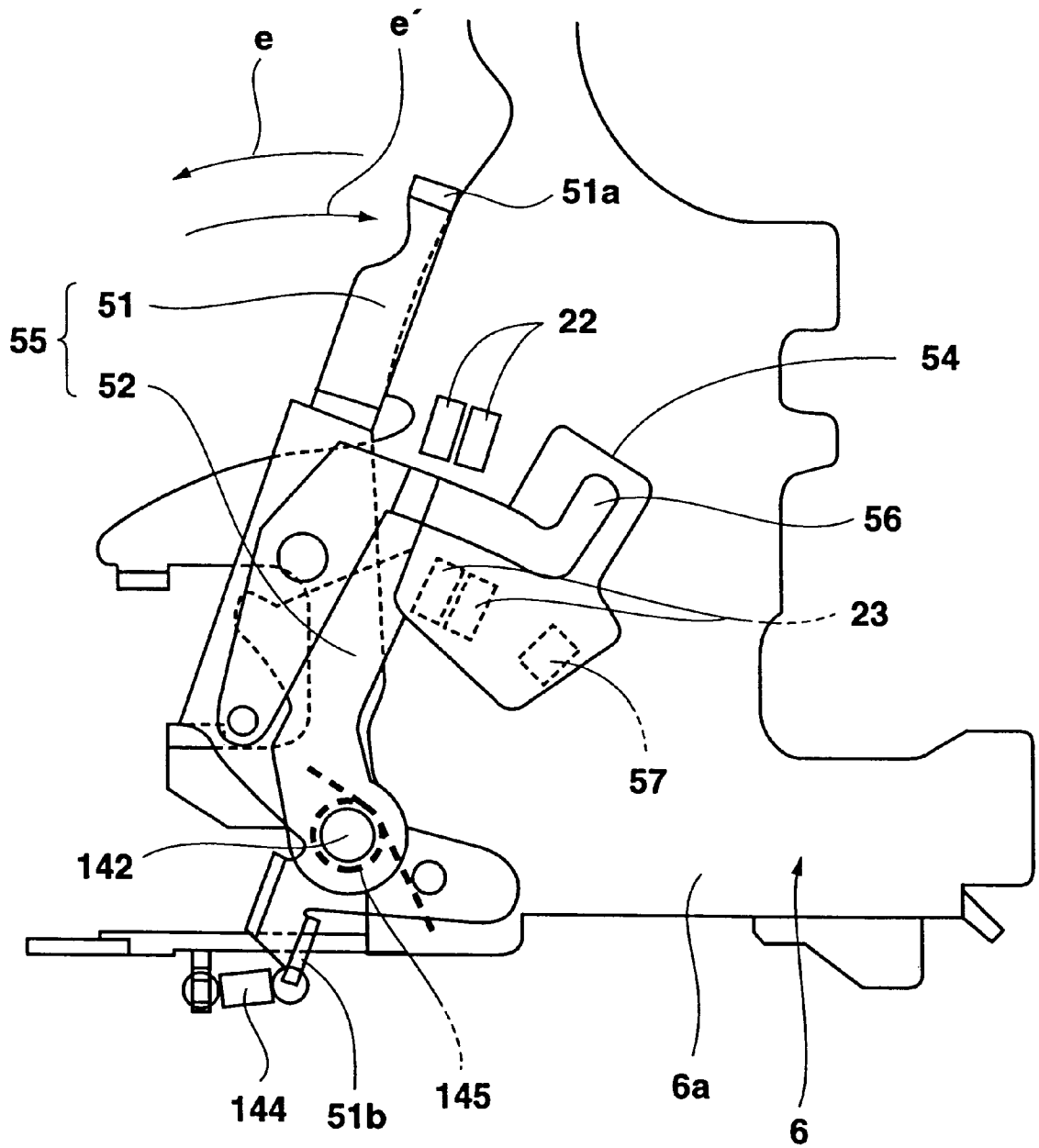
FIG. 36 is a bottom view showing a double lever mechanism in the cassette insertion and type detection mechanism.
Figure 37:
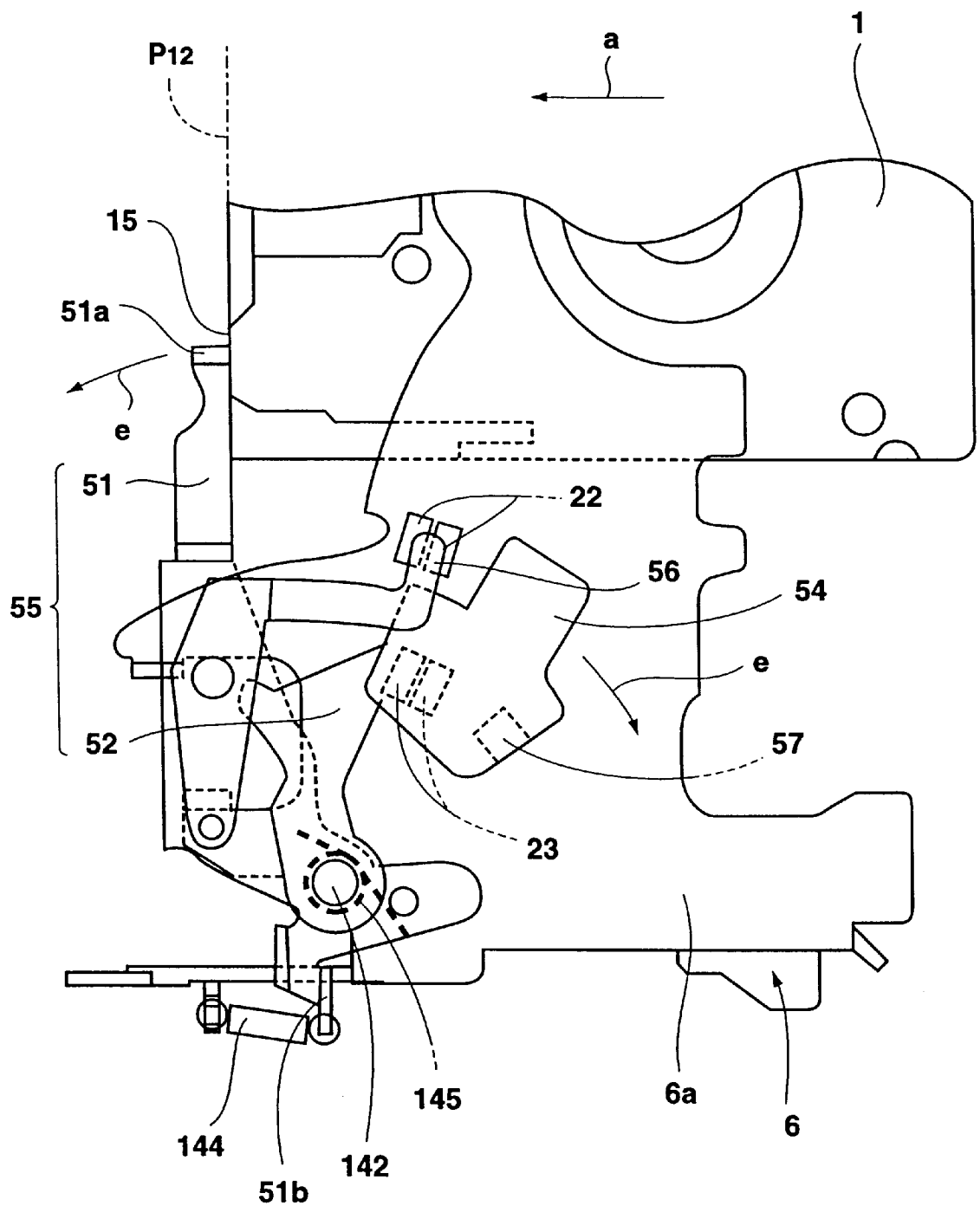
FIG. 37 is a bottom view showing the insertion position detection and the type detection of the small-size tape cassette which is performed by the double lever mechanism.
Figure 39:
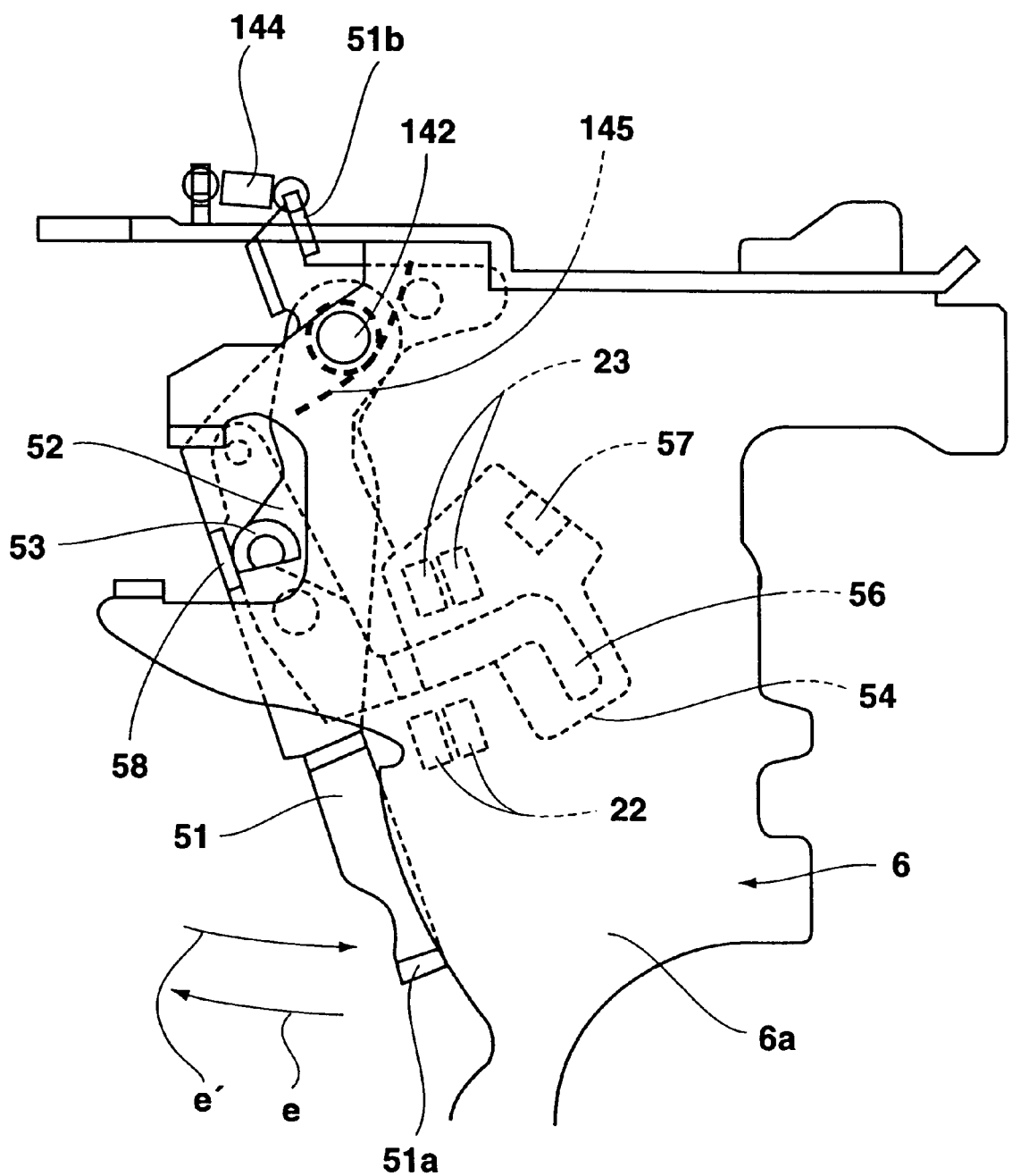
FIG. 39 is a plan view of FIG. 35.
Figure 40:
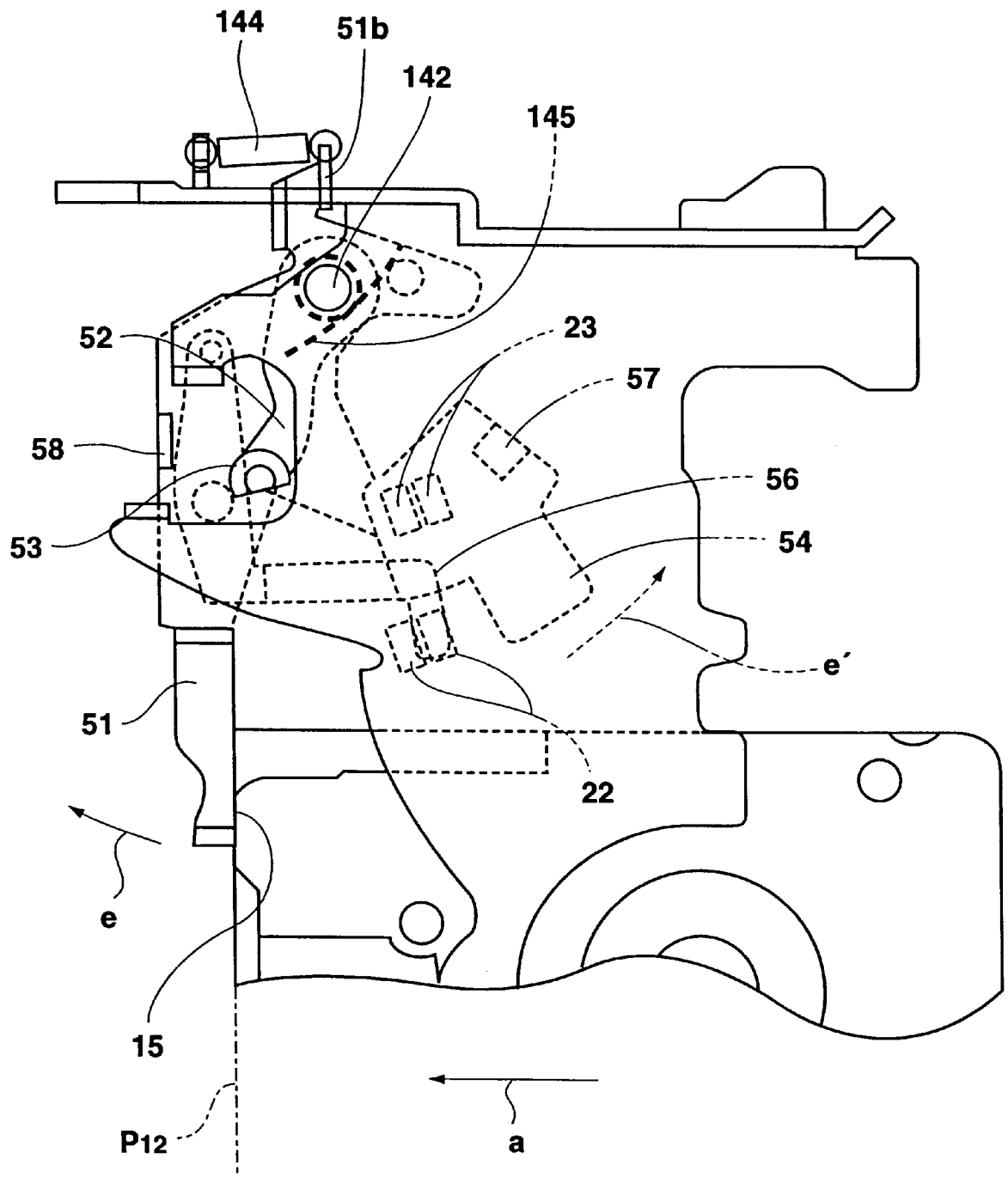
FIG. 40 is a plan view of FIG. 37.

In the cassette insertion and type detection mechanism 141, as shown in FIGS. 33, 36 and 39, totally three detection levers 51, 52 are rotated and restored in the direction of the arrow e' by the tension coil spring 144 and the torsion coil spring 145 before the cassette insertion into the cassette stage 6. As shown in FIGS. 34, 37 and 40, when the small-size tape cassette 1 is correctly inserted from the arrow a direction to the insertion reference position $P_{12}$ on the stage center $P_1$ in the cassette stage 6, a pair of right and left detection target portions 15 of the small-size tape cassette 1 abuts against the one ends 51a serving as the detection target portions of the pair of right and left detection levers 51 from the direction of the arrow a, and the pair of right and left detection levers 51 are rotated in the direction of the arrow a against the tension coil spring 145. At this time, the pair of right and left light reflection plates 56 of the pair of right and left detection levers 51 are moved to the lower side of the pair of right and left optical sensors 22, so that the pair of right and left optical sensors 22 are turned on to detect the rotational positions of the pair of right and left detection levers 51 by the pair of right and left optical sensors 22, thereby simultaneously performing the type detection indicating that the inserted cassette is a small-size tape cassette 1 and the insertion position detection indicating that the small-size tape cassette 1 is correctly inserted to the insertion reference position.

Figure 35:
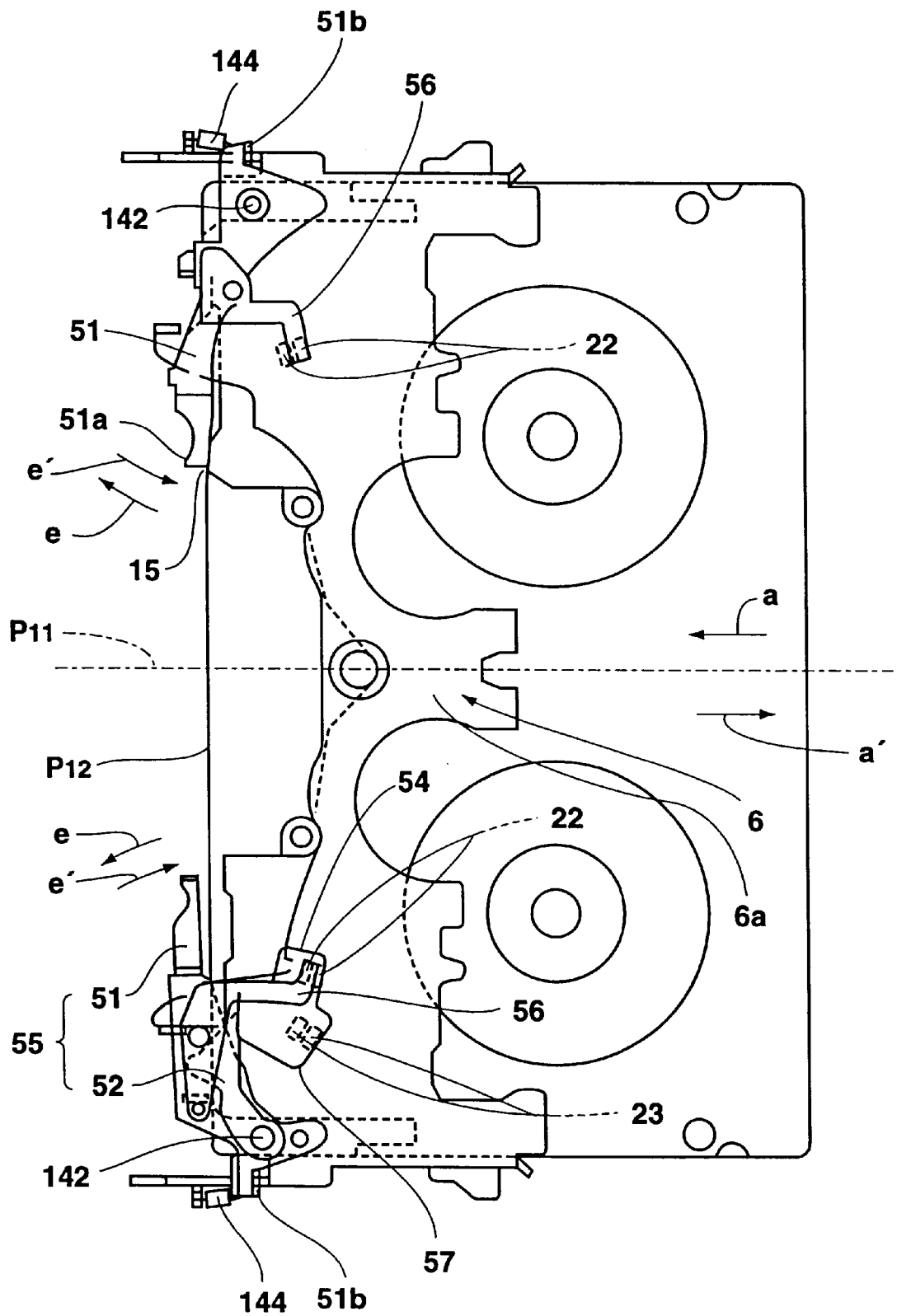
FIG. 35 is a bottom view showing the insertion position detection and the type detection of the large-size tape cassette inserted into the cassette stage.
Figure 38:
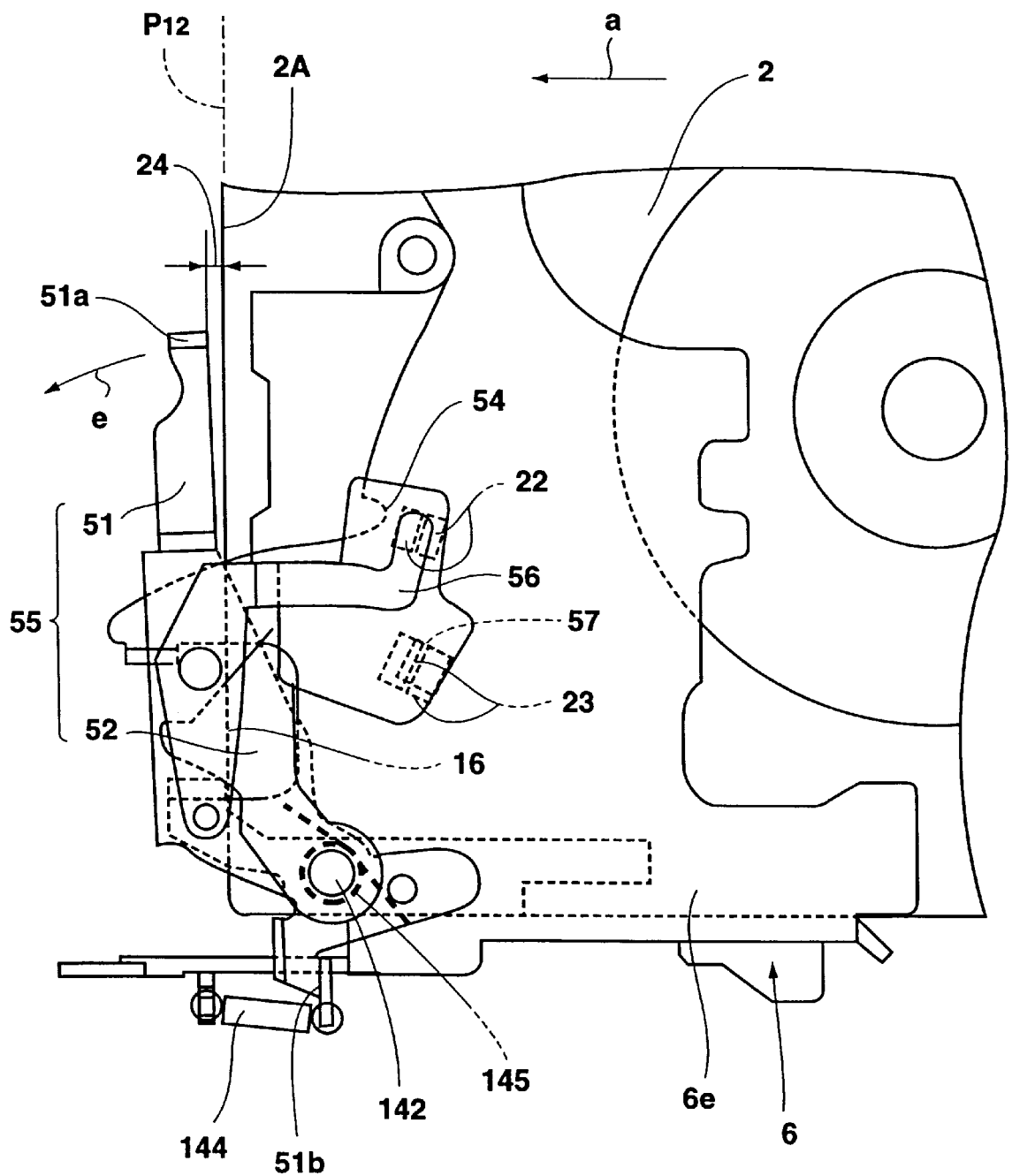
FIG. 38 is a bottom view showing the insertion position and the type detection of the large-size tape cassette which is performed by the double lever mechanism.
Figure 41:
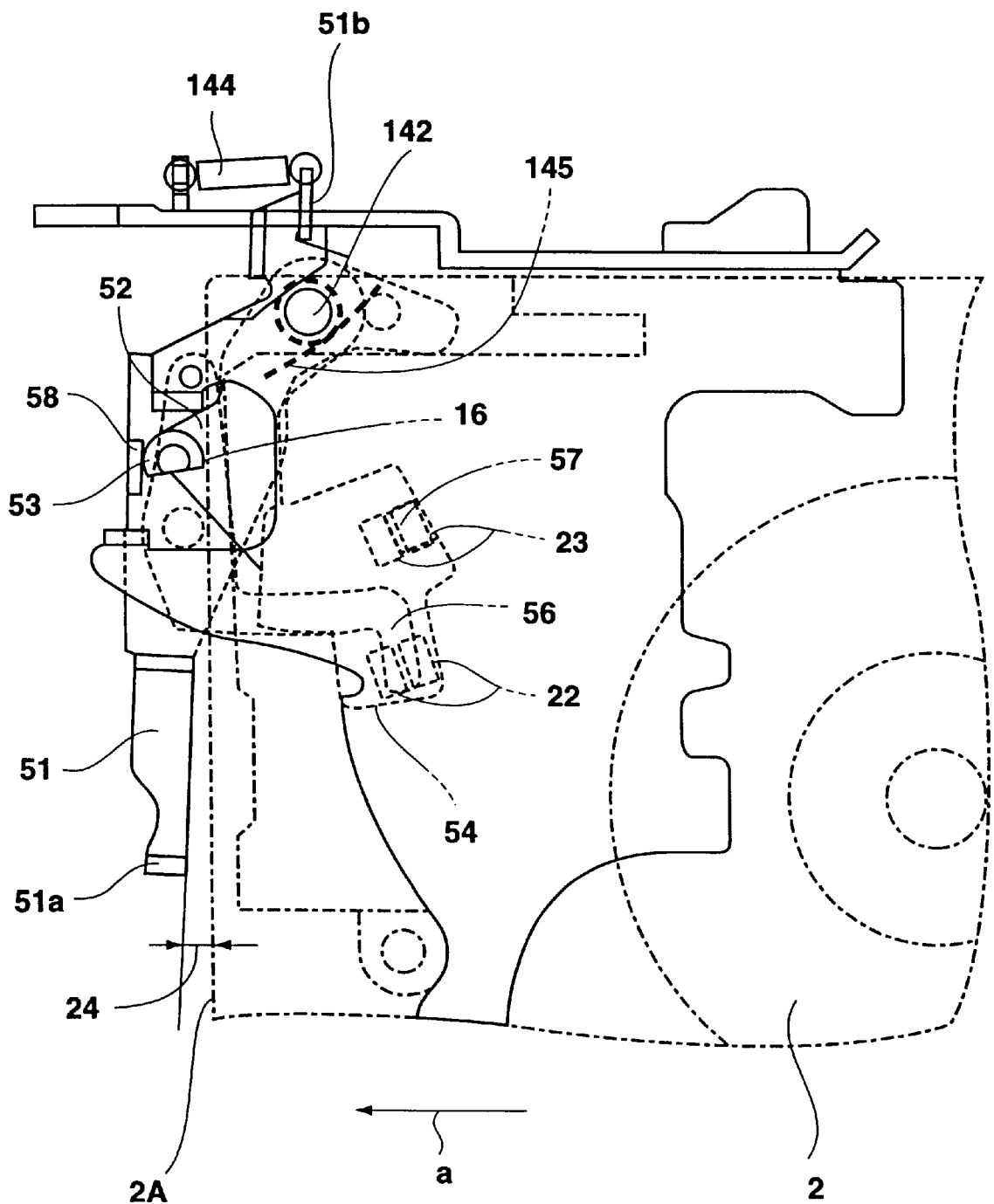
FIG. 41 is a plan view of FIG. 38.
Figure 42:
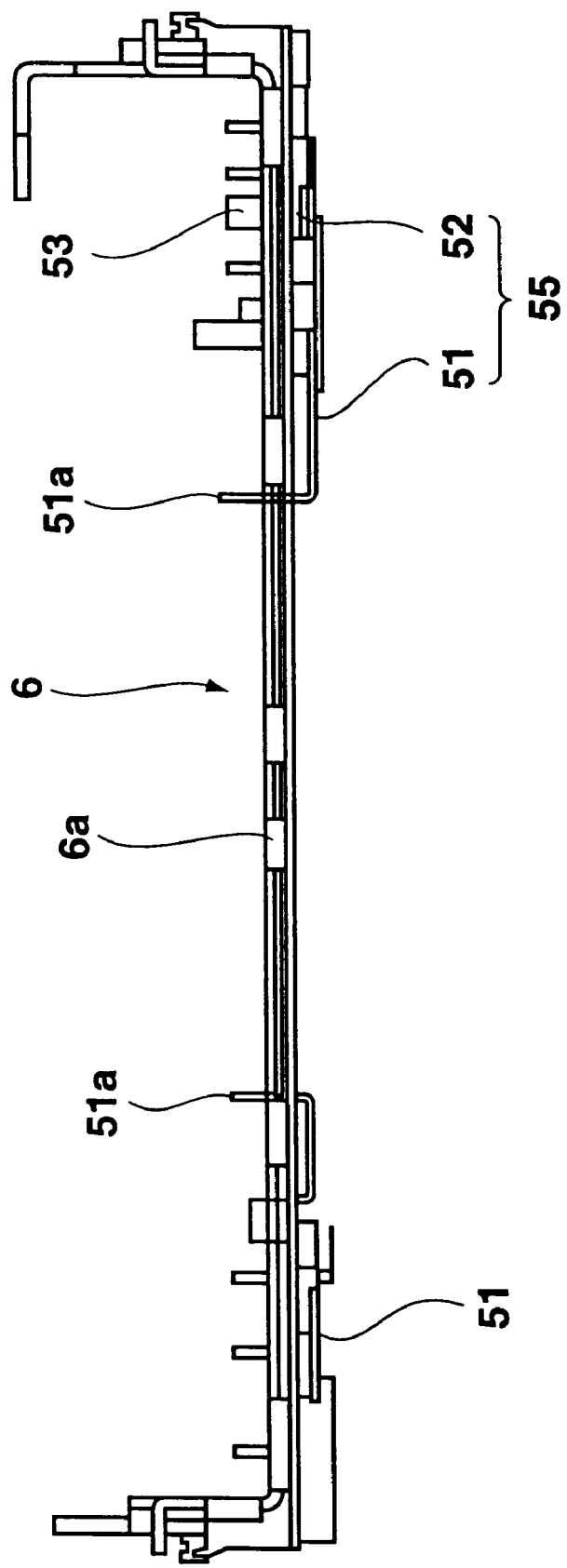
FIG. 42 is a plan view of FIG. 33.
Figure 43:
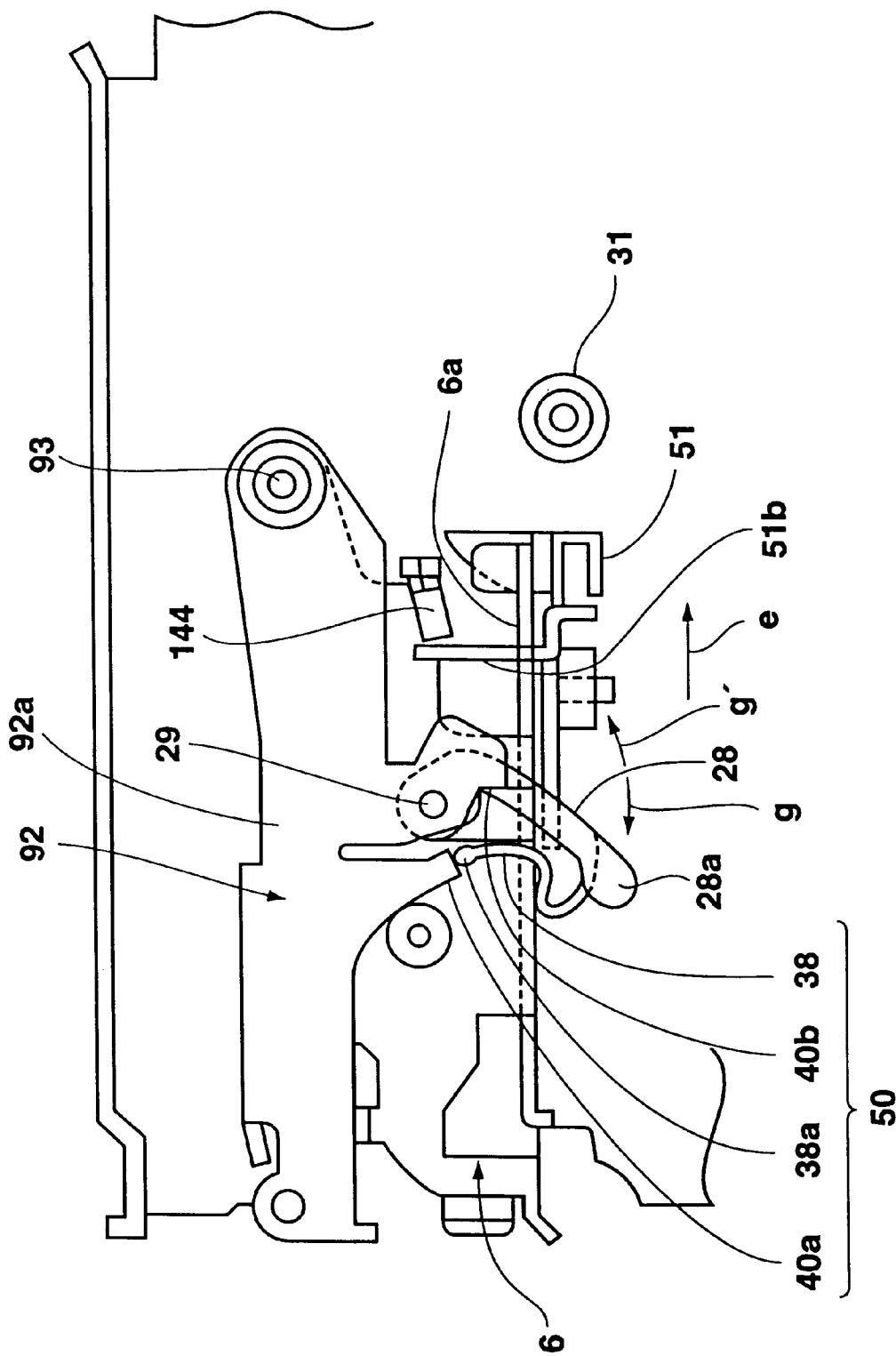
FIG. 43 is a side view showing a cassette discharge mechanism.

Next, as shown in FIGS. 35, 38 and 41, when the large-size tape cassette 2 is correctly inserted in the direction of the arrow a to the insertion reference position $P_{12}$ on the stage center $P_{11}$ in the cassette stage 6, the pair of right and left detection target portions 16 of the large-size tape cassette 2 abuts against the one end 51a serving as the detection portion of one detection lever 51 and the projection 53 serving as the detection portion of the second detection lever 52 of the double lever mechanism 55 from the direction of the arrow a. At this time, the one detection lever 51 is simply rotated in the direction of the arrow e in the same manner as described above, and one optical sensor 22 is turned on. However, in the double lever mechanism 55, the second detection lever 52 is first rotated against the torsion coil spring 145 in the direction of the arrow e around the common support pin 142.

The optical shutter 54 of the second detection lever 52 preferentially moves to the lower side of the optical sensor 22 in a space between the optical sensor 22 and the light reflection plate 56 to inhibit the operation of the optical sensor 22 (to inhibit the shift from OFF to ON and lock the optical sensor to OFF state), and at the same time the projection 53 of the second detection lever 52 abuts against the projection 58 of the first detection lever 51 from the direction of the arrow e to push and move the first detection lever 51 against the tension coil spring 144 around the common support pin 142 in the direction of the arrow e. The light reflection plate 57 of the second detection lever 52 is moved to the lower side of the optical sensor 23 to turn on the optical sensor 23, and the rotational position of the second detection lever 52 is detected by the optical sensor. 23. On the other hand, the light reflection plate 56 of the first detection lever 51 which is pushed and moved in the direction of the arrow e is also moved to the lower side of the optical sensor 22. However, the optical shutter 54 which preferentially moves has stopped below the optical sensor 22, so that the optical sensor 22 is kept in OFF state.

Accordingly, when the large-size tape cassette 2 is correctly inserted to the insertion reference position $P_{12}$ on the stage center $P_{11}$ in the cassette stage 6, the two optical sensors 22 and 23 are turned on to simultaneously perform the type detection indicating that the inserted cassette is a large-size tape cassette 2 and the insertion position detection indicating that the large-size tape cassette 2 is correctly inserted to the insertion reference position $P_{12}$. In addition, since at this time the second detection lever 51 is pushed and moved in the direction of the arrow e by the projection 53 of the first detection lever 52, as shown in FIGS. 38 and 41 the rotational angle of the first detection lever 51 in the direction of the arrow e is increased, and the one end 51a thereof is separated in the direction of the arrow a from the front lid 2A of the large-size tape cassette 2, thereby forming a gap 24 therebetween. Accordingly, when the large-size tape cassette 2 is loaded to the cassette mount position $P_3$ to open the front lid 2A after the cassette insertion as described above, or when the large-size tape cassette 2 is ejected from the cassette mount position $P_3$ to close the front lid 2a, the front lid 2A can be smoothly opened/closed with no interference with the one end 51a of the first detection lever 51.

According to the cassette insertion position and type identification mechanism 141 as described above, the insertion position detection and the type detection of the small-size and large-size tape cassettes 1,2 can be performed by commonly applying the first and second detection levers 51, 52 of the double lever mechanism 55 to these cassettes.

Therefore, the number of parts and the number of steps can be reduced, and the saving of the space and the reduction of the cost can be performed. In addition, when the second detection lever 52 performs the insertion position detection and the type detection of the large-size tape cassette 2, the operation of the optical sensor 22 for the first detection lever 51 which is used to perform the insertion position detection and the type detection of the small-size tape cassette 1 is inhibited by the optical shutter 54 of the second detection lever 51. Therefore, the operations of the two optical sensors 22, 23 for detecting the positions of the first and second detection levers 51 and 52 are made clear, and a cumbersome adjustment work in a fabrication process is unnecessary. Further, when the large-size tape cassette 2 is inserted, the first detection lever 51 is pushed and moved by the projection 53 of the second detection lever 52 to violently separate the one end 51a of the first detection lever 51 from the front lid 2A of the large-size tape cassette 2. Therefore, the front lid 2A can be smoothly opened/closed with no interference of the one end 51a of the first detection lever 51. The optical sensors 22, 23 used for the cassette insertion and type detection mechanism 141 are not limited to the light reflection type optical sensors, but a light transmission type optical sensor may be used.

Description of Cassette Discharge Mechanism

Next, as shown in FIGS. 33 to 47J, in the cassette discharge mechanism the pair of right and left detection levers 51 and 52 are also used as a cassette discharge lever, and in the following description, these detection levers 51, 52 are described as cassette discharge levers 51, 52. The pair of right and left cam driven levers 28 for driving the pair of right and left cassette discharge levers 51, 52 are secured to the pair of right and left side plate portions 92a of the cassette press lever 92 in the cassette stage 6 through the pair of right and left horizontal support pins 29 so as to be freely rotatable in the directions of the arrows g,g' on the vertical plane. The pair of right and left cam driven levers 28 are suspended at the lower side of the pair of right and left support pins 29, and the pair of cams 31 comprising rollers are rotationally freely secured in a horizontal moving locus of the directions of the arrows a,a' of the lower ends 28a of the pair of right and left cam driven levers 28 inside the pair of right and left chassis side plates 32 shown in FIGS. 4 to 8.

At this time, as shown in FIGS. 47A to 47J, a pair of right and left cam driven levers 28 are formed of synthetic resin, and a contact portion 39 to the other end 51b of the cassette discharge lever 51 is integrally formed at the inside position of the lower end 28a which is brought into contact with the cam 31, and the a leaf spring portion 38 which is bent substantially upwardly in a wavelike form from the side surface of the arrow g direction side of the contact portion 39. Further, a stopper pin 38a which is in parallel to the axial direction of the support pin 29 is integrally formed at the upper end of the leaf spring portion 38, and a securing hole 28b for the support pin 29 is formed at the upper end of each of the pair of right and left cam driven levers 28. Further, two stoppers 40a, 40b for positionally regulating the stopper pins 38a within a fixed range at two positions on the peripheries of the support pins 29 are formed at the lower end edges of the pair of right and left side plates 92a of the cassette press lever 92 to which the pair of right and left cam driven levers 28 are freely rotationally secured through the pair of right and left support pins 29. The leaf spring portion 38, the stopper pin 38a and the two stoppers 40a, 40b constitute the control means 50 for positionally regulating the cam driven levers 28 at the intermediate position within its swing range and with some degree of freedom in a fixed range.

Figure 46:
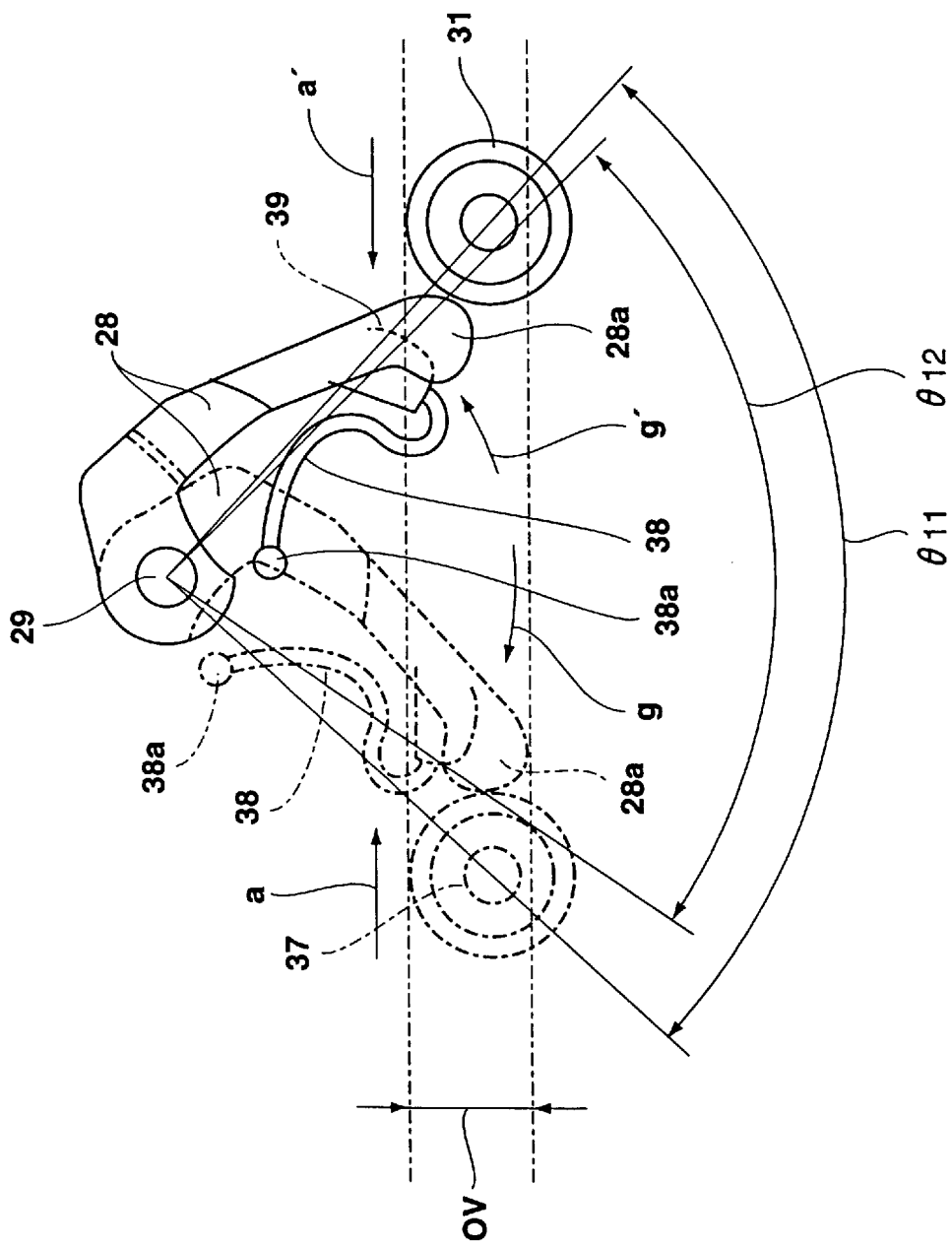
FIG. 46 is a diagram showing a swing range where the cam driven lever is driven by the cam, and a swing range with some degree of freedom.
Figure 47A:
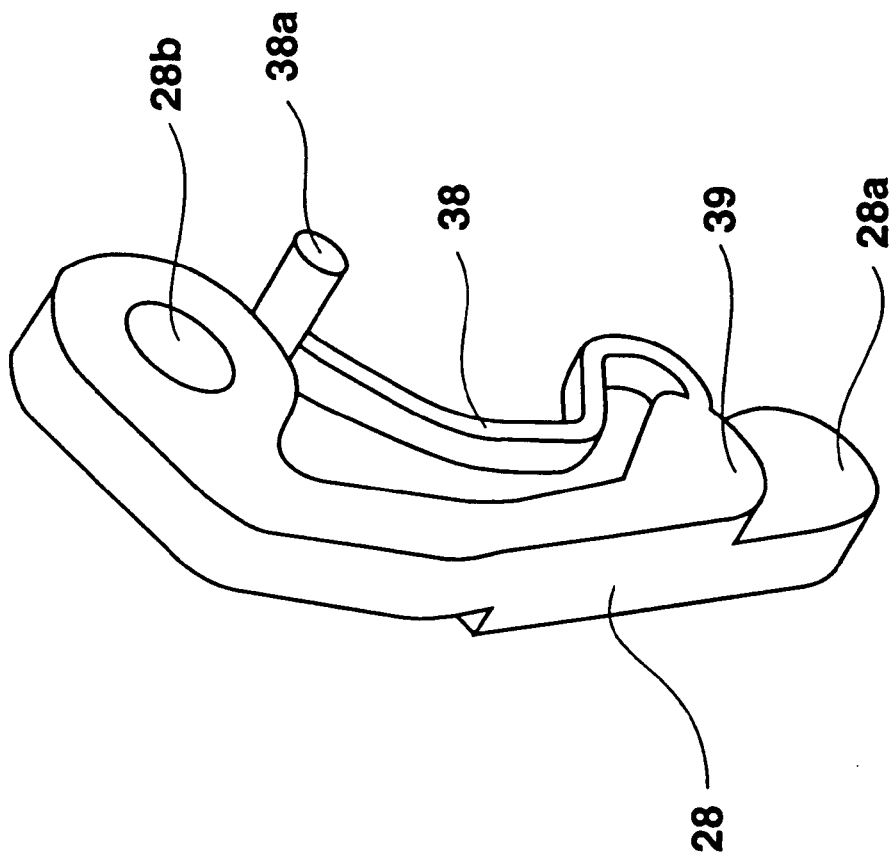
FIGS. 47A and 47B are perspective views showing the cam driven lever.
Figure 47B:
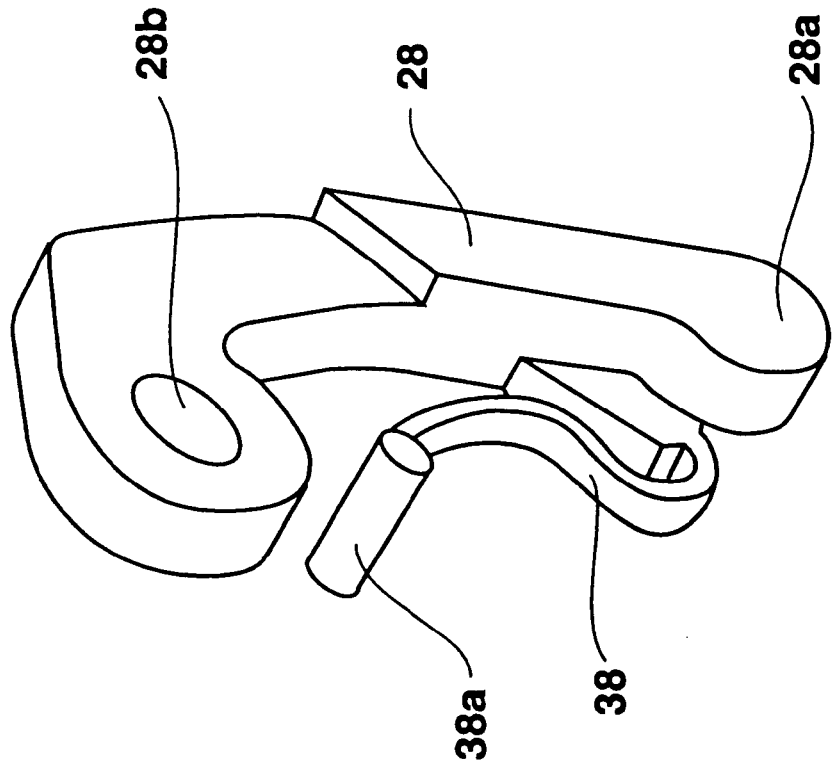

That is, the swing range $\theta_{11}$ shown in FIG. 46 is set so that the lower end 28a of the cam driven lever 28 can keep a suitable over-lap amount OV with the cam 31 which is horizontally moved relatively in the directions of the arrows a,a', and also the cam driven lever 28 can be smoothly rotated in the directions of the arrows g,g' by the cam 31 which is horizontally moved relatively in the directions of the arrows a,a', and the control means 50 serves to positionally regulate the cam driven lever 28 at the intermediate position within the swing range $\theta_{11}$ and with some degree of freedom within a fixed range $\theta_{12}$.

According to the cassette discharge mechanism, as shown in FIGS. 34 and 35, when the small-size and large-size tape cassettes 1, 2 are selectively inserted from the direction of the arrow a to the insertion reference position $P_{12}$ in the cassette stage 6, the pair of right and left cassette discharge levers 51 are symmetrically rotated in the direction of the arrow e, and the small-size and large-size tape cassettes 1,2 are pressed and fixed onto the bottom plate 6a of the cassette stage 6 by the cassette press force of the cassette press lever 92, whereby the pair of right and left cassette discharge levers 51 are stopped at the rotational position in the direction of the arrow e.

Figure 44:
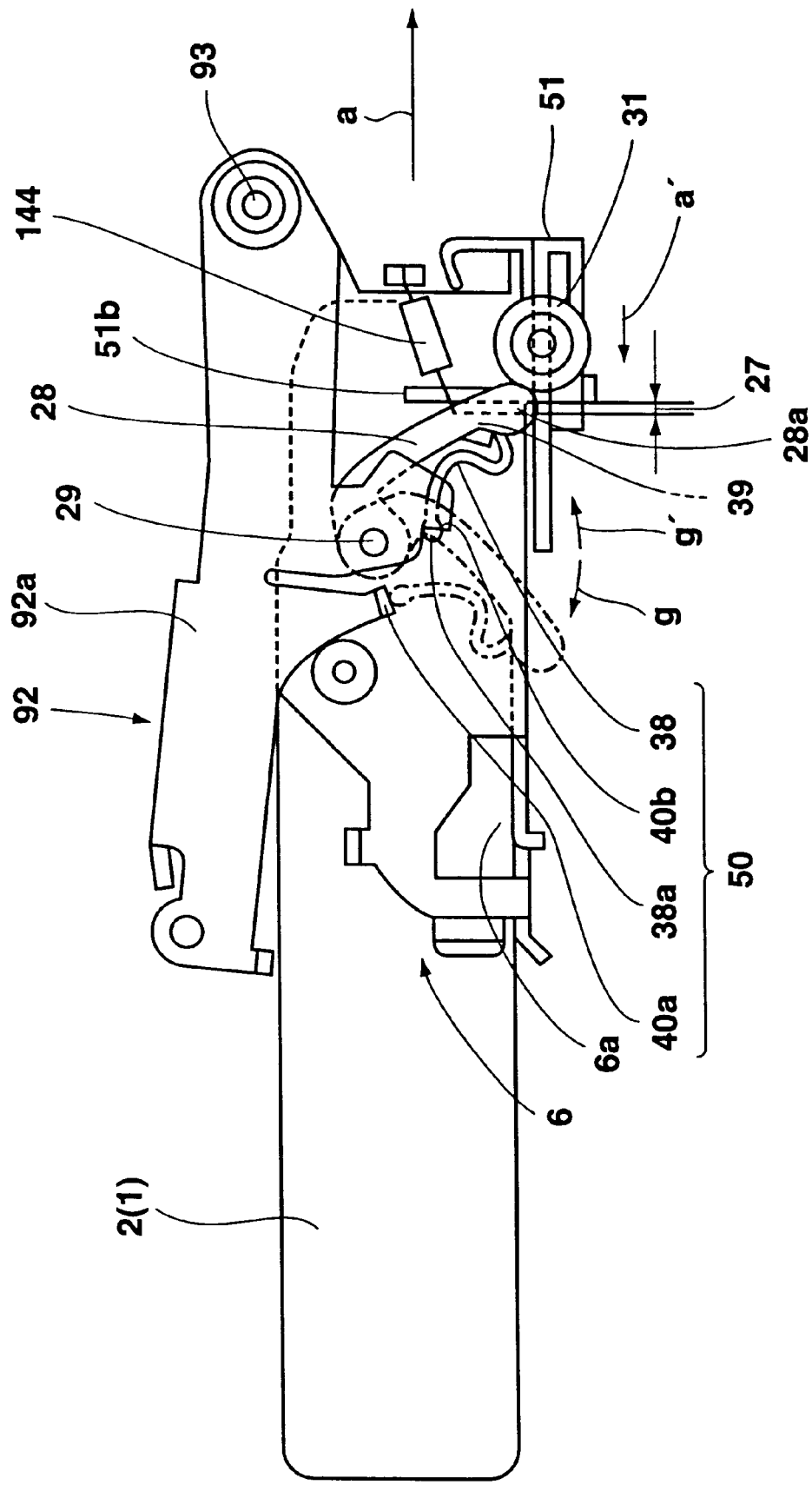
FIG. 44 is a side view showing an aspect that a cam driven lever is driven by a cam of the cassette discharge mechanism during the cassette loading operation.

At this time, when the cam driven lever 29 is rotated in the direction of the arrow g' until it reaches the position as indicated by a solid line in FIG. 44, the stopper pin 38a abuts against one stopper 40b, and the further free rotation of the cam driven lever 28 in the direction of the arrow g' is regulated, so that the cam driven lever 28 is stopped at the position indicated by the solid line. The stop position of the cam driven lever 28 indicated by the solid line is the maximum value in the direction of the arrow g' of the swing range $\theta_{12}$ having the degree of freedom which is indicated by the solid line in FIG. 46, and at this time, as shown in FIG. 44, a fixed gap is kept between the contact portion 39 of the cam driven lever 28 and the other end 51b of the cassette discharge lever 51.

Next, when the cam driven lever 28 is rotated in the direction of the arrow g until it reaches the position indicated by a one-dotted chain line in FIG. 44, the stopper pin 38a abuts against the other stopper 40a, and the further free rotation of the cam driven lever 28 in the direction of the arrow g is regulated, whereby the cam driven lever 28 is stopped at the position indicated by one-dotted chain line. The position of the cam driven lever 28 indicated by the one-dotted chain line is set to the maximum value in the direction of the arrow g of the swing range $\theta_{12}$ having the degree of freedom indicated by the one-dotted chain line in FIG. 46.

Therefore, as shown in FIG. 44, when the cassette stage 6 is horizontally moved from the cassette insertion position $P_1$ in the direction of the arrow a in order to load to the cassette mount position $P_3$ the small-size and large-size tape cassettes 1,2 which are selectively inserted into the cassette stage 6, the cam 31 relatively abuts against the lower end 28a of the cam driven lever 28 from the direction of the arrow a' in the course of the movement, and the cam driven lever 28 is rotated in the direction of the arrow g from the stop position indicated by a solid line to the stop position indicated by a one-dotted chain line. Subsequently, through the relative movement of the cam 31 in the direction of the arrow a', the cam driven lever 28 is further rotated in the direction of the arrow g from the stop position indicated by a one-dotted chain line to get over the cam 31. At this time, the leaf spring portion 38 is slacked against elasticity, and the restoring force of the cam driven lever 28 in the direction of the arrow g' is charged to the leaf spring portion 38.

At the instantaneous time when the cam driven lever 28 gets over the cam 31 moving relatively in the direction of the arrow a', the cam driven lever 28 is rotationally returned in the direction of the arrow g' by the restoring force charged to the leaf spring portion 38. However, at the instantaneous time when the cam driven lever 28 passes over the stop position indicated by a one-dotted chain line in the direction of the arrow g', the stopper pin 38*a* is separated from the stopper 40*a* in the direction of the arrow g', and the restoring force of the cam driven lever 28 in the direction of the arrow g' by the leaf spring portion 38 is extinguished. Therefore, the reverse rotational force of the cam driven lever 28 in the direction of the arrow g' is very weak, and the cam driven lever 28 is highly stably stopped at the stop position indicated by the solid line at the instantaneous time when the cam driven lever 28 is rotated in the direction of the arrow g' until the stop position indicated by the solid line and the stopper pin 38*a* abuts against the stopper 40.

Accordingly, the gap 27 is kept between the contact portion 39 of the cam driven lever 28 which is reversely rotated in the direction of the arrow g' and the other end 51*b* of the cassette discharge lever 51, and the contact portion 39 of the cam driven lever 28 does not abut against the other end 51*b* of the cassette discharge lever 51 from the direction of the arrow g'. Even if the contact portion 39 abuts against the other end 51*b* in the direction of the arrow g', the impact at that time is very weak, and thus there occurs no uncomfortable impact sound "click sound".

Accordingly, it can be prevented in advance that since the contact portion 39 of the cam driven lever 28 strongly impinges against the other end 51*b* of the cassette discharge lever 51 from the direction of the arrow g', the cassette discharge lever 51 is carelessly rotated in the direction of the arrow e' corresponding to the cassette discharge direction in the course of the cassette loading operation, so that the small-size and large-size tape cassettes 1, 2 in the cassette stage 6 are carelessly displaced in the direction of the arrow a' to induce the loading miss of the small-size and large-size tape cassettes 1, 2. Further, since the contact portion 39 of the cam driven lever 28 does not strongly collide against the other end 51*b* of the cassette discharge lever 51 from the direction of the arrow g', the left time of the cam driver lever 28 and the cassette discharge lever 51 can be increased. Particularly, the cam driven lever 28 can be formed of synthetic resin or the like, and it can be manufactured at a low cost.

Figure 45:
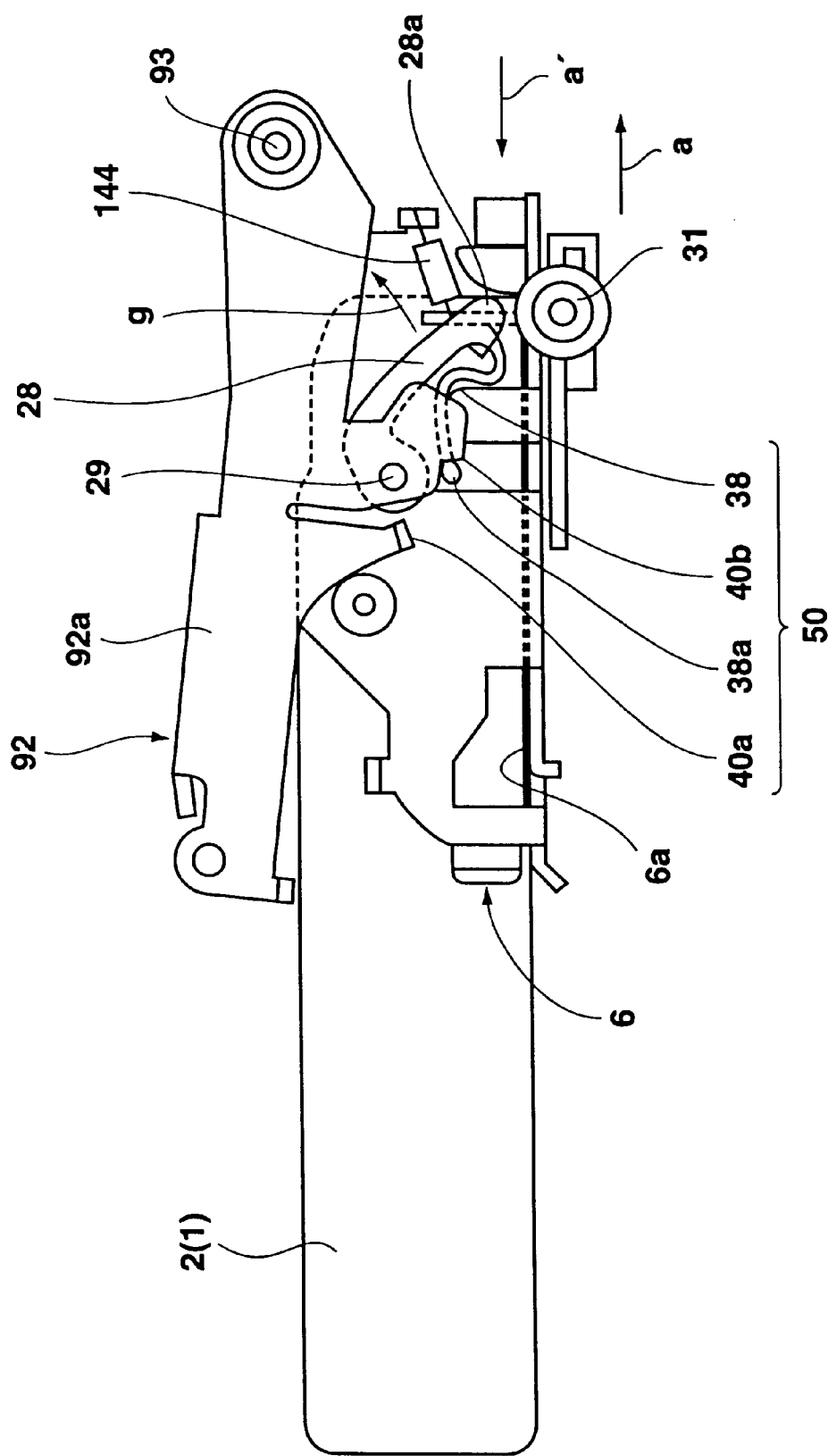
FIG. 45 is a side view showing an aspect that the cam driven lever is driven by the cam of the cassette discharge mechanism during the cassette eject operation.

Next, as shown in FIG. 45, when the cassette stage 6 is horizontally moved to the cassette insertion position $P_1$ in the direction of the arrow a' in order to eject the small-size and large-size tape cassettes 1, 2 from the cassette mount position $P_3$ to the cassette insertion position $P_1$ by the small-size and large-size tape cassettes 1,2, the cam 31 abuts against the lower end 28*a* of the cam driven lever 28 from the direction of the arrow a in the course of the movement, and the cam driven lever 28 is rotated in the direction of the arrow g' from the stop position indicated by the solid line in FIG. 44 to the position shown in FIG. 45. At this time, the contact portion 39 of the cam driven lever 28 strongly pushes the other end 51*b* of the cassette discharge lever 51, and the pair of right and left cassette discharge levers 51 are simultaneously rotated in the direction of the arrow e', whereby the small-size and large-size tape cassettes 1,2 in the cassette stage 6 are discharged in the direction of the arrow a' by a fixed distance. The discharge stroke of the small-size and large-size tape cassettes 1,2 in the direction of the arrow a' is dependent on the thickness $T_1$, $T_2$, etc. of these tape cassettes 1,2. The discharge stroke of the small-size tape cassette 1 is set to be large, and the discharge stroke of the large-size tape cassette 2 is set to be small. As shown in FIG. 45, when the cam driven lever 28 is rotated in the direction of the arrow g', the leaf spring portion 38 is slacked against its elasticity, and the restoring force of the cam driven lever 28 in the direction of the arrow g is charged to the leaf spring portion 38. At the instantaneous time when the cam driven lever 28 gets over the cam 31 in the direction of the arrow a', the cam driven lever 28 is rotationally returned in the direction of the arrow g by the restoring force.

The embodiments of the present invention are described above. However, the present invention is not limited to the above embodiments, and various modifications may be made on the basis of the technical concept of the present invention. For example, application of the present invention is not limited to a video cassette recorder, and it may applied to various kinds of cassette type recording and reproducing apparatuses.

The cassette type recording and reproducing apparatus of the present invention has the following effects.

According to the first aspect of the present invention, a cassette type recording and reproducing apparatus in that in a tape cassette ejecting operation, the cam driven lever is kicked by the cam, and the cassette discharge lever is rotated by the kicked cam driven lever, whereby the tape cassette in the cassette stage is pushed out in the cassette discharge direction by the cassette discharge lever is provided with control means for positionally regulating the cam driven lever with some degree of freedom in a fixed range and at the intermediate position of the swing range in which the cam driven lever is rotated by the cam. Therefore, it can be prevented in advance that the cam driven lever violently collides against the cassette discharge lever in the course of the cassette loading operation to produce an uncomfortable sound "click sound", and the tape cassette in the cassette stage is pushed and displaced by the cassette discharge lever due to the impact of the collision, so that the tape cassette cannot be accurately mounted to the plural cassette positioning pins (not shown) at the cassette mount position to induce a cassette loading miss. In order to prevent the positional displacement of the tape cassette in the cassette stage, no special countermeasure to increase the clamp force of the tape cassette in the cassette stage is unnecessary, and rather the camp force can be sufficiently reduced. Accordingly, the tape cassette may be discharged with a weak force by the cassette discharge lever at the eject time, and the rigidity of the cassette discharge lever and the cam driven lever is not necessary to be increased, so that reduction in cost and enhancement in reliability can be achieved.

Further, according to the second aspect of the present invention, the cam driven lever is formed of synthetic resin or the like, and the cam driven lever is positionally regulated with some degree of freedom in a fixed range by the leaf spring portion which is integrally formed with the cam driven lever and the plural stoppers which are formed in the cassette stage, so that the cam driven lever can be positionally regulated accurately with some degree of freedom in the fixed range with a small number of parts and a small number of fabrication steps and in a simple structure.

According to the third aspect of the present invention, when the cassette stage is returned to the cassette insertion position, the cassette insertion port of the front panel is closed by the opening/closing lid secured to the cassette stage, and the cassette double insertion preventing lid is evacuated to the lid opening position. When the cassette stage is moved from the cassette insertion position to the cassette mount position, the cassette double insertion preventing lid is moved from the lid opening position to the lid closing position so that the inside of the cassette insertion port is closed by the cassette double insertion preventing lid. Therefore, the cassette double insertion, etc. can be prevented in advance when the tape cassette has been loaded, thereby enhancing the safety of the apparatus.

According to the fourth aspect of the present invention, the opening/closing lid is also used as the cassette press member for pressing the tape cassette in the cassette stage, so that the number of parts and the number of fabrication processes can be reduced, and the cost can be reduced.

According to the fifth aspect of the present invention, the cassette double insertion preventing lid is opened/closed by the opening/closing mechanism which is driven by the cassette loading mechanism, so that the loading motor is also used as the cassette double insertion preventing lid to perform the opening/closing operation and thus the construction can be simplified. In addition, the cassette double insertion preventing lid can be opened/closed at a good timing which is synchronized with the movement of the cassette stage, and thus there occurs no risk that the cassette stage and the cassette double insertion preventing lid collide against each other and thus they are damaged together, resulting in enhancement of the safety.

According to the sixth aspect of present invention, the apparatus is designed so that the front lid portion of the tape cassette into which the cassette slant insertion preventing stopper secured to the cassette stage is inserted is relatively pushed from the upper side to prevent the forwardly and upwardly slant insertion of the tape cassette into the cassette stage in advance. Therefore, there never occurs such a loading miss that the tape cassette is loaded while it is carelessly obliquely inserted into the cassette stage, and the reliability and safety are enhanced. In addition, when the tape cassette is loaded from the cassette insertion position to the cassette mount position by the cassette stage, the cassette slant insertion preventing stopper is escaped to the upper side of the cassette stage, so that the front lid of the tape cassette can be smoothly opened with no interference with the cassette slant insertion preventing stopper.

According to the seventh aspect of the present invention, when the cassette stage is moved to the cassette insertion position, the cassette slant insertion preventing stopper is burrowed into the lower side of the top plate of the chassis. Therefore, when the cassette slant insertion preventing lever is about to be pushed up by the tape cassette which is inserted in the forwardly upwardly slant direction into the cassette stage, the cassette slant insertion preventing stopper abuts against the top plate of the chassis to prevent the cassette slant insertion preventing stopper from being upwardly floated. Therefore, it is not necessary to support the cassette slant insertion preventing stopper with a complicated mechanism, so that the construction can be simplified and the cost can be reduced.

According to the eighth aspect of the present invention, when the cassette stage is moved to the cassette mount position, the cassette slant insertion preventing stopper is escaped onto the mount table of the cassette stage. Therefore, when the tape cassette is loaded to the cassette mount position, the tape cassette is prevented from interfering with the cassette slant insertion preventing stopper even when it is floated upwardly from the cassette stage.

According to the ninth aspect of the present invention, the cassette slant insertion preventing stopper is freely rotatably secured to the front lid opening/closing lever which is freely rotatably secured to the cassette stage. Therefore, when the tape cassette is loaded to the cassette mount position by the cassette stage and the front lid of the tape cassette is upwardly opened by the front lid opening/closing lever, the cassette slant insertion preventing stopper can be easily escaped out of the front lid opening/closing space by the front lid opening/closing lever, so that the front lid opening/closing lever can be also used as the driving lever of the cassette slant insertion preventing stopper. Accordingly, the number of parts and the number of fabrication steps can be reduced, and the cost can be also reduced.

According to the tenth aspect of the present invention, when the cassette stage is moved from the cassette insertion position to the cassette mount position side, the accommodation control means is actuated to automatically accommodate the cassette insertion guide and the cassette identifying member from its operation position in the cassette insertion space to the accommodation position out of the cassette insertion space. Therefore, under the cassette loading state, the cassette insertion guide and the cassette identifying member are little seen from the outside of the cassette insertion port. Accordingly, the outward appearance is remarkably better, and there can be beforehand prevented such an accident that an operator carelessly touches the cassette insertion guide, the cassette identifying member or the like to carelessly jump out these members from the cassette insertion space, so that the tape cassette carelessly collides against the cassette insertion guide, the cassette identifying member or the like in the cassette eject operation, and damages these members. Therefore, the reliability and safety can be more enhanced.

According to the eleventh and twelfth aspects of the present invention, when the cassette stage is moved from the cassette insertion position to the cassette mount position, the control lever is driven by the control lever urging means so that the cassette identifying member and the cassette insertion guide which are moved to the operation position in the cassette insertion space are accommodated at the accommodation position out of the cassette insertion space. Therefore, the cassette insertion guide and the cassette identifying member can be accommodated at the accommodation position out of the cassette insertion space in the cassette loading operation with a simple construction. In addition, the control lever and the cassette insertion guide are driven by the urging means to perform the accommodation operation. Therefore, the operation can be surely performed, and these members are never jumped out of the cassette insertion space even when the operator carelessly touches these members. Accordingly, the reliability and the safety can be more enhanced.

The two cassette identifying members are disposed at two positions which are in the neighborhood of both the right and left ends of the cassette insertion port, and the cassette insertion guide is escaped out of the cassette insertion space only when the pair of right and left cassette identifying members are simultaneously driven by the large-size tape cassette. Therefore, even when only one of the cassette identifying members is driven to erroneously insert the small-size tape cassette or the like from a position which is greatly deviated to the right or left side of the cassette insertion port, the erroneous insertion of the small-size tape cassette can be surely prevented by the cassette insertion guide, and thus the reliability is very high.

According to the thirteenth aspect of the present invention, when plural types of tape cassettes which are different in size are selectively inserted into the cassette stage, two detection targets which are formed at different positions with respect to the positioning reference holes which are common to these tape cassettes are detected by the two detection levers of the double lever mechanism respectively, whereby the insertion position detection and the type detection of the tape cassette are simultaneously performed. In this case, for example, when a large-size tape cassette is inserted and the second detection lever is actuated, the first detection lever is pushed by the second detection lever to move the first detection lever to a position where it does not interfere with the large-size tape cassette. In addition, the operation of the position detecting optical sensor of the first detection lever is inhibited by an optical shutter plate of the second detection lever. Therefore, the insertion position detection and the type detection of the tape cassette can-be simultaneously performed by only the two detection levers and the optical sensor. Accordingly, the cost can be reduced and the space can be saved because the number of parts and the number of fabrication steps can be reduced, and also the reliability can be enhanced because the number of optical sensors is reduced. Further, when a large-size tape cassette is detected, the first detection lever is pushed by the second detection lever, and the operation of the optical sensor for detecting the first detection lever is inhibited by the optical shutter of the second detection lever. Therefore, it is unnecessary to adjust the position of the optical sensor, and thus the fabrication is facilitated.

According to the fourteenth aspect of the present invention, the first and second detection levers are freely rotatably fixed around the common supporting pins of the cassette stage, so that the number of parts and the number of fabrication steps are reduced, and thus the cost can be reduced.

Accordingly to the fifteenth aspect of the present invention, the first detection lever is also used as a cassette discharge lever, so that the number of parts and the number of fabrication steps can be reduced, and thus the cost can be reduced.

According to the sixteenth aspect of the present invention, the pair of right and left stopper blocks are freely rotatably secured to the cassette stage by the pair of right and left supporting pins. Therefore, these stopper blocks never suffers deformation such as distortion or the like due to external force, and the pair of right and left rotational urging means may merely produce weak force with which the dead weight of the stopper blocks can be supported. Accordingly, in the case where the large-size tape cassette is inserted into the cassette stage, the pair of right and left stopper blocks can be easily escaped out of the cassette stage, and the large-size tape cassette can be easily inserted into the cassette stage with the weak force. On the other hand, in the case where the small-size tape cassette is inserted into the cassette stage, even when the small-size tape cassette is carelessly violently pushed in, the cassette guide and the cassette stoppers are prevented from being deviated from the normal position in the cassette stage because there never occurs any deformation such as distortion or the like in the pair of right and left stopper blocks. Therefore, when plural types of tape cassettes which are different in size are selectively inserted into the cassette stage, any tape cassette of these tape cassettes can be easily inserted, and any tape cassette can be accurately positioned in the cassette stage, so that the loading miss of the plural tape cassettes can be prevented beforehand.

According to the seventeenth aspect of the present invention, the supporting pins of the pair of right and left stopper blocks are set in the range of 0 to 90 degrees with respect to the insertion direction. Therefore, when the small-size tape cassette is positioned to the insertion reference position by the pair of right and left cassette stoppers, the pair of right and left stopper blocks are hardly escaped, and thus the small-size tape cassette can be positioned with high precision.

According to the eighteenth aspect of the present invention, the pair of right and left stopper blocks are formed with slant surfaces for escape from the large-size tape cassette. Therefore, not only the force of the rotational urging means can be weakened, but also the insertion of the large-size tape cassette into the cassette stage can be easily performed with weak force.

According to the nineteenth aspect of the present invention, the pair of right and left stopper blocks are freely rotatably secured to the lower portion of the bottom plate of the cassette stage by the pair of right and left supporting pins disposed at the outside of these stopper blocks in the right and left directions, and the cassette guides and the cassette stoppers are offset upwardly from the pair of right and left supporting pins in such a state that the cassette guides and the cassette stoppers of the pair of right and left stopper blocks are projected to the upper side of the bottom plate by the pair of right and left rotational urging means. Therefore, when the small-size tape cassette is positioned to the insertion reference position by the cassette guide of the pair of right and left stopper blocks, the pair of right and left stopper blocks are upwardly rotationally urged, and thus they are not escaped downwardly, so that the small-size tape cassette can be positioned with high precision.

What is claimed is:

1. A cassette type recording/reproducing apparatus including:

plural types of tape cassettes selected from the group consisting of a small-size tape cassette and a large-size cassette which are different in size from one another;

a cassette insertion port formed in a front panel;

a cassette stage which is reciprocatively moved between a cassette insertion position at which said plural types of tape cassettes are selectively inserted from said cassette insertion port, and a cassette mount position at which the inserted plural tape cassettes are subjected to recording/reproducing operation;

a pair of right and left stopper blocks each having an integrally-formed cassette guide and an integrally-formed cassette stopper for positioning the small-size tape cassette to an insertion reference position on a stage center when the small-size tape cassette is selectively inserted from said cassette port into said cassette stage;

a pair of right and left supporting pins through which said pair of right and left stopper blocks are freely rotatably secured to said cassette stage so that said stopper blocks can freely rotate into and out of said cassette stage; and a pair of right and left rotational urging means which are inserted and secured respectively to the right and left supporting pins to directly bias said respective right and left stopper blocks for moving said pair of right and left stopper blocks into said cassette stage when a small-size tape cassette is inserted from the cassette insertion port into the cassette stage, and moving said pair of right and left stopper blocks away from said cassette stage when a large-size tape cassette is inserted from said cassette insertion port into said cassette stage.

2. The cassette type reproducing/reproducing apparatus as claimed in claim 1, wherein said supporting pins of said pair of right and left stopper blocks are set in the range of 0° to 90° to the cassette insertion direction.

3. The cassette type recording/reproducing apparatus as claimed in claim 2, wherein said pair of right and left stopper blocks are vertically freely rotatably secured to the lower portion of a bottom plate of said cassette stage by said pair of right and left supporting pins which are disposed at ends of said stopper blocks, and said cassette guides and said cassette stoppers of said pair of right and left stopper blocks are upwardly offset by said supporting pins in such a condition that said cassette guides and said cassette stoppers are upwardly projected from the bottom plate by said rotational urging means.

4. The cassette type recording/reproducing apparatus as claimed in claim 1, wherein said pair of right and left stopper blocks are formed with slant surfaces which are pushed by a large-size tape cassette inserted into said cassette stage so that said pair of right and left stopper blocks rotate away from said cassette stage with respect to said rotational urging means.

* * * * *